US011807758B2

(12) United States Patent
Suwa

(10) Patent No.: US 11,807,758 B2
(45) Date of Patent: Nov. 7, 2023

(54) SILOXANE POLYMER AND METHOD OF PRODUCING SILOXANE POLYMER

(71) Applicant: JNC CORPORATION, Tokyo (JP)

(72) Inventor: Kazuya Suwa, Chiba (JP)

(73) Assignee: JNC CORPORATION, Tokyo (JP)

( * ) Notice: Subject to any disclaimer, the term of this patent is extended or adjusted under 35 U.S.C. 154(b) by 396 days.

(21) Appl. No.: 17/159,158

(22) Filed: Jan. 27, 2021

(65) Prior Publication Data

US 2021/0238419 A1 Aug. 5, 2021

(30) Foreign Application Priority Data

Jan. 28, 2020 (JP) ................................ 2020-011626

(51) Int. Cl.

| | |
|---|---|
| ***C08L 83/04*** | (2006.01) |
| ***C08G 77/06*** | (2006.01) |
| ***C08G 77/12*** | (2006.01) |
| ***C08G 77/16*** | (2006.01) |
| ***C08G 77/18*** | (2006.01) |
| ***C08G 77/00*** | (2006.01) |
| ***C08G 77/24*** | (2006.01) |
| ***C08G 77/26*** | (2006.01) |
| ***C08G 77/30*** | (2006.01) |
| ***C08G 77/28*** | (2006.01) |
| ***C08G 77/20*** | (2006.01) |

(52) U.S. Cl.
CPC .............. *C08L 83/04* (2013.01); *C08G 77/06* (2013.01); *C08G 77/12* (2013.01); *C08G 77/16* (2013.01); *C08G 77/18* (2013.01); *C08G 77/20* (2013.01); *C08G 77/24* (2013.01); *C08G 77/26* (2013.01); *C08G 77/28* (2013.01); *C08G 77/30* (2013.01); *C08G 77/70* (2013.01); *C08G 77/80* (2013.01)

(58) Field of Classification Search
CPC ...................................................... C08L 83/04
See application file for complete search history.

(56) References Cited

FOREIGN PATENT DOCUMENTS

| | | | |
|---|---|---|---|
| JP | 2006033307 | | 2/2006 |
| JP | 201011646 | * | 5/2010 |
| JP | 2010116464 | | 5/2010 |
| JP | 2017014320 | * | 1/2017 |

OTHER PUBLICATIONS

Katsuta et al. "Necklace shaped dimethylsiloxane polymers . . . ", Polymer 127 (2017), pp. 8-14.*

Sodkhomkhum et al. "Synthesis of poly(siloxane/double-decker silsesquioxane) . . . ", Polymer 86 (2016), pp. 113-119.*

English language translation, drawings, JP 2010-116464, May 2010.*

English language translation, abstract, JP 2017, Jan. 2017.*

* cited by examiner

*Primary Examiner* — Margaret G Moore
(74) *Attorney, Agent, or Firm* — JCIPRNET

(57) ABSTRACT

To provide a siloxane polymer containing a silsesquioxane unit and a chain siloxane unit in the main chain and having a reactive group. A siloxane polymer containing a repeating unit represented by Formula (1):

(1)

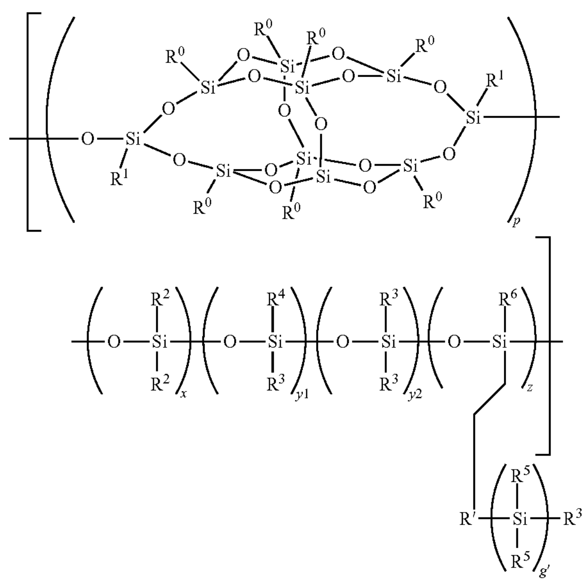

(2)

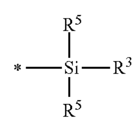

$R^0$'s independently represent $C_{6-20}$ aryl or $C_{5-6}$ cycloalkyl; $R^1$ independently represent a hydrogen atom, $C_{6-20}$ aryl, $C_{5-6}$ cycloalkyl, $C_{7-40}$ arylalkyl, or $C_{1-40}$ alkyl; $R^2$, $R^4$, and $R^6$ independently represent $C_{6-20}$ aryl, $C_{5-6}$ cycloalkyl, $C_{7-40}$ arylalkyl, or $C_{1-40}$ alkyl; $R^3$ represents a monovalent group having a reactive group; $R^5$'s independently represent $C_{6-20}$ aryl, $C_{5-6}$ cycloalkyl, $C_{7-40}$ arylalkyl, $C_{1-40}$ alkyl, or $C_{1-20}$ alkoxy; y1, y2, and z are an integer of 0 to 30; g' is 0 or 1; and, in the case of y1=y2=z=0, at least one terminal is the group represented by Formula (2).

19 Claims, No Drawings

SILOXANE POLYMER AND METHOD OF PRODUCING SILOXANE POLYMER

CROSS-REFERENCE TO RELATED APPLICATIONS

This application claims the priority benefit of Japanese Patent Application No. 2020-011626, filed on Jan. 28, 2020. The entirety of the above-mentioned patent application is hereby incorporated by reference herein and made a part of this specification.

BACKGROUND

Technical Field

The disclosure relates to a siloxane polymer and a method of producing a siloxane polymer.

Description of Related Art

Polymers containing silsesquioxane having a cage structure have been focused on in various fields because they have a specific structure and specific effects are expected accordingly. Regarding polymers containing such a silsesquioxane framework, a silicon-based polymer containing a silsesquioxane framework in the main chain is known (for example, refer to Patent Document 1). In addition, a silicon film having excellent heat resistance has been developed by introducing a crosslinkable functional group into a silicon compound containing a silsesquioxane framework having a cage structure in the main chain to form a crosslinked polymer (Patent Document 2).

PATENT DOCUMENTS

Patent Document 1: Japanese Patent Laid-Open No. 2006-33307

Patent Document 2: Japanese Patent Laid-Open No. 2010-116464

SUMMARY

Silicon-based polymers containing a silsesquioxane framework in the main chain have been developed so far, but further variations of silicon-based polymers containing a silsesquioxane framework in the main chain, which can be used as a polymer raw material, are required. The disclosure provides a siloxane polymer containing a silsesquioxane unit and a chain siloxane unit in the main chain and having a reactive group, which can be used as a polymer raw material, and a method of producing the siloxane polymer.

The inventors found that, when a silsesquioxane compound and a compound containing a chain siloxane structure are reacted with a silicon compound having a reactive group, and a silsesquioxane compound is reacted with a silicon compound containing a chain siloxane structure, and additionally, a hydrogen atom or a vinyl group is introduced into the terminal, and a hydrosilylation reaction is then caused, a novel siloxane polymer containing a silsesquioxane unit and a chain siloxane unit in the main chain and having a reactive group can be obtained, and completed the disclosure. In addition, it has been found that, also if a siloxane polymer containing a silsesquioxane unit and a chain siloxane unit and having a hydroxy group (—OH) at the terminal is reacted with a specific silicon compound, a novel siloxane polymer containing a silsesquioxane unit and a chain siloxane unit in the main chain and having a reactive group can be obtained. In addition, it has been found that, when a branched hydrosilyl group (—SiH) is reacted, a desired reactive group can be introduced into a siloxane polymer.

That is, embodiments of the disclosure include the following configurations.

[1] A siloxane polymer containing a repeating unit represented by Formula (1):

(1)

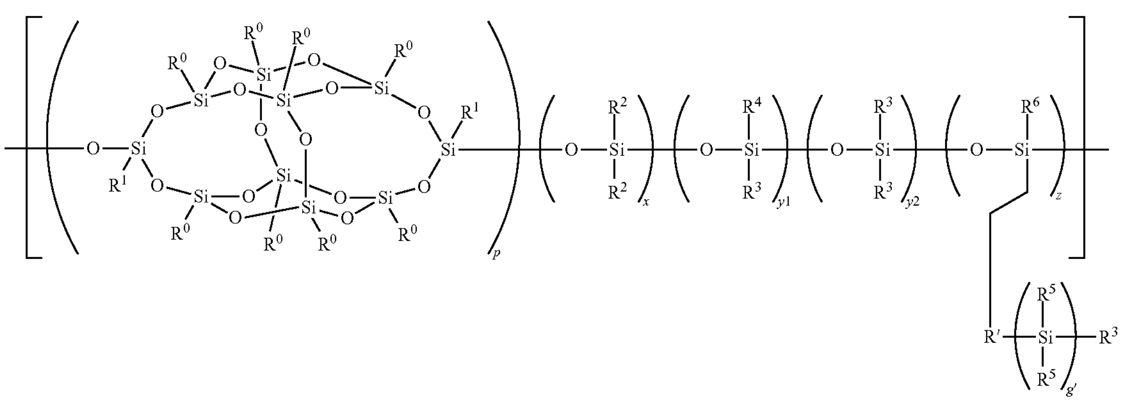

(2)

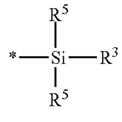

in the above formula, $R^0$'s independently represent an aryl group having 6 to 20 carbon atoms or a cycloalkyl group having 5 to 6 carbon atoms, and in the aryl group having 6 to 20 carbon atoms and the cycloalkyl group having 5 to 6 carbon atoms, any hydrogen atom may be independently substituted with a fluorine atom or an alkyl group having 1 to 20 carbon atoms;

$R^1$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^2$, $R^4$, $R^5$ and $R^6$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^3$ represents a monovalent group having a reactive group, and when there are a plurality of $R^3$'s, they may be the same as or may be different from each other;

p represents an integer of 1 or more;

x represents an integer of 1 to 30;

y1, y2 and z represent an integer of 0 to 30;

g' represents 0 or 1;

* represents a bonding position; and in the case of y1=y2=z=0, at least one terminal is the group represented by Formula (2).

[2] The siloxane polymer according to [1], wherein the reactive group is a cationic polymerizable group.

[3] The siloxane polymer according to [1], wherein the reactive group is at least one selected from the group consisting of —F, —Cl, —Br, —$CF_3$, perfluoroalkyl, alkoxy, (meth)acryloyl, (meth)acryloyloxy, —COOH, an acid anhydride, polyalkyleneoxy, ester, epoxy, an oxetane ring, phenoxy, —$NH_2$, —CN, —NCO, an alkenyl group having 3 or more carbon atoms, cycloalkenyl, —SH, and —$PH_2$.

[4] The siloxane polymer according to [3], wherein the reactive group is epoxy, an oxetane ring, (meth)acryloyl, (meth)acryloyloxy, —NCO, —CN, or an acid anhydride.

[5] The siloxane polymer according to [3], wherein $R^3$ includes a group selected from the following group:

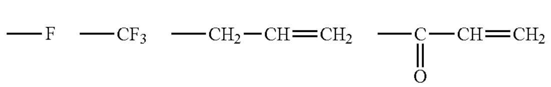

-continued

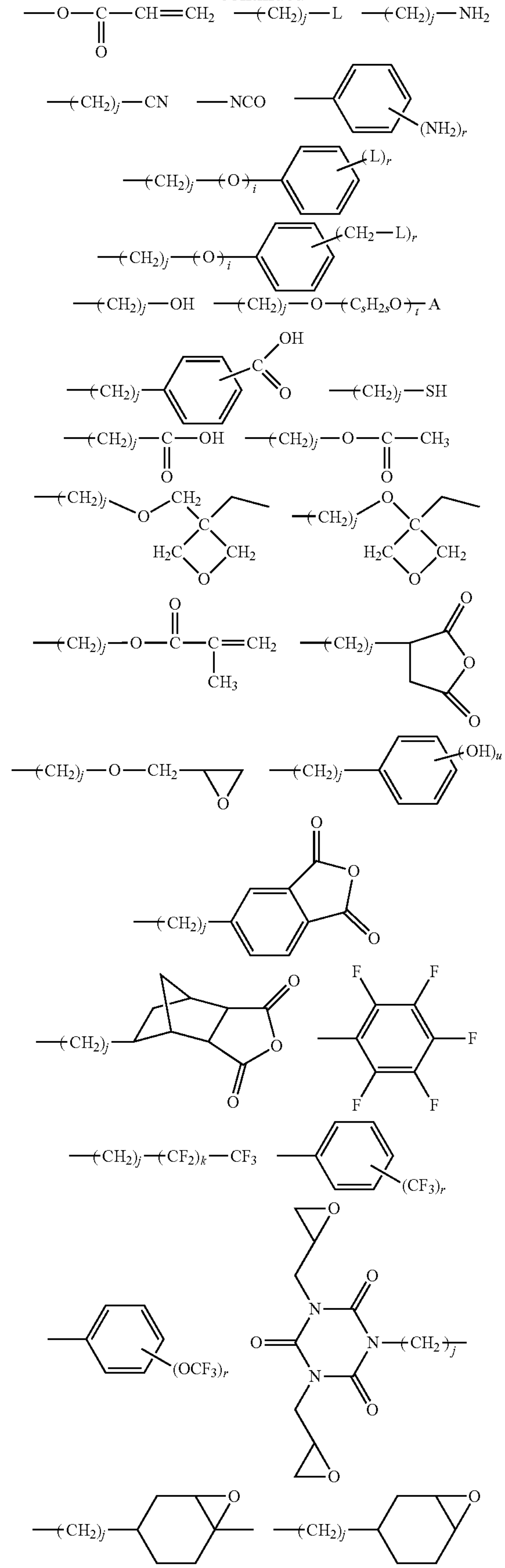

-continued

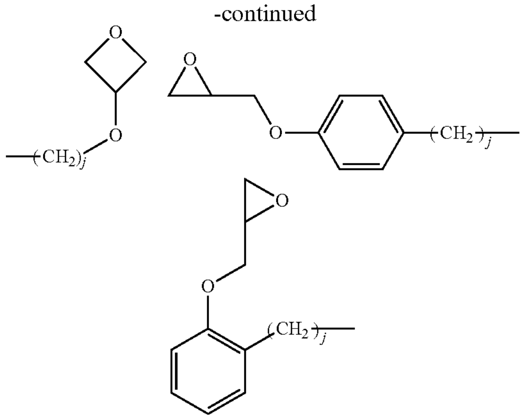

in the above formula, i is 0 or 1; j is an integer of 2 to 4; k is an integer of 0 to 15; L is a halogen atom, r is an integer of 1 to 5; s is an integer of 2 or 3, and t is an integer of 2 to 200; u is an integer of 1 to 3; and A is a hydrogen atom or an alkyl group having 1 to 4 carbon atoms. Here, the bonding positions of -L, —$CH_2$-L, —OH, —COOH, —$CF_3$ and —$OCF_3$ on the benzene ring are arbitrary.

[6] The siloxane polymer according to any one of [1] to [5], wherein y1, y2 or z is 1 or more.

[7] The siloxane polymer according to [6], wherein the group represented by Formula (2) is included as a terminal.

[8] The siloxane polymer according to any one of [1] to [7], wherein the weight average molecular weight is 2,000 to 10,000,000.

[9] A method of producing a siloxane polymer containing a repeating unit represented by Formula (1-1) and a group represented by Formula (2) as terminals, including:

(i) a process of reacting a silicon compound represented by Formula (a) with a silicon compound represented by Formula (b) and additionally reacting with a silicon compound represented by Formula (c);

(ii) a process of reacting a silicon compound represented by Formula (d) with a compound represented by Formula (e);

(iii) a process of reacting a silicon compound represented by Formula (f) with a silicon compound represented by Formula (g); or (iv) a process of reacting a silicon compound represented by Formula (h) with a silicon compound represented by Formula (i):

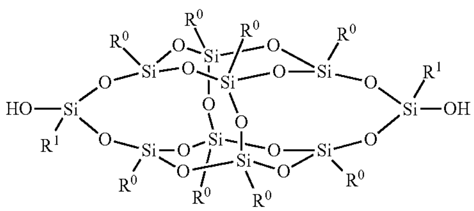

(a)

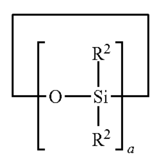

(b)

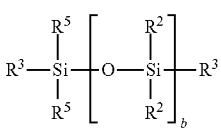

(c)

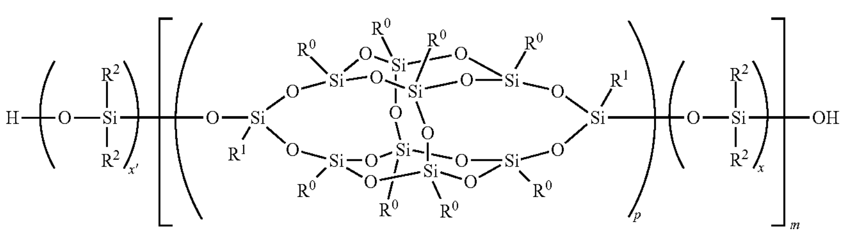

(d)

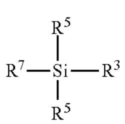

(e)

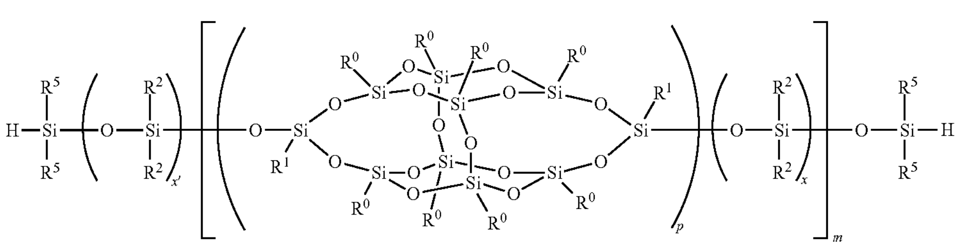

(f)

-continued (g)

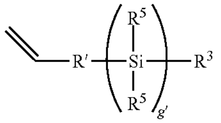

(h)

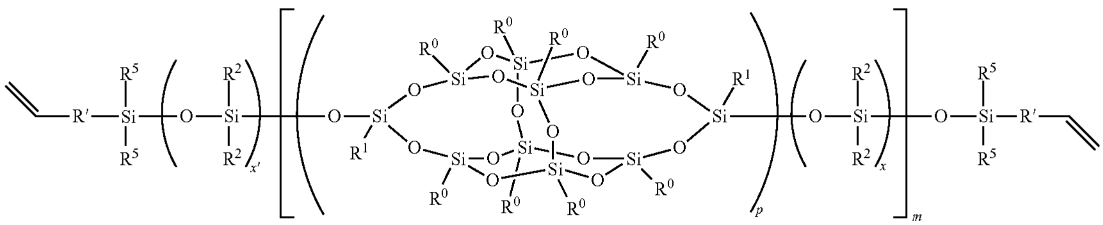

(i)

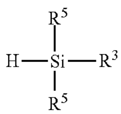

(1-1)

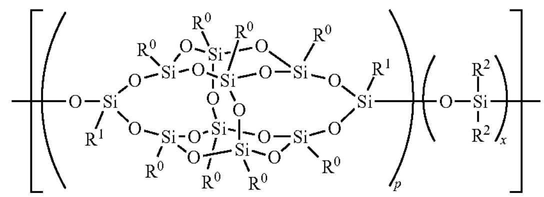

(2)

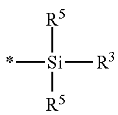

in the above formula, $R^0$'s independently represent an aryl group having 6 to 20 carbon atoms or a cycloalkyl group having 5 to 6 carbon atoms, and in the aryl group having 6 to 20 carbon atoms and the cycloalkyl group having 5 to 6 carbon atoms, any hydrogen atom may be independently substituted with a fluorine atom or an alkyl group having 1 to 20 carbon atoms;

$R^1$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^2$ and $R^5$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^3$ represents a monovalent group having a reactive group;

$R^7$ represents a hydrogen atom, a halogen atom, or an alkoxy group having 1 to 20 carbon atoms;

R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms;

a represents an integer of 3 to 30;

b represents an integer of 1 to 1,000;

p represents an integer of 1 or more;

x represents an integer of 1 to 30;

x' represents an integer of 1 to 30;

g' is 0 or 1;

m represents a number satisfying a weight average molecular weight of 2,000 to 10,000,000; and

* represents a bonding position.

[10] The method of producing a siloxane polymer according to [9], wherein the siloxane polymer is a siloxane polymer represented by Formula (J-1), (J-2) or (J-3):

(J-1)

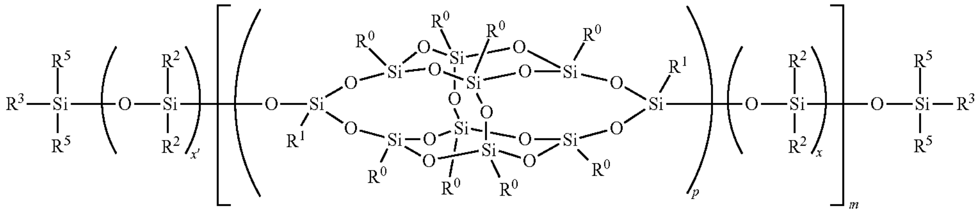

(J-2)

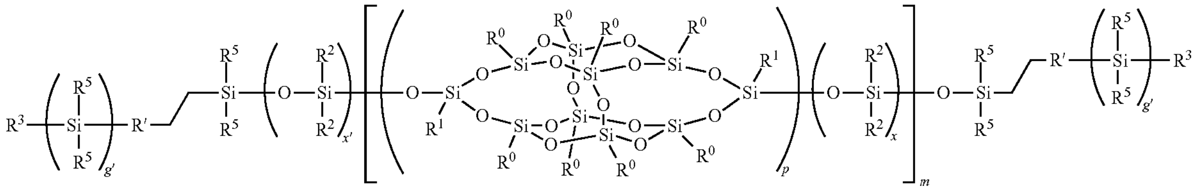

(J-3)

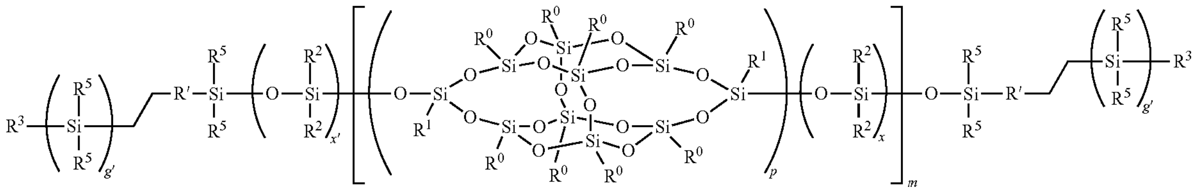

in the above formula, $R^0$ to $R^3$, $R^5$, R', p, x, x', g' and m each are independently defined the same as $R^0$ to $R^3$, $R^5$, R', p, x, x', g' and m in Formulae (a) to (i), (1), and (2).

[11] A method of producing a siloxane polymer containing a repeating unit represented by Formula (1-2), including:

(I): a process of reacting a silicon compound represented by Formula (a) and a silicon compound represented by Formula (b) with a compound having a reactive group and represented by Formula (k); or (II): a process of reacting a silicon compound represented by Formula (a) and a silicon compound represented by Formula (b) with a compound having a reactive group and represented by Formula (l):

(a)

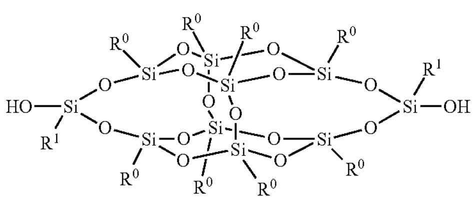

(b)

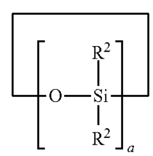

(k)

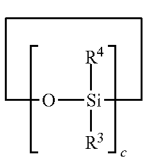

(l)

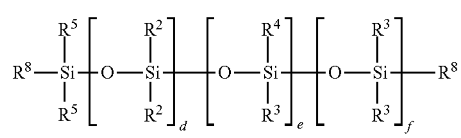

(1-2)

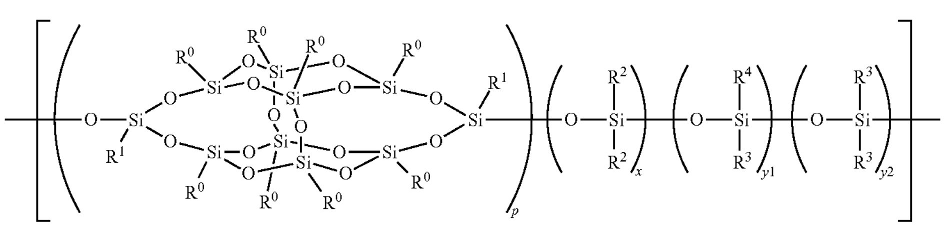

in the above formula, $R^0$'s independently represent an aryl group having 6 to 20 carbon atoms or a cycloalkyl group having 5 to 6 carbon atoms, and in the aryl group having 6 to 20 carbon atoms and the cycloalkyl group having 5 to 6 carbon atoms, any hydrogen atom may be independently substituted with a fluorine atom or an alkyl group having 1 to 20 carbon atoms;

$R^1$ and $R^8$ independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^2$, $R^4$, $R^5$ and $R^6$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^3$ represents a monovalent group having a reactive group;

R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms;

p represents an integer of 1 or more;

x represents an integer of 1 to 30;

y1 and y2 represent an integer of 0 to 30, here, $y1+y2\geq 1$;

a and c represent an integer of 3 to 30; and d, e and f represent an integer of 0 to 1,000, here, $e+\geq 1$.

[12] The method of producing a siloxane polymer according to [11], wherein the siloxane polymer is represented by any of the following Formulae (J-4) to (J-6):

(J-4)

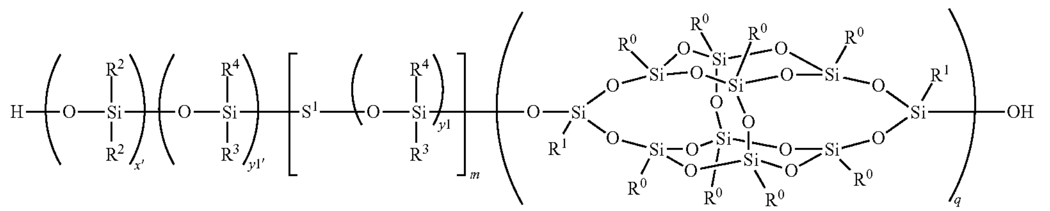

(J-5)

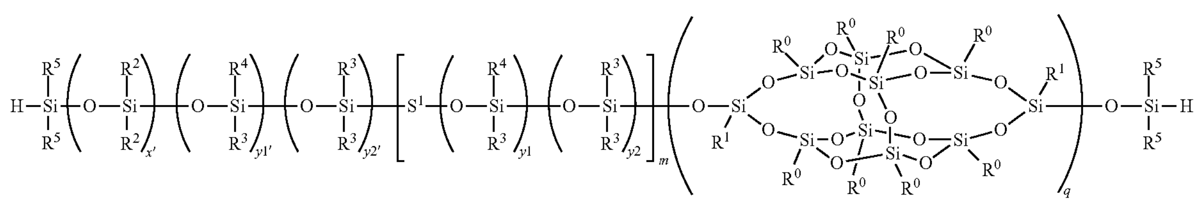

(J-6)

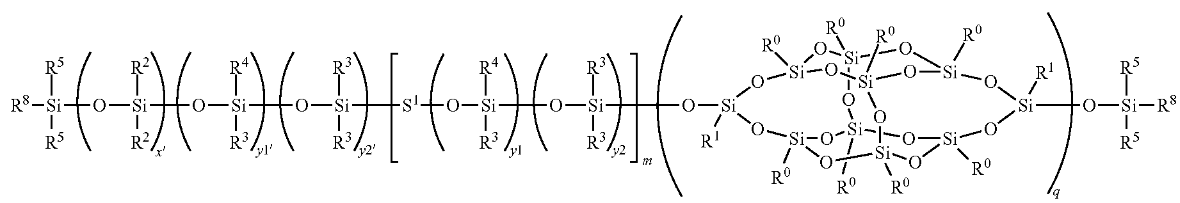

in the above formula, $R^0$ to $R^5$, $R^8$, x, y1 and y2 are each independently defined the same as $R^0$ to $R^5$, $R^8$, x, y1 and y2 in Formulae (a), (b), (k), (l), and (1-2);

$S^1$ is shown below, and in $S^1$, $R^0$ to $R^2$, p, and x are defined the same as $R^0$ to $R^2$, p, and x in Formula (1-2);

q, x', y1' and y2' represent an integer of 0 to 30; and m represents a number satisfying a weight average molecular weight of 2,000 to 10,000,000:

(S¹)

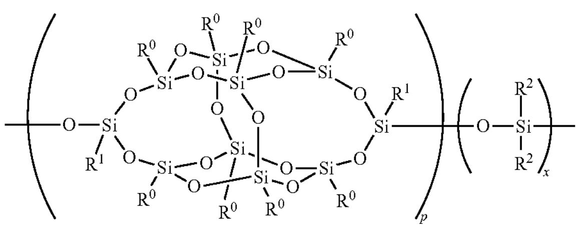

[13] A method of producing a siloxane polymer represented by Formula (J-7), including a process of reacting the siloxane polymer represented by Formula (J-4) according to [12] with a compound represented by Formula (e):

carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; and (e)

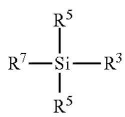

(J-7)

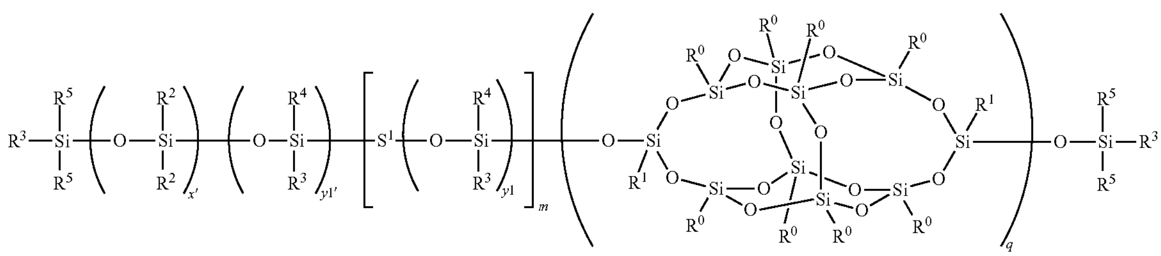

in the above formula, $R^0$ to $R^4$, x', y1, y1', q, m and $S^1$ are each independently defined the same as $R^0$ to $R^4$, x', y1, y1', q, m and $S^1$ in Formula (J-4);

$R^3$ at the terminal in Formula (e) and Formula (J-7) is selected from the groups defined for $R^3$ in Formula (J-4);

$R^5$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms, $R^7$ represents a hydrogen atom, a halogen atom, or an alkoxy group having 1 to 20 carbon atoms.

[14] A method of producing a siloxane polymer represented by Formula (J-8), including:

(I-1): a process of adding and reacting a compound represented by Formula (q) in the above Process (I) according to [11]; or (I-2): a process of reacting the siloxane polymer represented by Formula (J-4) according to [12] with a compound represented by Formula (n):

(q)

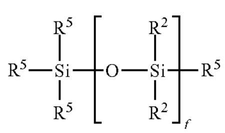

(n)

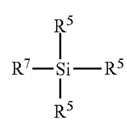

(J-8)

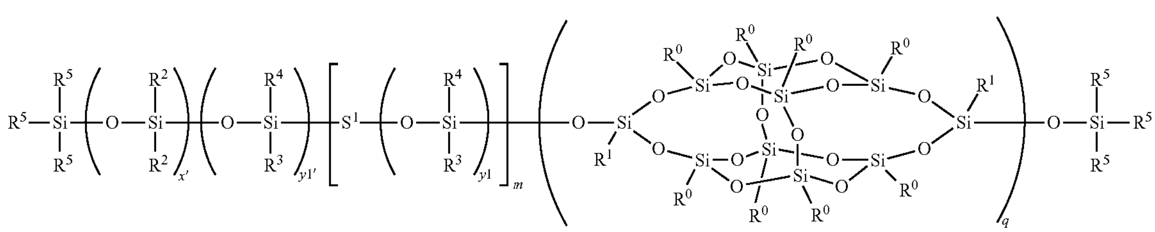

in the above formula, $R^0$ to $R^4$, x', y1, y1', q, m and $S^1$ are each independently defined the same as $R^0$ to $R^4$, x', y1, y1', q, m and $S^1$ in Formulae (a), (b), (k), and (J-4);

$R^5$'s independently represent a hydrogen atom, an aryl group having 6 to 20 carbon atoms, a cycloalkyl group having 5 to 6 carbon atoms, an arylalkyl group having 7 to 40 carbon atoms, alkyl group having 1 to 40 carbon atoms, or an alkoxy group having 1 to 20 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms, in the alkoxy group having 1 to 20 carbon atoms, any hydrogen atom may be independently substituted with a fluorine atom, and any —$CH_2$— may be independently substituted with a cycloalkylene group having 5 to 20 carbon atoms;

$R^7$ represents a hydrogen atom, a halogen atom, or an alkoxy group having 1 to 20 carbon atoms; and f represents an integer of 1 to 1,000.

[15] A method of producing a siloxane polymer represented by Formula (J-9), including:

(I-3): a process of adding and reacting a compound represented by Formula (r) in the above Process (I) according to [11]; or (I-4): a process of reacting the siloxane polymer represented by Formula (J-4) according to [12] with a compound represented by Formula (p):

in the above formula, $R^0$ to $R^4$, x', y1, y1', q, m and $S^1$ are each independently defined the same as $R^0$ to $R^4$, x', y1, y1', q, m and $S^1$ in Formulae (a), (b), (k), and (J-4);

X represents a halogen atom;

$R^5$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; and g represents an integer of 1 to 30.

[16] A method of producing a siloxane polymer represented by Formula (J-10), including a process of reacting the siloxane polymer represented by Formula (J-5) according to [12] with a compound represented by Formula (g):

(r)

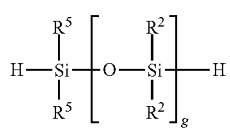

(p)

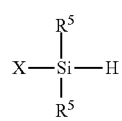

(J-9)

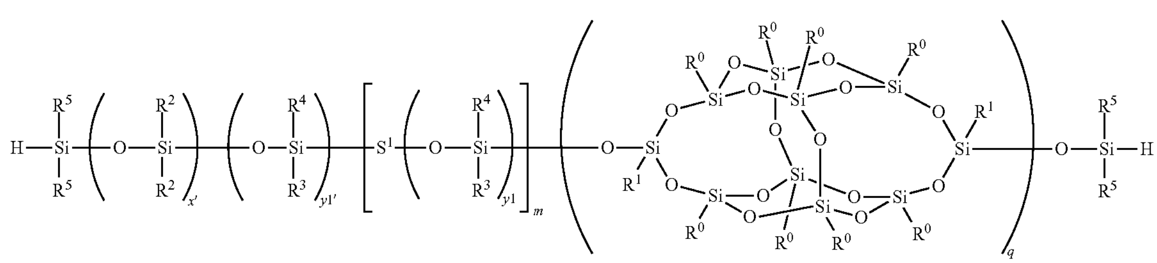

(g)

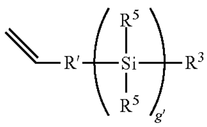

(J-10)

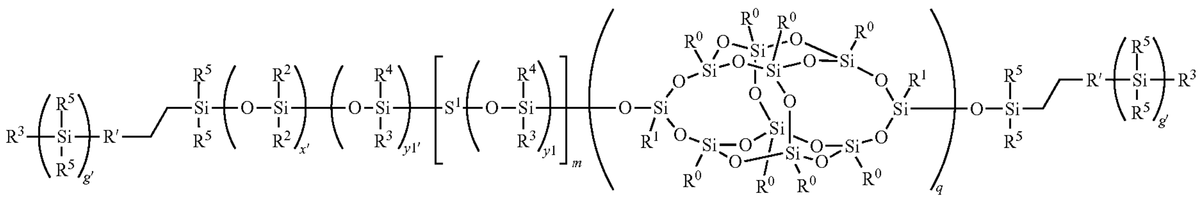

in the above formula, $R^0$ to $R^5$, x', y1, y1', q, m and $S^1$ are each independently defined the same as $R^0$ to $R^4$, x', y1, y1', q, m and $S^1$ in Formula (J-5);

in Formula (g), $R^5$'s are independently selected from the groups defined for $R^5$ in Formula (J-5);

R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms; and g' is 0 or 1.

[17] A method of producing a siloxane polymer represented by Formula (J-11), including a process of reacting the siloxane polymer represented by Formula (J-9) according to [15] with a compound represented by Formula (g):

(III):

(III-1) a process of reacting a silicon compound represented by Formula (a) and a silicon compound represented by Formula (b) with a compound represented by Formula (m); and (III-2) a process of reacting the silicon compound obtained in the above process (III-1) with a compound represented by Formula (g).

(IV):

(IV-1) a process of reacting a silicon compound represented by Formula (a) and a silicon compound represented by Formula (b) with a compound represented by Formula (m);

(IV-2) a process of reacting the silicon compound obtained in the above process (IV-1) with a compound represented by Formula (e); and (g)

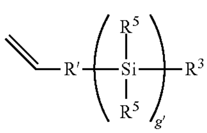

(J-11)

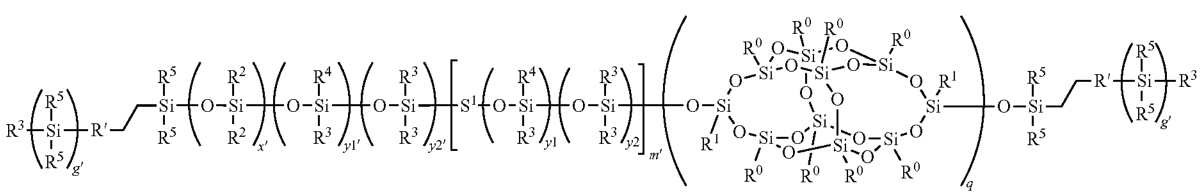

in the above formula, $S^1$, $R^0$ to $R^5$, x', y1, y1', q, m and $S^1$ are each independently defined the same as $S^1$, $R^0$ to $R^5$, x', y1, y1', q, m and $S^1$ in Formula (J-9);

in Formula (g), $R^5$'s are independently selected from the groups defined for $R^5$ in Formula (J-9);

R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms.

[18] A method of producing a siloxane polymer containing a repeating unit represented by Formula (1-3), including any of the following (III) to (VI):

(IV-3) a process of reacting the silicon compound obtained in the above process (IV-2) with a compound represented by Formula (g).

(V):

(IV-1) a process of reacting a silicon compound represented by Formula (a) and a silicon compound represented by Formula (b) with a compound represented by Formula (m);

(IV-2) a process of reacting the silicon compound obtained in the above process (IV-1) with a compound represented by Formula (n); and (IV-3) a process of reacting the silicon compound obtained in the above process (IV-2) with a compound represented by Formula (g).

(VI):

(IV-1) a process of reacting a silicon compound represented by Formula (a) and a silicon compound represented by Formula (b) with a compound represented by Formula (m);

(VI-2) a process of reacting the silicon compound obtained in the process (VI-1) with a compound represented by Formula (p); and (VI-3) a process of reacting the silicon compound obtained in the process (VI-2) with a compound represented by Formula (g):

(a)

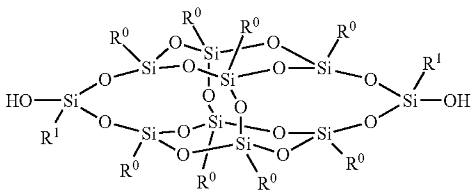

(b)

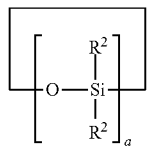

(m)

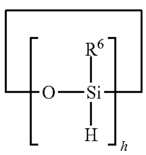

(g)

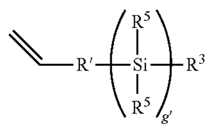

(e)

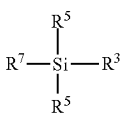

(n)

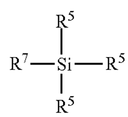

(p)

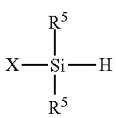

(1-3)

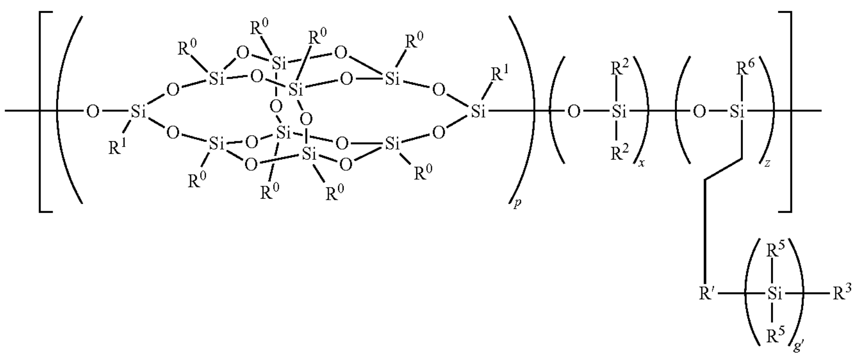

in the above formula, $R^0$'s independently represent an aryl group having 6 to 20 carbon atoms or a cycloalkyl group having 5 to 6 carbon atoms, and in the aryl group having 6 to 20 carbon atoms and the cycloalkyl group having 5 to 6 carbon atoms, any hydrogen atom may be independently substituted with a fluorine atom or an alkyl group having 1 to 20 carbon atoms;

$R^1$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^2$, $R^4$, $R^5$ and $R^6$ independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^3$ represents a monovalent group having a reactive group;

$R^7$ represents a hydrogen atom, a halogen atom, or an alkoxy group having 1 to 20 carbon atoms;

R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms;

a represents an integer of 1 to 30;

b represents an integer of 1 to 1,000; and m represents a number satisfying a weight average molecular weight of 2,000 to 10,000,000.

[19] The method of producing a siloxane polymer according to [18], wherein the siloxane polymer is represented by any of Formulae (J-12) to (J-15):

(J-12)
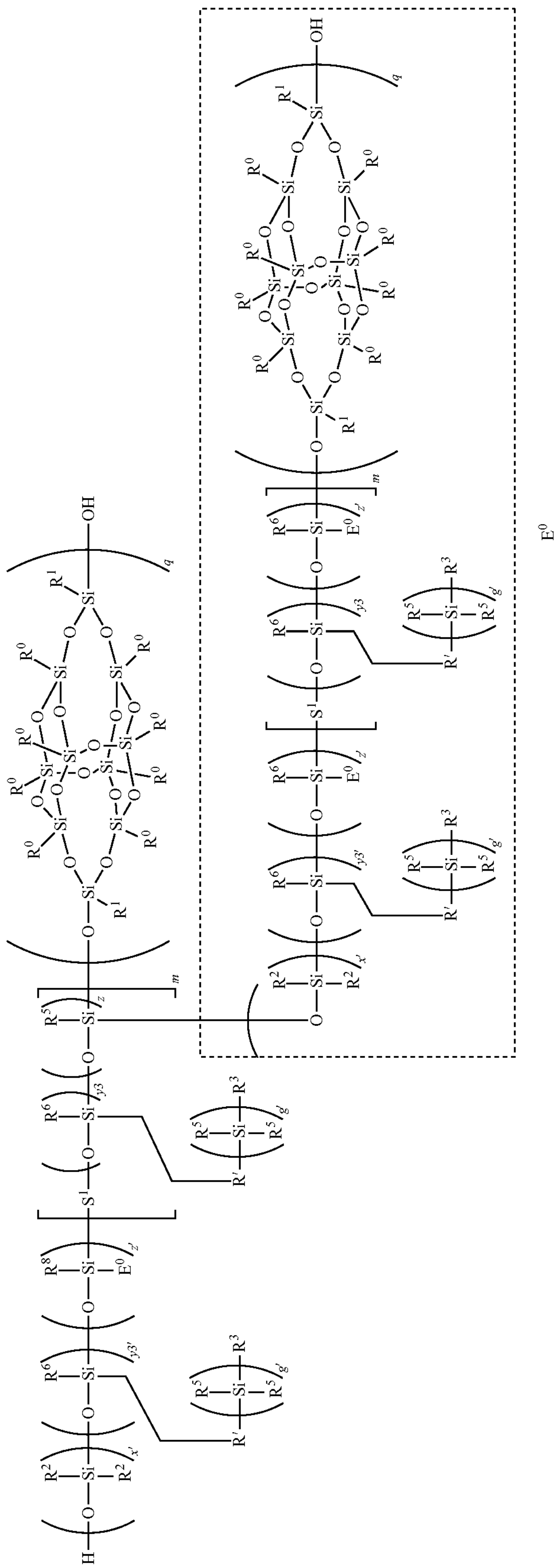

-continued
(J-13)
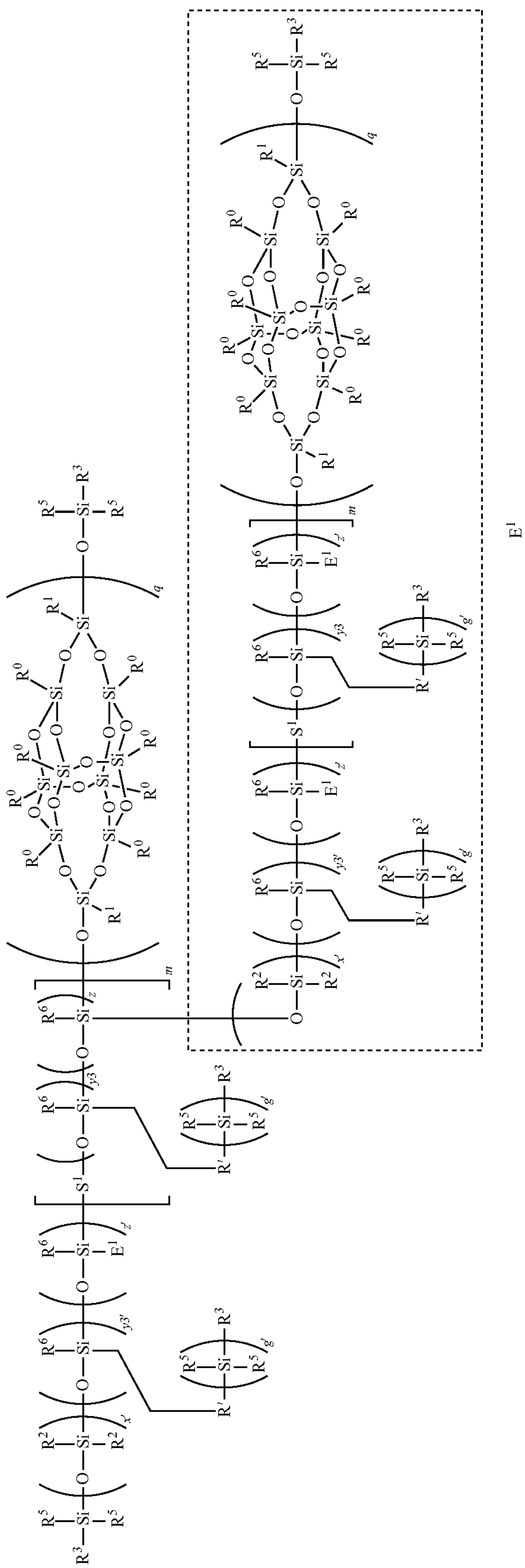

-continued
(J-14)
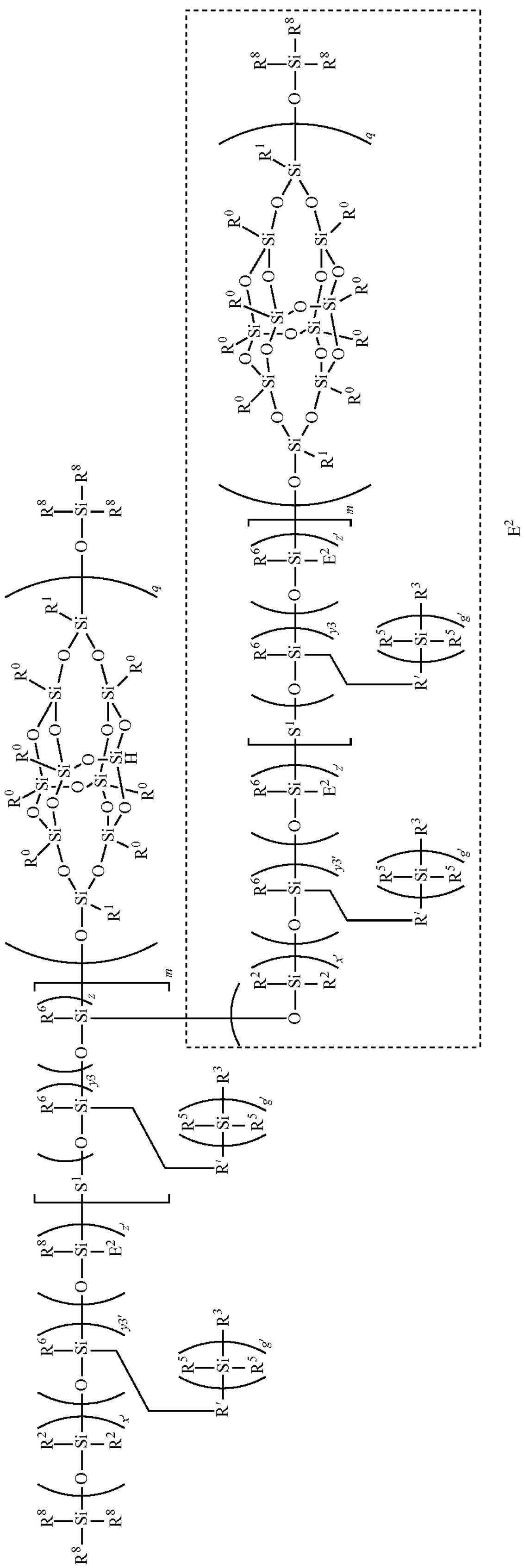

-continued
(J-15)
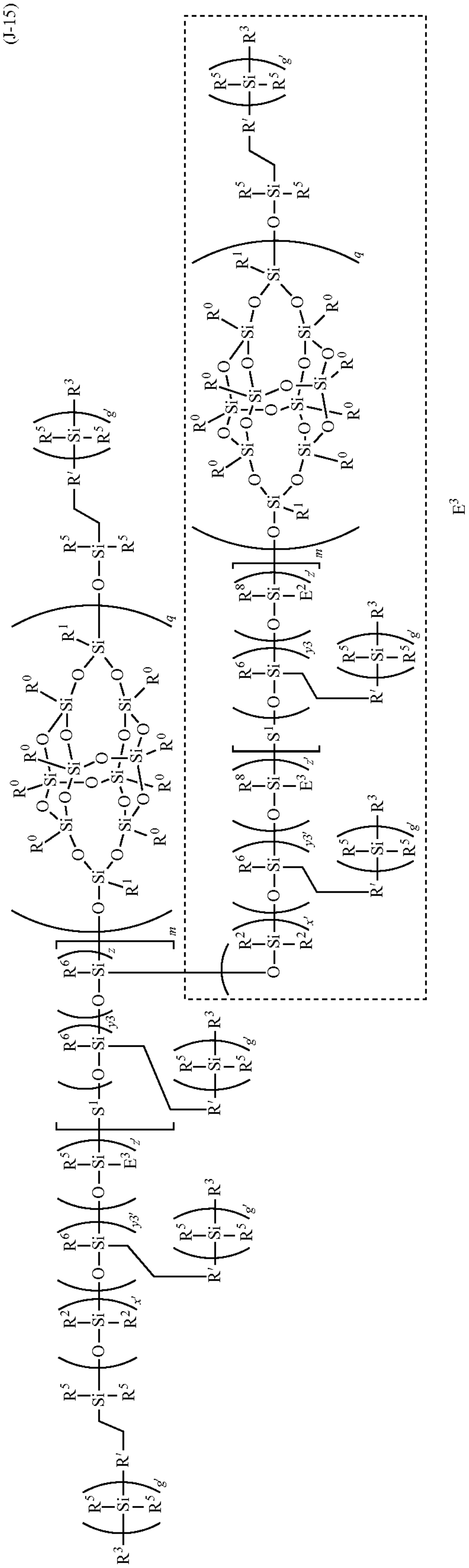
(S1)
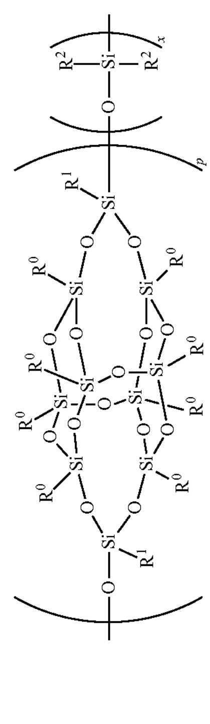

in the above formula, $R^0$, $R^1$, $R^2$, $R^3$, $R^5$, $R^6$, R', x, z, and g' are defined the same as $R^0$, $R^1$, $R^2$, $R^3$, $R^5$, $R^6$, R', x, z, and g' in Formula (1-3); $S^1$ is as described above, in $S^1$, $R^0$ to $R^2$, p, and x are defined the same as $R^0$ to $R^2$, p, and x in Formula (1-3); q, x', y3, y3', and z' represent an integer of 0 to 30; m represents a number satisfying a weight average molecular weight of 2,000 to 10,000,000; E° represents the same structure as a part surrounded by the dashed line in Formula (J-12); $E^1$ represents the same structure as a part surrounded by the dashed line in Formula (J-13); m represents a number satisfying a weight average molecular weight of 2,000 to 10,000,000; $E^2$ represents the same structure as a part surrounded by the dashed line in Formula (J-14); $E^3$ represents the same structure as a part surrounded by the dashed line in Formula (J-14); and m represents a number satisfying a weight average molecular weight of 2,000 to 10,000,000.

According to the disclosure, there are provided a siloxane polymer containing a silsesquioxane unit and a chain siloxane unit in the main chain and having a reactive group and a method of producing the siloxane polymer.

DESCRIPTION OF THE EMBODIMENTS

While embodiments of the disclosure will be described below in detail, the following description includes examples (typical examples) of the embodiments of the disclosure, and the disclosure is not limited to these details. In addition, embodiments of the disclosure can be appropriately combined.

Here, the terms used in this specification are defined as follows. An alkyl group and an alkylene group may be a linear group or a branched group in either case. The same applies to the case in which any hydrogen atom in these groups is substituted with a halogen atom or a cyclic group and the case in which any —$CH_2$— is substituted with —O—, —CH═CH—, cycloalkylene, cycloalkenylene, phenylene or the like. The term "any" used in the disclosure indicates that not only the position but also the number of components is arbitrary. Thus, when there are a plurality of components, they may be substituted with different groups. For example, when two —$CH_2$—'s are substituted with —O— and —CH═CH— in the alkyl group, it indicates an alkoxyalkenyl group or an alkenyloxyalkyl group. Any of alkoxy, alkenylene, alkenyl and alkylene groups in this case may be a linear group or a branch group. However, when it is described that any —$CH_2$— is substituted with —O—, a plurality of consecutive —$CH_2$— are not substituted with —O—. That is, for example, —$CH_2$—$CH_2$— is not substituted with —O—O—.

1. Siloxane Polymer

A siloxane polymer according to one embodiment of the disclosure contains a repeating unit represented by Formula (1), and contains a monovalent group $R^3$ having a reactive group at the side chain and/or terminal of the repeating unit.

(1)

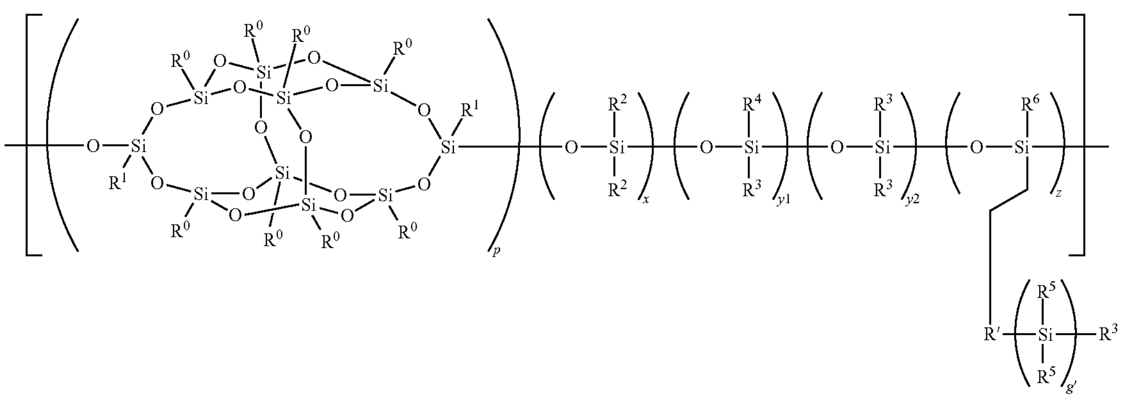

(2)

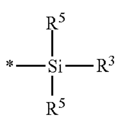

In the above formula, $R^0$'s independently represent an aryl group having 6 to 20 carbon atoms or a cycloalkyl group having 5 to 6 carbon atoms, and in the aryl group having 6 to 20 carbon atoms and the cycloalkyl group having 5 to 6 carbon atoms, any hydrogen atom may be independently substituted with a fluorine atom or an alkyl group having 1 to 20 carbon atoms;

$R^1$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^2$, $R^4$, $R^5$, and $R^6$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^3$ represents a monovalent group having a reactive group, and when there are a plurality of $R^3$'s, they may be the same as or may be different from each other;

p represents an integer of 1 or more;

x represents an integer of 1 to 30;

y1, y2, and z represent an integer of 0 to 30;

g' represents 0 or 1;

* represents a bonding position; and in the case of y1=y2=z=0, at least one terminal is represented by Formula (2).)

($R^0$)

$R^0$'s independently represent an aryl group having 6 to 20 carbon atoms or a cycloalkyl group having 5 to 6 carbon atoms.

Examples of aryl groups having 6 to 20 carbon atoms include phenyl, naphthyl, anthryl, phenanthryl, triphenylene, pyrenyl, chrysenyl, naphthacenyl, and pyrenyl. Among these, phenyl, naphthyl, anthryl, and phenanthryl are preferable, and phenyl, naphthyl and anthryl are more preferable.

Examples of a cycloalkyl group having 5 to 6 carbon atoms include cyclopentyl and cyclohexyl.

In the aryl group having 6 to 20 carbon atoms and the cycloalkyl group having 5 to 6 carbon atoms, any hydrogen atom may be independently substituted with a fluorine atom or an alkyl group having 1 to 20 carbon atoms.

$R^0$ is preferably phenyl or cyclohexyl.

($R^1$)

$R^1$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms. Examples of an aryl group having 6 to 20 carbon atoms and a cycloalkyl group having 5 to 6 carbon atoms include those described for $R^0$.

Examples of arylalkyl groups having 7 to 40 carbon atoms include benzyl, phenethyl, diphenylmethyl, triphenylmethyl, 1-naphthylmethyl, 2-naphthylmethyl, 2,2-diphenylethyl, 3-phenylpropyl, 4-phenylbutyl, and 5-phenylpentyl.

Examples of alkyl groups having 1 to 40 carbon atoms include methyl, ethyl, n-propyl, iso-propyl, n-butyl, sec-butyl, iso-butyl, tert-butyl, n-pentyl, sec-pentyl, iso-pentyl, tert-pentyl, neopentyl, hexyl, heptyl, octyl, nonyl, dodecyl, and octadecyl.

In the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms.

$R^1$ is preferably selected from among a hydrogen atom, a phenyl group, a cyclohexyl group, and an alkyl group having 1 to 5 carbon atoms, and more preferably selected from among alkyl groups having 1 to 5 carbon atoms.

($R^2$, $R^4$, $R^5$, $R^6$)

$R^2$, $R^4$, $R^5$, and $R^6$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms.

Examples of an aryl group having 6 to 20 carbon atoms and a cycloalkyl group having 5 to 6 carbon atoms include those described for $R^0$.

Examples of an arylalkyl group having 7 to 40 carbon atoms include those described for $R^1$.

Examples of an alkyl group having 1 to 40 carbon atoms include those described for $R^1$.

In the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms.

$R^2$, $R^4$, $R^5$, and $R^6$ are preferably selected from among a phenyl group, a cyclohexyl group, and an alkyl group having 1 to 5 carbon atoms, and more preferably selected from among alkyl groups having 1 to 5 carbon atoms.

($R^3$)

$R^3$ represents a monovalent group having a reactive group.

In this specification, the reactive group means, for example, a group that can perform some reactions such as a functional group that can perform an addition reaction and a functional group that can perform a condensation reaction, and more specifically, not only a group that performs a reaction in which another substance is produced such as a functional group that can perform a dimerization reaction by light emission or a photo-crosslinking reaction, a functional group that can perform a thermal polymerization reaction by heat, and a group that can perform a reaction due to the action of an acid, but also a group that can perform some reactions such as a group that can perform an adsorption reaction.

Examples of functional groups that can perform an addition reaction include (meth)acryloyl and allyl groups which can be radically polymerized; rings having a hetero atom such as cyclic ethers such as epoxy, tetrahydrofuran, and 1,3-dioxolane, and cyclic iminoethers such as cyclic amine, cyclic sulfide, and 2-oxazoline, which can be cationically polymerized; vinyl ether; and the like.

Examples of functional groups that can perform a condensation reaction include thiol (—SH), amino (—$NH_2$), amide, isocyanate (—NCO), cyano (—CN), isothiocyanate (—SCN), carboxyl (—COOH), epoxy, an acid anhydride, and sulfonyl.

Specific examples of reactive groups include —F, —Cl, —Br, —$CF_3$, perfluoroalkyl, alkoxy, (meth)acryloyl, (meth) acryloyloxy, —COOH, an acid anhydride, polyalkyleneoxy, ester, epoxy, an oxetane ring, —$NH_2$, —CN, —NCO, amide, an alkenyl group having 3 or more carbon atoms, cycloalkenyl, —SH, and —$PH_2$.

In one embodiment of the disclosure, the reactive group is preferably a cationic polymerizable group. The cationic polymerizable group is preferable because it can be photopolymerized as well as thermally polymerized. Among these, a cationic polymerizable group having a structure represented by the following Formulae (b-1) to (b-5) is preferable. In Formulae (b-1) to (b-3), and (b-5), the tip of one wave line represents any group, and the tip of one wave line is bonded to Si in the main chain or the side chain of a siloxane polymer containing a repeating unit represented by Formula (1) via any group. In Formula (b-4), the tip of the wave line is bonded to Si in the main chain or the side chain of the siloxane polymer containing a repeating unit represented by Formula (1) via any group.

(b-1)

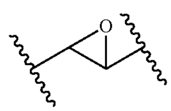

(b-2)

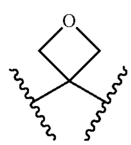

(b-3)

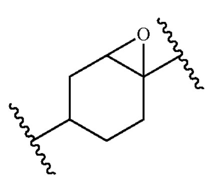

(b-4)

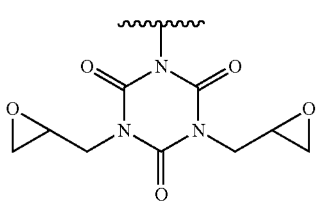

(b-5)

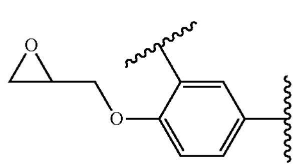

In one embodiment of the disclosure, the reactive group is preferably at least one selected from the group consisting of —F, —Cl, —Br, —$CF_3$, perfluoroalkyl, alkoxy, (meth) acryloyl, (meth)acryloyloxy, —COOH, an acid anhydride, polyalkyleneoxy, ester, epoxy, an oxetane ring, phenoxy, —$NH_2$, —CN, —NCO, an alkenyl group having 3 or more carbon atoms, cycloalkenyl, —SH, and —$PH_2$. Among these, in consideration of compatibility with other resins such as a general-purpose resin when used as a composition and crosslink reactivity, the reactive group is preferably epoxy, an oxetane ring, (meth)acryloyl, (meth)acryloyloxy, —NCO, —CN, or an acid anhydride.

In one embodiment of the disclosure, $R^3$ is preferably selected from the group shown below.

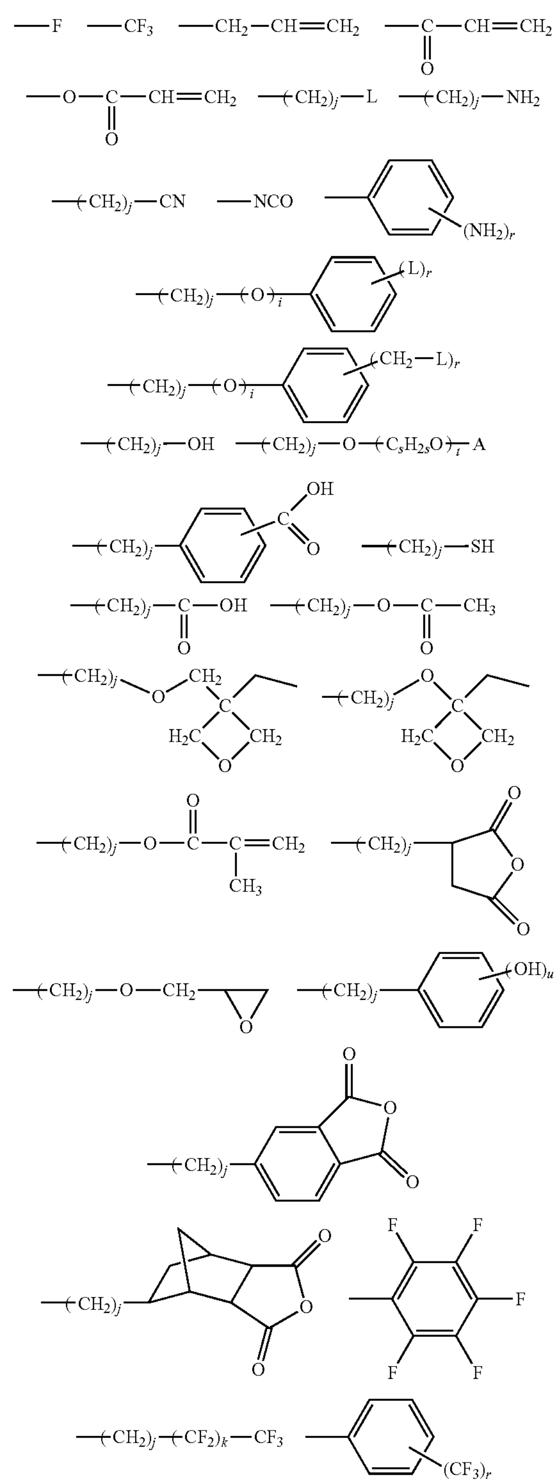

-continued

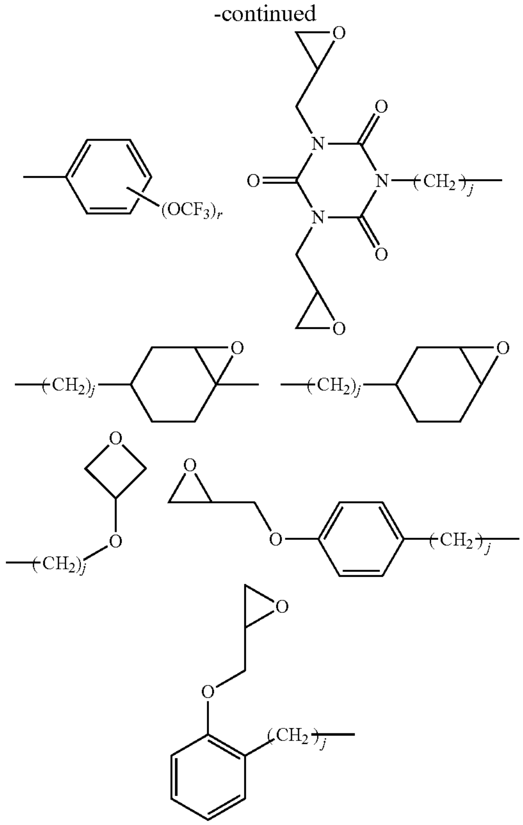

In the above formula, i is 0 or 1; j is an integer of 2 to 4; k is an integer of 0 to 15; L is a fluorine atom, r is an integer of 1 to 5; s is an integer of 2 or 3, t is an integer of 2 to 200; u is an integer of 1 to 3; and A is a hydrogen atom or an alkyl group having 1 to 4 carbon atoms. Here, the bonding positions of -L, —$CH_2$-L, —OH, —COOH, —$CF_3$ and —$OCF_3$ on the benzene ring are arbitrary.

When the reactive group is a hydroxy group (—OH), for example, it can react with a carboxylic acid anhydride and a compound having an isocyanate (—NCO) group. When the reactive group is an isocyanate group, it can react with a compound having a functional group that can perform an addition reaction or a condensation reaction, for example, a hydroxy group, an amino (—$NH_2$) group, or a thiol (—SH) group. Specifically, wear resistance, scratch resistance, and self-recovering ability are expected to be imparted by formation of a urethane bond according to a reaction of an isocyanate group and a hydroxy group. In addition, wear resistance, scratch resistance, and self-recovering ability are expected to be imparted by formation of a urea bond according to a reaction of an isocyanate group and an amino group. When the reactive group is an amino group, for example, it is expected to be applied to a highly durable paint according to a thermosetting reaction with an epoxy resin. In addition, when the reactive group is an acid anhydride, it forms an imide bond with an amine, and improvement in thermal characteristics and mechanical characteristics and improvement in coefficient of thermal expansion are expected. When the reactive group is an epoxy group, for example, it can be reacted with a compound having an amino group, a chloro group, or a carboxylic acid anhydride. In addition, when the reactive group is an epoxy group or an oxetane ring, it has a thermal-cationic polymerizable property and photocationic property, and flexibility and stress relaxation ability are expected to be imparted to a cured product or a film. When the reactive group is a (meth)acrylic group, it has a thermal radical property and a photoradical polymerizable property and flexibility and heat resistance are expected to be imparted to a cured product or a film. When the reactive group is a carboxyl (—COOH) group, its adsorption ability can be used in addition to its chemical reactivity. When the reactive group is a thiol group, thiolene curing by light emission, application to click chemistry, and application to a transparent flexible film are expected. When the reactive group is a halogen atom, it has high reactivity and various chemical reactions can be caused. In this manner, a new siloxane polymer can be synthesized from a siloxane polymer into which a desired reactive group is introduced and used depending on the application and purpose.

(p)

p represents an integer of 1 or more. In consideration of production, it is preferably 1 or more and 3000 or less, and more preferably 1 or more and 300 or less.

(g')

g' represents 0 or 1. When g' is 0, the monovalent organic group $R^3$ having a reactive group is bonded to the alkylene R' instead of the Si atom.

(x)

x represents an integer of 1 to 30. In consideration of production and handling properties, it is preferably 1 or more and 20 or less, and more preferably 1 or more and 8 or less.

(y1, y2, z)

y1, y2, and z represent an integer of 0 to 30.

A siloxane polymer containing a repeating unit represented by Formula (1) contains a monovalent group $R^3$ containing a reactive group at the terminal or in the side chain, or both at the terminal and in the side chain. In the case of y1=y2=z=0, at least one terminal is represented by Formula (2). That is, the siloxane polymer does not have a reactive group in the side chain, but has a reactive group only at the terminal.

In the siloxane polymer according to one embodiment of the disclosure, physical properties of the siloxane polymer can be changed by changing the numbers of y1, y2, and z. The type and number of reactive groups in the siloxane polymer containing a repeating unit represented by Formula (1) can be appropriately determined according to desired physical properties and applications of the siloxane polymer obtained by reacting the reactive groups. For example, the number of reactive groups is preferably 1 to 60, more preferably 1 to 30, and still more preferably 1 to 16 with respect to a molecular weight of 10,000 in order to improve the structural stability of the siloxane polymer. In one embodiment of the disclosure, it is preferable that y1, y2 or z be 1 or more, and also it is preferable that y1, y2 or z be 1 or more, and the group represented by Formula (2) being contained as the terminal. When a plurality of reactive groups are introduced, crosslinking becomes easier and the polymer becomes stronger.

The weight average molecular weight of the siloxane polymer containing a repeating unit represented by Formula (1) is not particularly limited, and it is preferably 2,000 to 10,000,000, and more preferably 10,000 to 1,000,000. As will be described in the following examples, the weight average molecular weight is determined by calculating a chromatogram obtained by gel permeation chromatography (GPC) from a calibration curve obtained with a molecular weight standard sample.

<Siloxane Polymers Represented by Formulae (1-1) to (1-3)>

Examples of siloxane polymers containing a repeating unit represented by Formula (1) include a siloxane polymer containing a repeating unit represented by Formula (1-1) and a group represented by Formula (2) as terminals, a siloxane polymer containing a repeating unit represented by Formula (1-2), and a siloxane polymer containing a repeating unit represented by Formula (1-3).

(1-1)

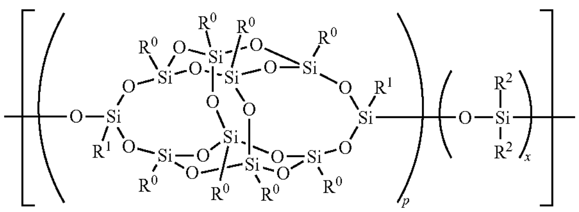

(2)

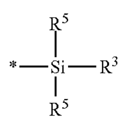

In Formula (1-1), $R^0$, $R^1$, $R^2$, p, and x are defined the same as $R^0$, $R^1$, $R^2$, p, and x in Formula (1), and $R^3$, $R^5$, and * are described above.

(1-2)

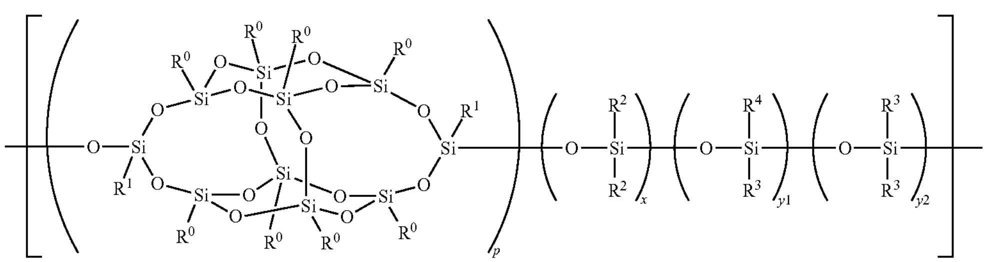

In Formula (1-2), $R^0$, $R^1$, $R^2$, $R^3$, $R^4$, p, x, y1, and y2 are defined the same as $R^0$, $R^1$, $R^2$, $R^3$, $R^4$, p, x, y1, and y2 in Formula (1). Here, y1+y2 is 1 or more.

(1-3)

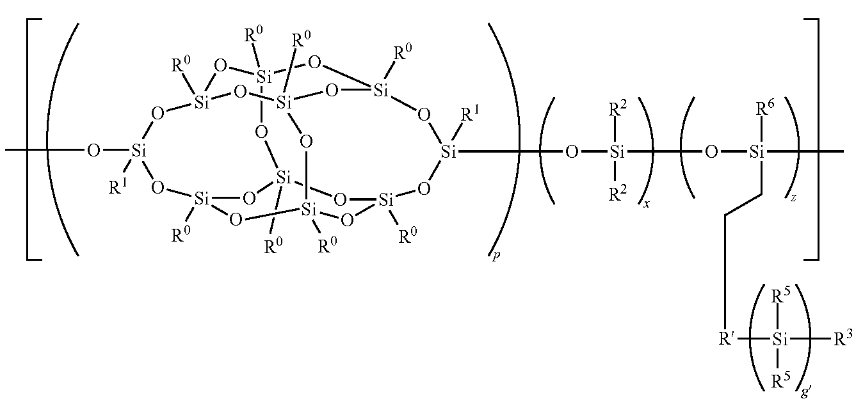

In Formula (1-3), $R^0$, $R^2$, $R^3$, $R^5$, $R^6$, R', p, x, z, and g' are defined the same as $R^0$, $R^1$, $R^2$, $R^3$, $R^5$, $R^6$, R', p, x, z, g' in Formula (1). Here, z is 1 or more.

<Siloxane Polymers Represented by Formulae (J-1) to (J-3)>

Preferable examples of a siloxane polymer containing a repeating unit represented by Formula (1-1) and a group represented by Formula (2) as terminals include siloxane polymers represented by the following Formulae (J-1) to (J-3).

Siloxane Polymer Represented by Formula (J-1)

(J-1)

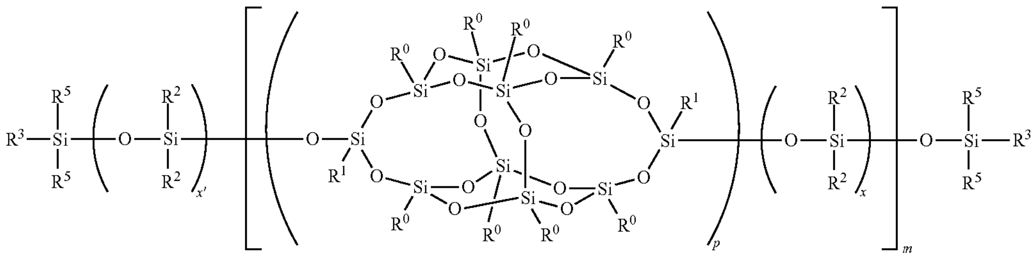

In the above formula, $R^0$, $R^1$, $R^2$, p, and x are defined the same as $R^0$, $R^1$, $R^2$, p, and x in Formula (1-1); $R^3$ and $R^5$ are the same as $R^3$ and $R^5$ in Formula (2); x' represents an integer of 0 to 30; and m represents a number satisfying a weight average molecular weight of 2,000 to 10,000,000.

Siloxane Polymer Represented by Formula (J-2)

(J-2)

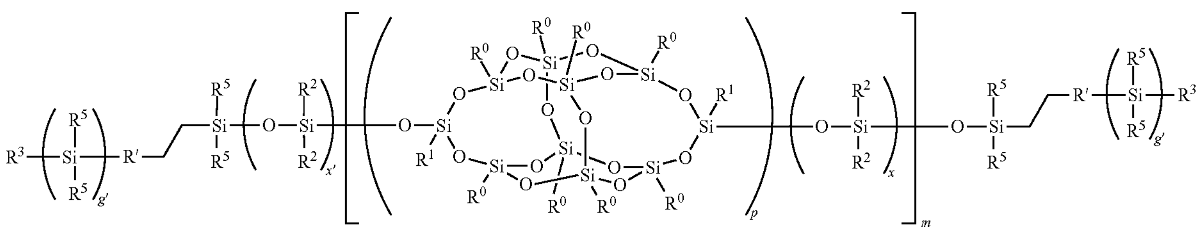

In the above formula, $R^0$, $R^1$, $R^2$, p, and x are defined the same as $R^0$, $R^1$, $R^2$, p, and x in Formula (1-1); $R^3$ and $R^5$ are defined the same as $R^3$ and $R^5$ in Formula (2); R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms; x' represents an integer of 0 to 30; g' represents 0 or 1; and m represents a number satisfying a weight average molecular weight of 2,000 to 10,000,000.

Siloxane Polymer Represented by Formula (J-3)

(J-3)

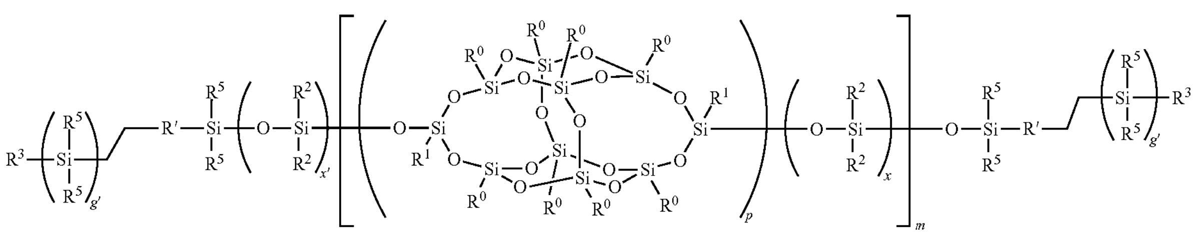

In the above formula, $R^0$, $R^1$, $R^2$, p, and x are defined the same as $R^0$, $R^1$, $R^2$, p, and x in Formula (1-1); $R^3$ and $R^5$ are defined the same as $R^3$ and $R^5$ in Formula (2); R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms; x' represents an integer of 0 to 30; g' represents 0 or 1; and m represents a number satisfying a weight average molecular weight of 2,000 to 10,000,000.

Here, in Formula (J-2) and Formula (J-3), since R' represents an alkylene group having 1 to 40 carbon atoms, siloxane polymers represented by Formula (J-2) and Formula (J-3) are siloxane polymers having substantially the same structure. This is because, as will be described below, the siloxane polymer represented by Formula (J-2) represents a structure of a siloxane polymer obtained when a compound represented by Formula (g) and a compound represented by Formula (f) are subjected to a hydrosilylation reaction; and the siloxane polymer represented by Formula (J-3) represents a structure of a siloxane polymer obtained when a compound represented by Formula (i) and a compound represented by Formula (h) are subjected to a hydrosilylation reaction, that is, the siloxane polymers represented by Formula (J-2) and Formula (J-3) adopt an expression method reflecting structures of respective raw materials.

<Siloxane Polymers Represented by Formulae (J-4) to (J-11)>

Preferable examples of a siloxane polymer containing a repeating unit represented by Formula (1-2) include siloxane polymers represented by the following Formulae (J-4) to (J-11). In Formulae (J-4) to (J-15), $S^1$ is shown below.

($S^1$)

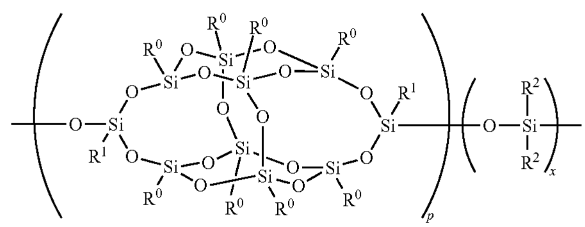

In the above formula, $R^0$ to $R^2$, p, and x are defined the same as $R^0$ to $R^2$, p, and x in Formula (1-2).

Siloxane Polymer Represented by Formula (J-4)

(J-4)

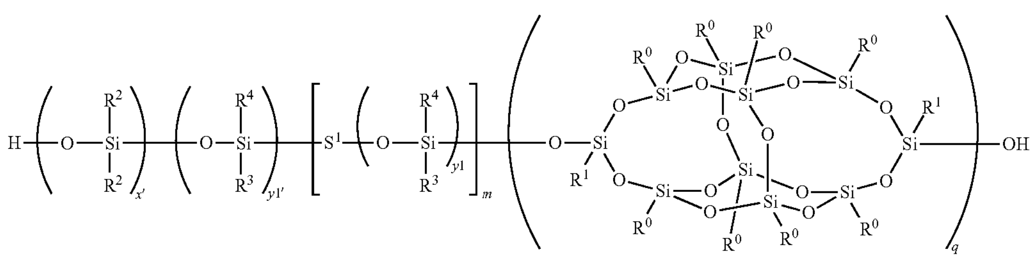

In the above formula, $R^0$ to $R^4$, and y1 are defined the same as $R^0$ to $R^4$, and y1 in Formula (1-2); $S^1$ is as described above; q, x', and y1' represent an integer of 0 to 30; and m represents a number satisfying a weight average molecular weight of 2,000 to 10,000,000.

Siloxane Polymer Represented by Formula (J-5)

(J-5)

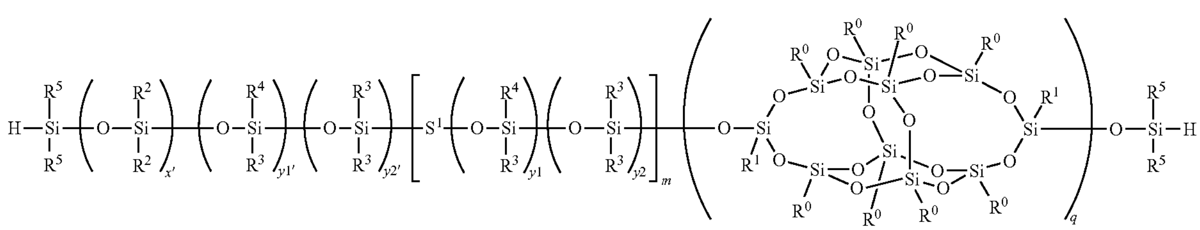

In the above formula, $R^0$ to $R^4$, y1, and y2 are defined the same as $R^0$ to $R^4$, y1, and y2 in Formula (1-2); $R^5$'s independently represent an aryl group having 6 to 20 carbon atoms, a cycloalkyl group having 5 to 6 carbon atoms, an arylalkyl group having 7 to 40 carbon atoms, an alkyl group having 1 to 40 carbon atoms, or an alkoxy group having 1 to 20 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms, in the alkoxy group having 1 to 20 carbon atoms, any hydrogen atom may be independently substituted with a fluorine atom, and any —$CH_2$— may be independently substituted with a cycloalkylene group having 5 to 20 carbon atoms; $S^1$ is defined as described above; q, x', y1', and y2' represent an integer of 0 to 30; m represents a number satisfying a weight average molecular weight of 2,000 to 10,000,000.

Siloxane Polymer Represented by Formula (J-6)

atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms, in the alkoxy group having 1 to 20 carbon atoms, any hydrogen atom may be independently substituted with a fluorine atom, and any —$CH_2$— may be independently substituted with a cycloalkylene group having 5 to 20 carbon atoms; $R^8$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with (J-6)

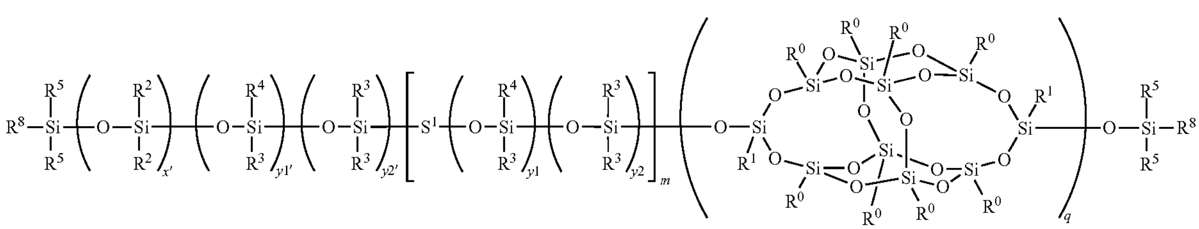

In the above formula, $R^0$ to $R^4$, y1, and y2 are defined the same as $R^0$ to $R^4$, y1, and y2 in Formula (1-2); $R^5$'s independently represent an aryl group having 6 to 20 carbon atoms, a cycloalkyl group having 5 to 6 carbon atoms, an arylalkyl group having 7 to 40 carbon atoms, an alkyl group having 1 to 40 carbon atoms, or an alkoxy group having 1 to 20 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; $S^1$ is as described above; q, x', y1', and y2' represent an integer of 0 to 30; m represents a number satisfying a weight average molecular weight of 2,000 to 10,000,000.

Siloxane Polymer Represented by Formula (J-7)

(J-7)

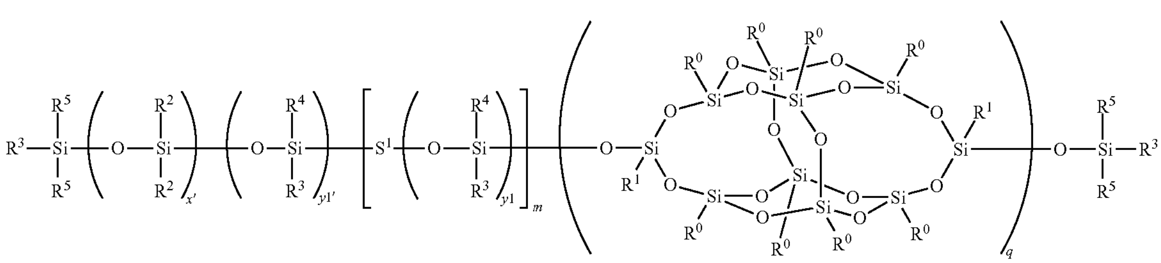

In the above formula, $R^0$ to $R^4$, and y1 are defined the same as $R^0$ to $R^4$, and y1 in Formula (1-2); $R^5$ is defined the same as $R^5$ in Formula (2); $S^1$ is defined as described above; q, x', and y1' represent an integer of 0 to 30; and m represents a number satisfying a weight average molecular weight of 2,000 to 10,000,000.

Siloxane Polymer Represented by Formula (J-8)

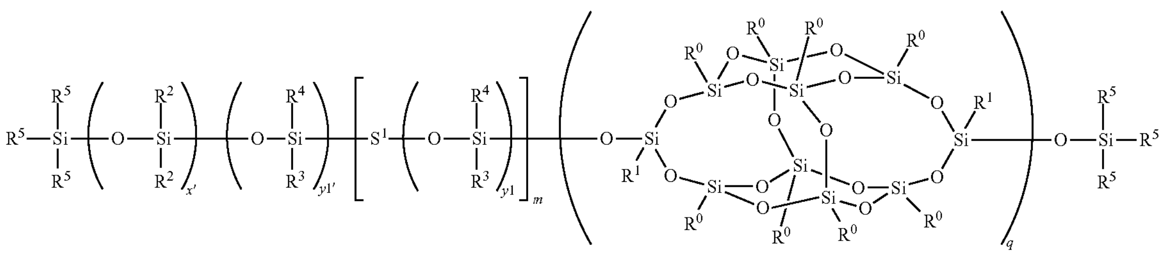

(J-8)

In the above formula, $R^0$ to $R^4$, and y1 are defined the same as $R^0$ to $R^4$, and y1 in Formula (1-2); $R^5$'s independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; $S^1$ is defined as described above; q, x', and y1' represent an integer of 0 to 30; and m represents a number satisfying a weight average molecular weight of 2,000 to 10,000,000.

Siloxane Polymer Represented by Formula (J-9)

In the above formula, $R^0$ to $R^4$, and y1 are defined the same as $R^0$ to $R^4$, and y1 in Formula (1-2); $R^5$'s independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; $S^1$ is defined as described above; q, x', and y1' represent an integer of 0 to 30; and m represents a number satisfying a weight average molecular weight of 2,000 to 10,000,000.

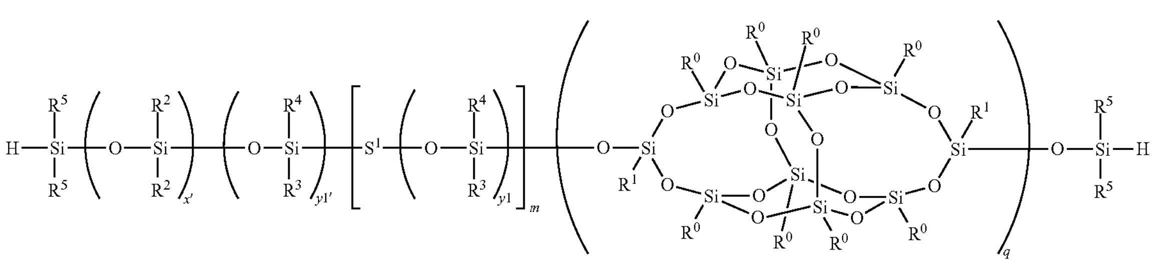

(J-9)

Siloxane Polymer Represented by Formula (J-10)

(J-10)

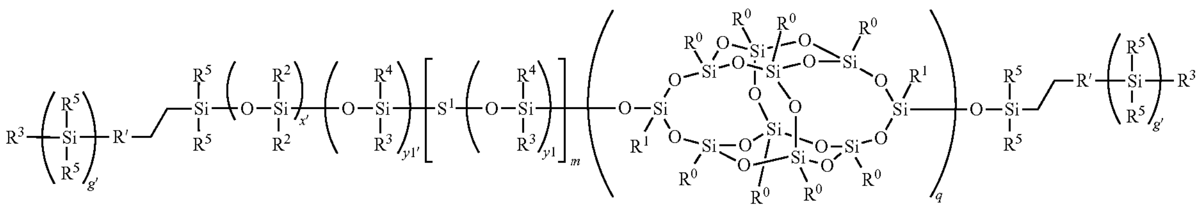

In the above formula, $R^0$ to $R^4$, and y1 are defined the same as $R^0$ to $R^4$, and y1 in Formula (1-2); $R^5$ is defined the same as $R^5$ in Formula (2); R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms; $S^1$ is defined as described above; q, x', and y1' represent an integer of 0 to 30; g' is 0 or 1; and m represents a number satisfying a weight average molecular weight of 2,000 to 10,000,000.

Siloxane Polymer Represented by Formula (J-11)

(J-11)

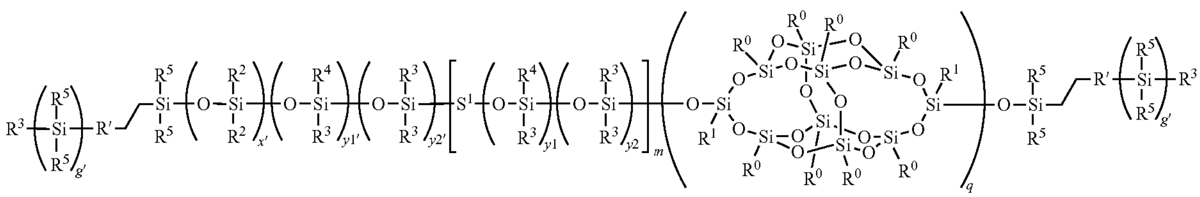

In the above formula, $R^0$ to $R^4$, y1, and y2 are defined the same as $R^0$ to $R^4$, y1, and y2 in Formula (1-2); $R^5$ is defined the same as $R^5$ in Formula (2); R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms; $S^1$ is defined as described above; q, x', y1', and y2' represent an integer of 0 to 30; g' is 0 or 1; and m represents a number satisfying a weight average molecular weight of 2,000 to 10,000,000.

<Siloxane Polymers Represented by Formulae (J-12) to (J-15)>

The disclosure also provides a siloxane polymer in which a monovalent group having a reactive group $R^3$ is introduced into a branch. Examples of such a siloxane polymer include siloxane polymers represented by Formulae (J-12) to (J-15).

Siloxane Polymer Represented by Formula (J-12)

(J-12)
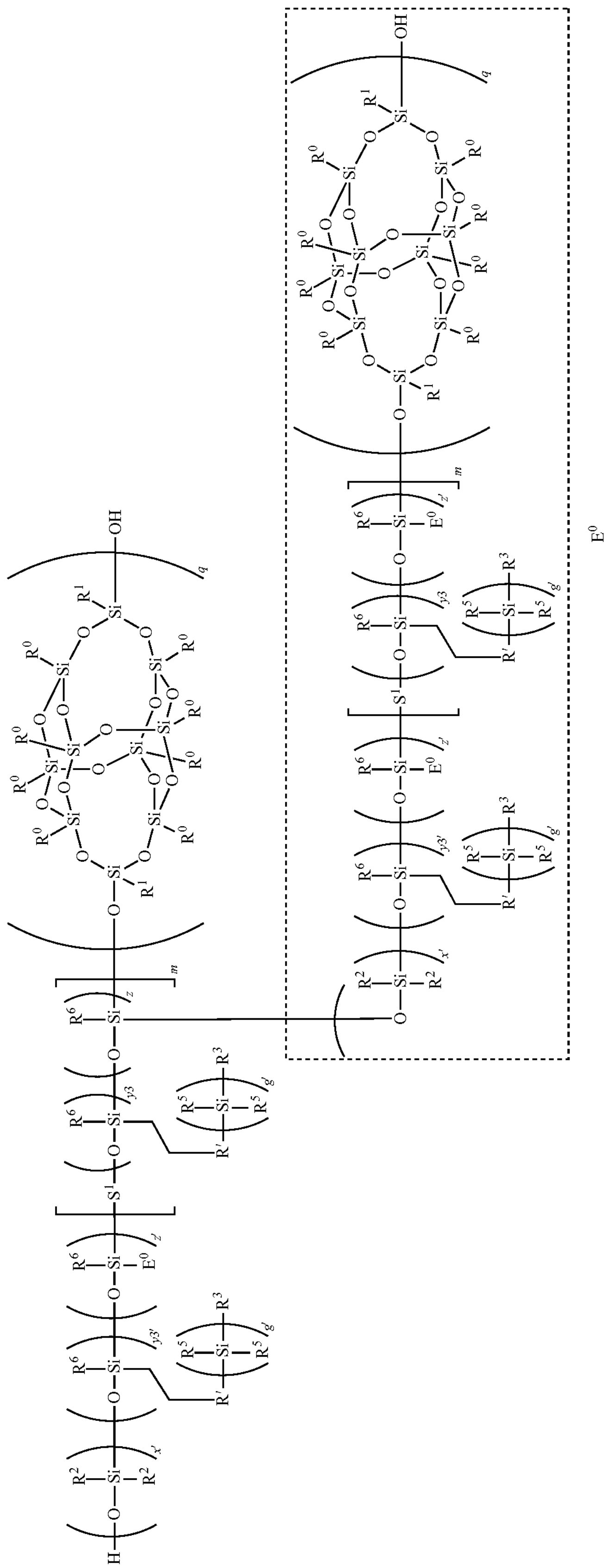

In the above formula, $R^0$, $R^1$, $R^2$, $R^3$, $R^5$, $R^6$, R', x, z, and g' are the same as $R^0$, $R^1$, $R^2$, $R^3$, $R^5$, $R^6$, R', x, z, and g' in Formula (1-3); $S^1$ is defined as described above; q, x', y3, y3', and z' represent an integer of 0 to 30; E° represents the same structure as a part surrounded by the dashed line in Formula (J-12); and m represents a number satisfying a weight average molecular weight of 2,000 to 10,000,000.

Siloxane Polymer Represented by Formula (J-13)

(J-13)
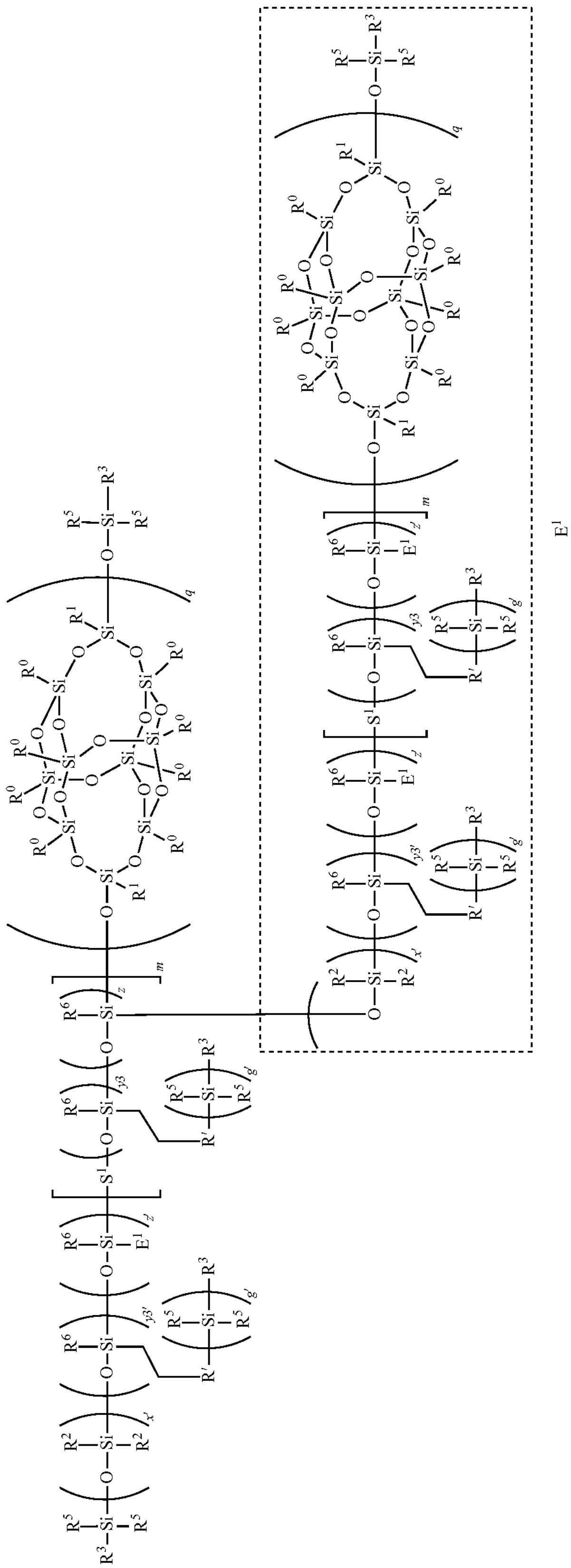

In the above formula, $R^0$, $R^1$, $R^2$, $R^3$, $R^5$, $R^6$, R', x, z, and g' are defined the same as $R^0$, $R^1$, $R^2$, $R^3$, $R^5$, $R^6$, R', p, x, z, and g' in Formula (1-3); $S^1$ is defined as described above; q, x', y3, y3', and z' represent an integer of 0 to 30; $E^1$ represents the same structure as a part surrounded by the dashed line in Formula (J-13); and m represents a number satisfying a weight average molecular weight of 2,000 to 10,000,000.

Siloxane Polymer Represented by Formula (J-14)

(J-14)
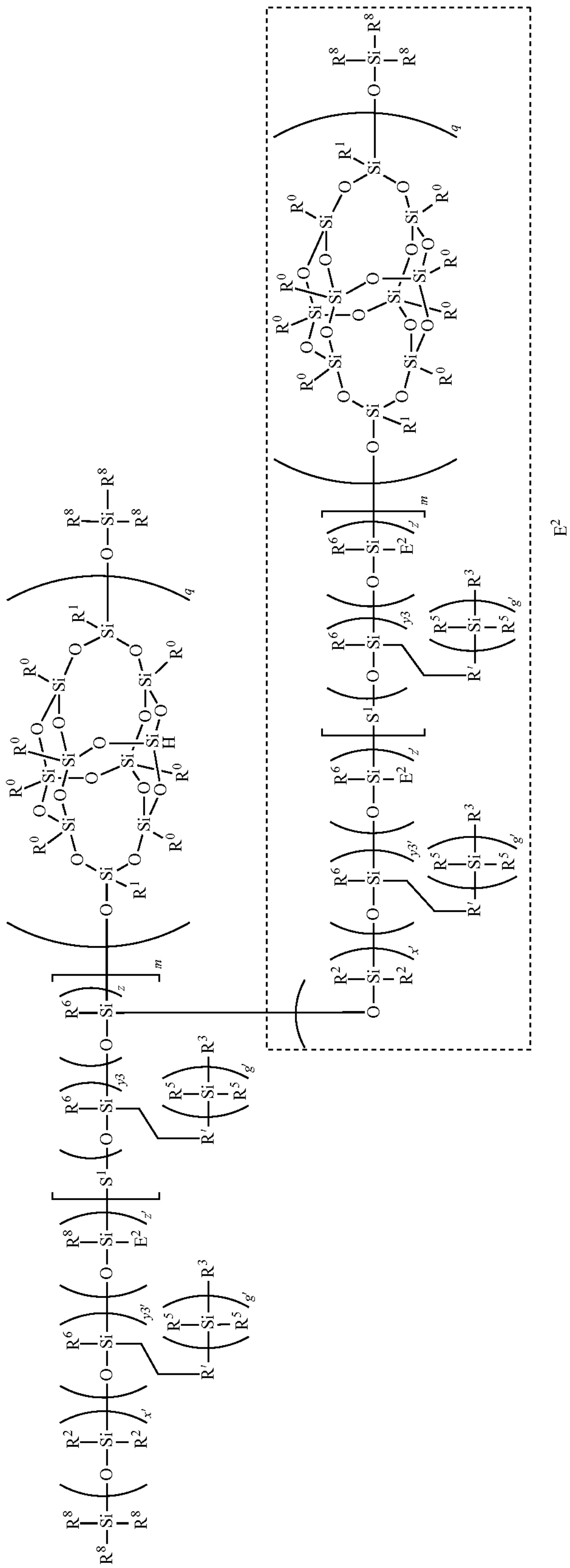

In the above formula, $R^0$, $R^1$, $R^2$, $R^3$, $R^5$, $R^6$, R', x, z, and g' are defined the same as $R^0$, $R^1$, $R^2$, $R^3$, $R^5$, $R^6$, R', x, z, and g' in Formula (1-3); $S^1$ is defined as described above; q, x', y3, y3', and z' represent an integer of 0 to 30; $E^2$ represents the same structure as a part surrounded by the dashed line in Formula (J-14); and m represents a number satisfying a weight average molecular weight of 2,000 to 10,000,000.

Siloxane Polymer Represented by Formula (J-15)

(J-15)
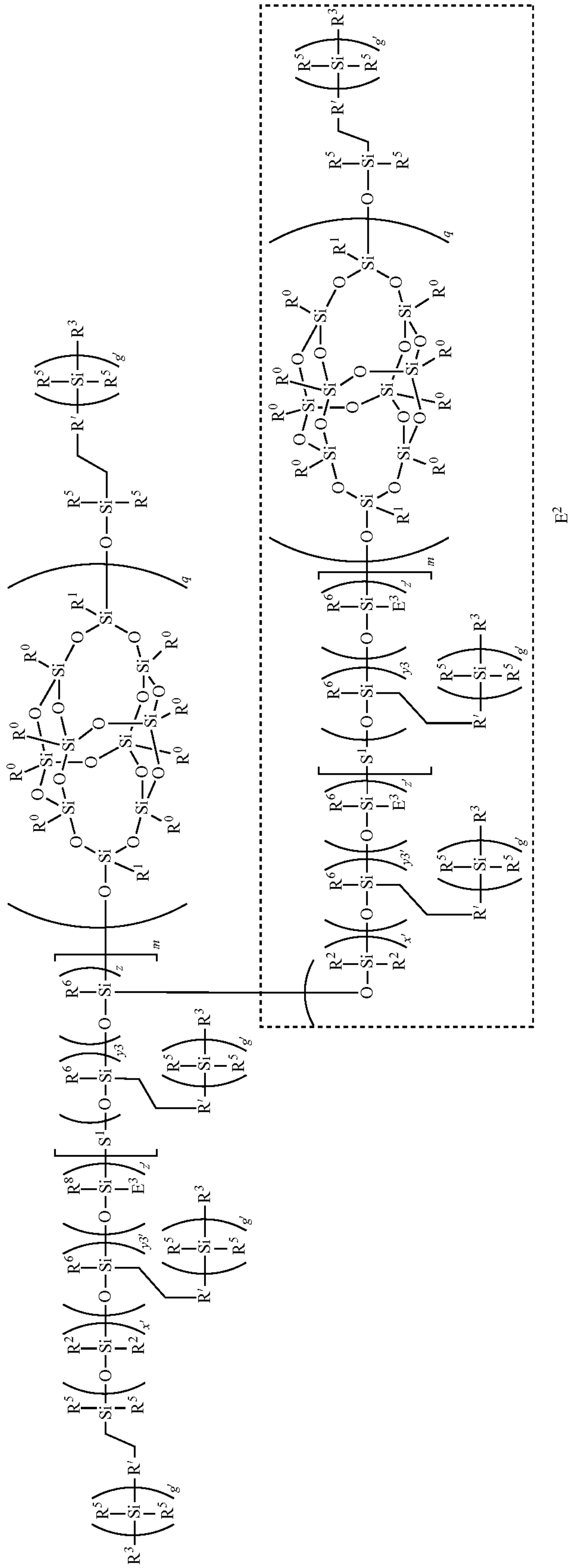

In the above formula, $R^0$, $R^1$, $R^2$, $R^3$, $R^5$, $R^6$, R', x, z, and g' are the same as $R^0$, $R^1$, $R^2$, $R^3$, $R^5$, $R^6$, R', x, z, and g' in Formula (1-3); $S^1$ is defined as described above; q, x', y3, y3', and z' represent an integer of 0 to 30; $E^3$ represents the same structure as a part surrounded by the dashed line in Formula (J-15); and m represents a number satisfying a weight average molecular weight of 2,000 to 10,000,000.

More specific examples of a siloxane polymer containing a repeating unit represented by Formula (1) include the following polymers.

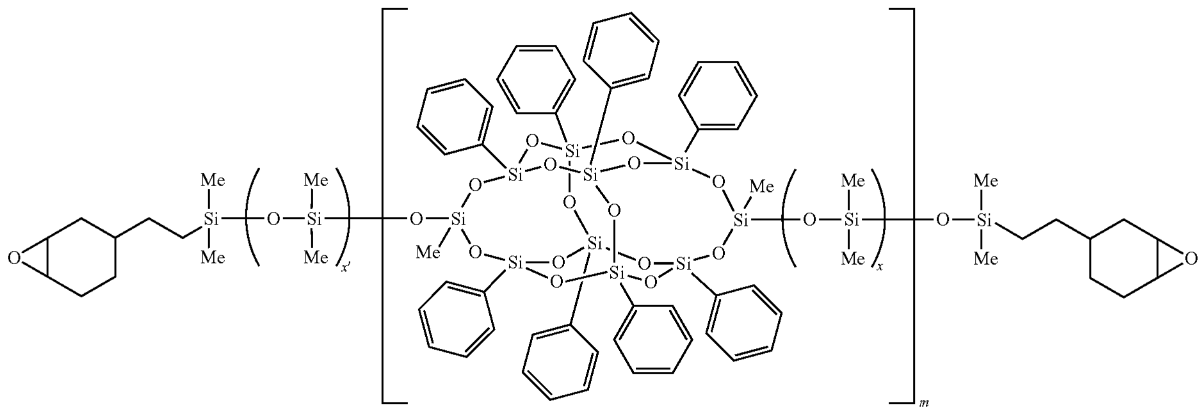

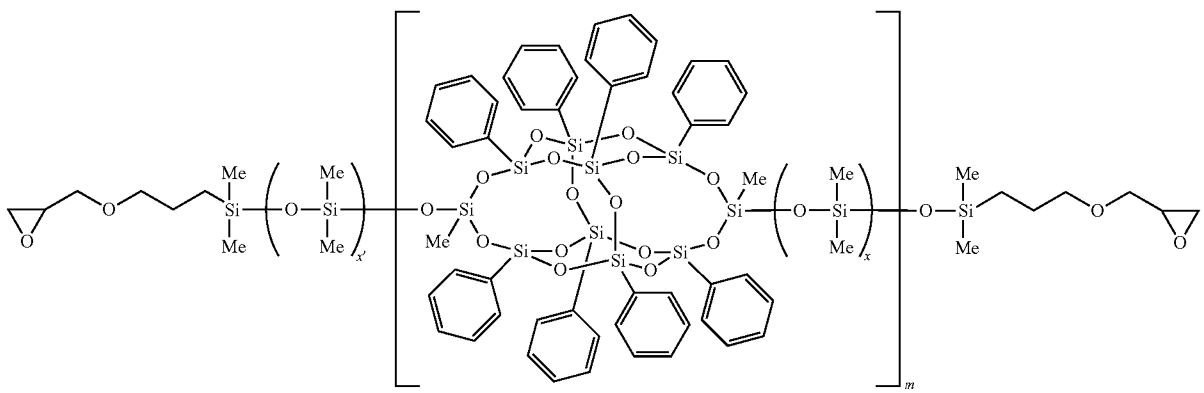

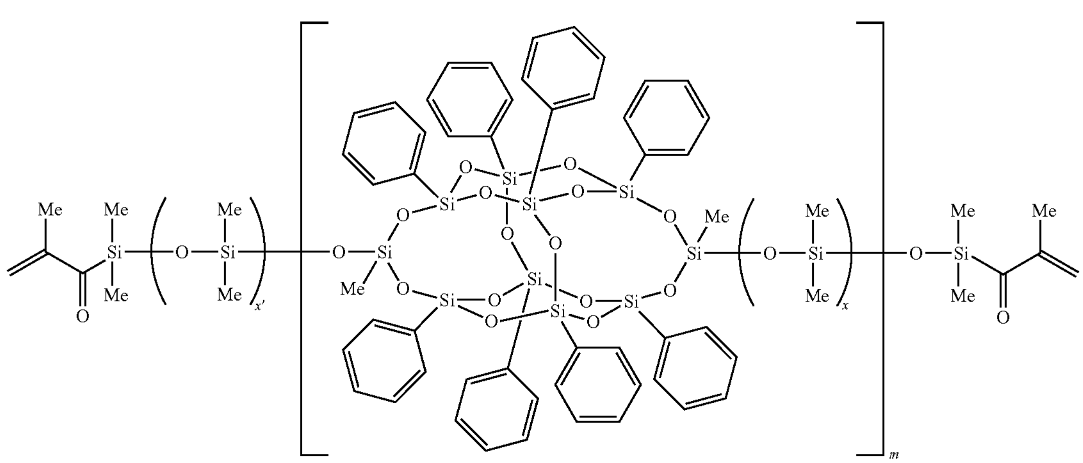

-continued
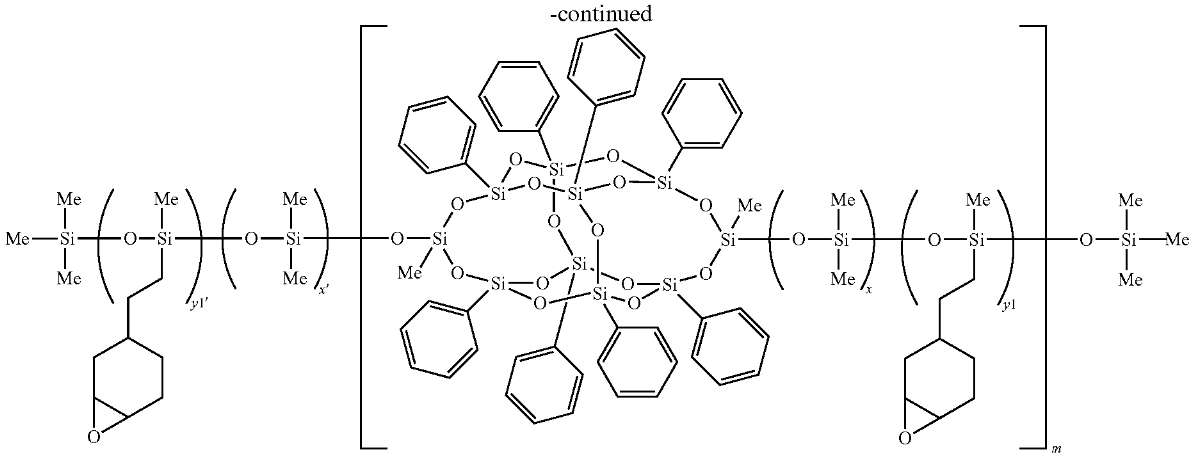
More specifically, preferable examples of a siloxane polymer containing a repeating unit represented by Formula (1) include the following polymers.
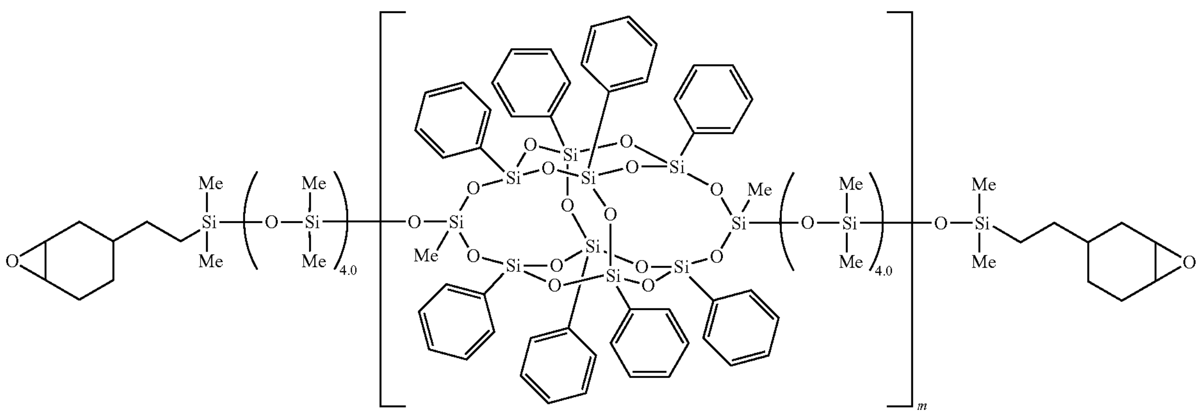
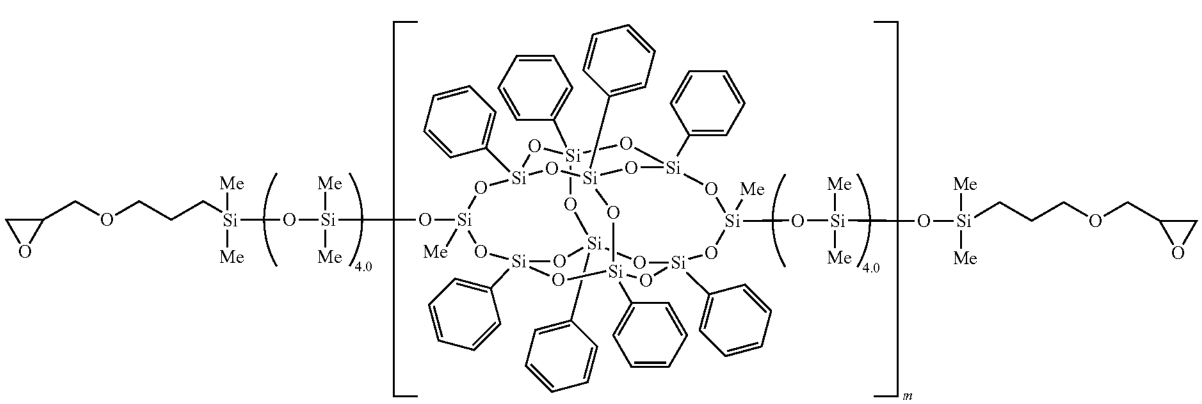

-continued

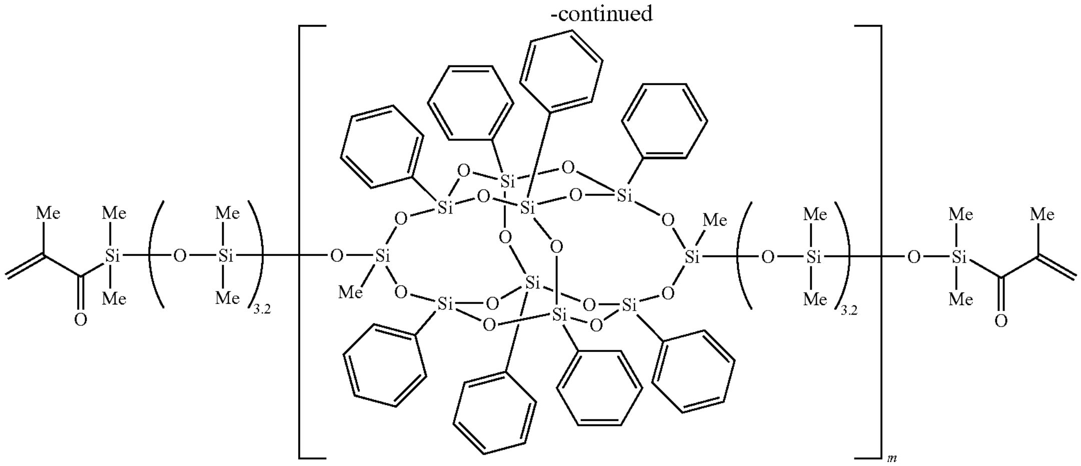

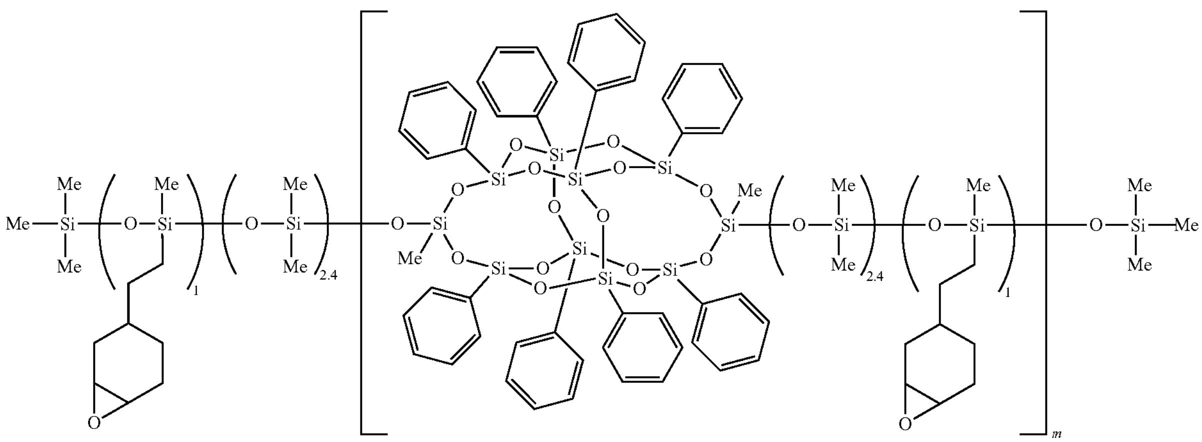

2. Method of Producing a Siloxane Polymer

A siloxane polymer containing a repeating unit represented by Formula (1) can be suitably produced by controlling an introduction position of a reactive group by the method described below.

2.1 A method of producing a siloxane polymer containing a repeating unit represented by Formula (1-1) and a group represented by Formula (2) as terminals The siloxane polymer containing a repeating unit represented by Formula (1-1) and a group represented by Formula (2) as terminals can be suitably produced by the following methods of producing a siloxane polymer (i) to (iv).

(i) A method of producing a siloxane polymer including a process of reacting a silicon compound represented by Formula (a) with a silicon compound represented by Formula (b), and additionally reacting with a silicon compound represented by Formula (c).

(ii) A method of producing a siloxane polymer including a process of reacting a silicon compound represented by Formula (d) with a compound represented by Formula (e).

(iii) A method of producing a siloxane polymer including a process of reacting a silicon compound represented by Formula (f) with a silicon compound represented by Formula (g).

(iv) A method of producing a siloxane polymer including a process of reacting a silicon compound represented by Formula (h) with a silicon compound represented by Formula (i).

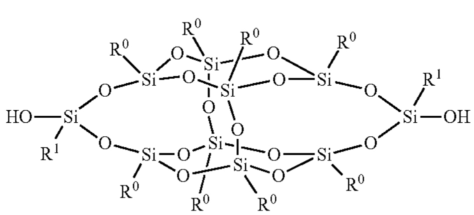

(a)

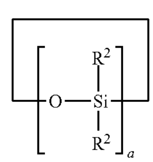

(b)

-continued
(c)
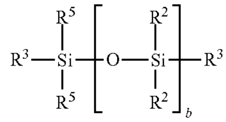
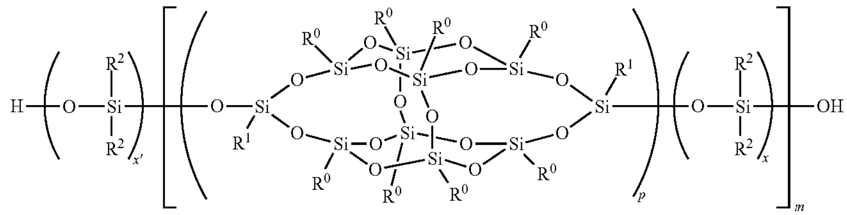
(d)
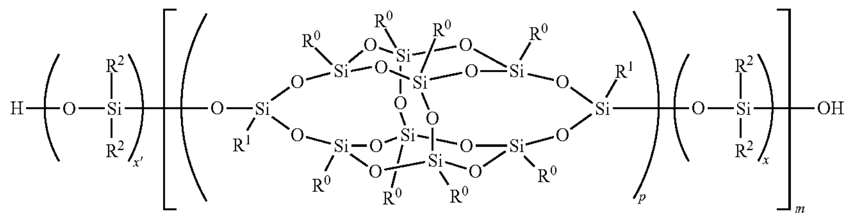
(e)
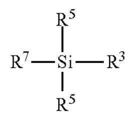
(f)
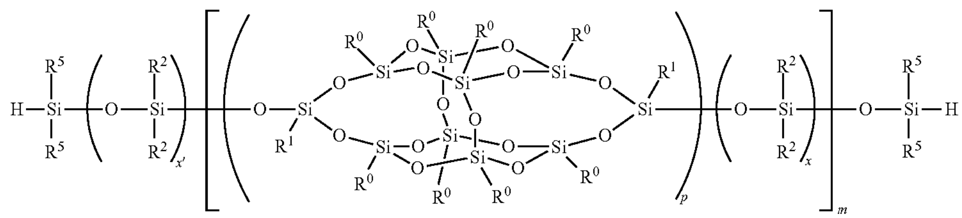
(g)
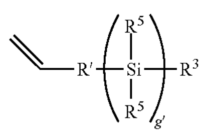
(h)
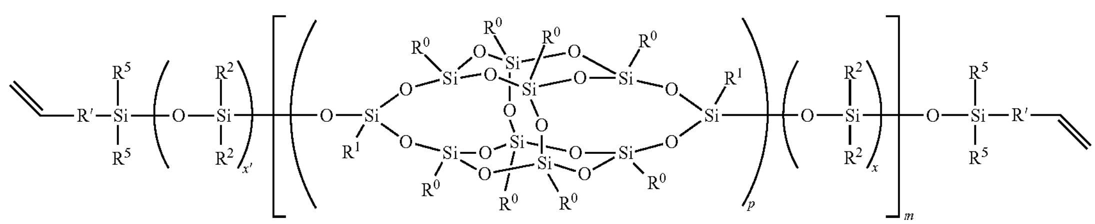
(i)
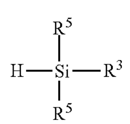
(1-1)
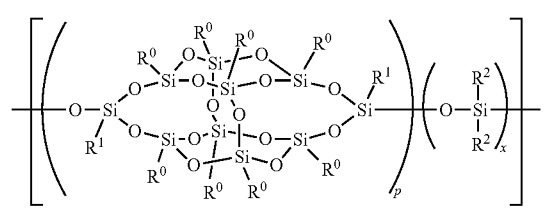
(2)
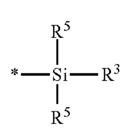

In the above formula, $R^0$'s independently represent an aryl group having 6 to 20 carbon atoms or a cycloalkyl group having 5 to 6 carbon atoms, and in the aryl group having 6 to 20 carbon atoms and the cycloalkyl group having 5 to 6 carbon atoms, any hydrogen atom may be independently substituted with a fluorine atom or an alkyl group having 1 to 20 carbon atoms;

$R^1$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^2$ and $R^5$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^3$ represents a monovalent group having a reactive group;

$R^7$ represents a hydrogen atom, a halogen atom, or an alkoxy group having 1 to 20 carbon atoms;

R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms;

a represents an integer of 3 to 30;

b represents an integer of 1 to 1,000;

p represents an integer of 1 or more;

x represents an integer of 1 to 30;

x' represents an integer of 1 to 30;

m represents a number satisfying a weight average molecular weight of 2,000 to 10,000,000; and

* represents a bonding position.

Hereinafter, compounds represented by Formulae (a) to (i) used in (i) to (iv) will be described.

(Compound Represented by Formula (a))

In the siloxane polymer, the silsesquioxane unit is derived from the compound represented by Formula (a).

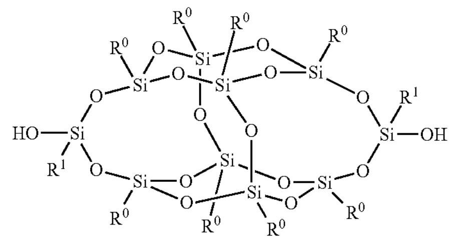

(a)

In the above formula, les independently represent an aryl group having 6 to 20 carbon atoms or a cycloalkyl group having 5 to 6 carbon atoms, and in the aryl group having 6 to 20 carbon atoms and the cycloalkyl group having 5 to 6 carbon atoms, any hydrogen atom may be independently substituted with a fluorine atom or an alkyl group having 1 to 20 carbon atoms; $R^1$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms Specific examples of $R^0$ and $R^1$ include those described in the sections of ($R^0$) and ($R^1$) of "1. Siloxane polymer."

Regarding the compound represented by Formula (a), the following compound is preferable.

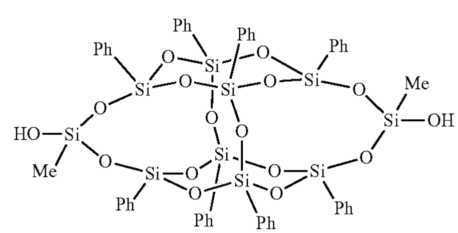

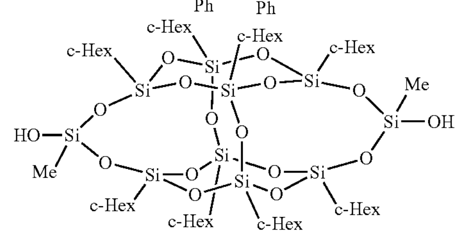

(Compound Represented by Formula (b))

A chain siloxane unit can be introduced into the siloxane polymer using the compound represented by Formula (b).

(b)

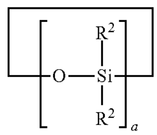

In the above formula, $R^2$'s independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms.

a represents an integer of 3 to 30. In consideration of production of a siloxane polymer, a is preferably 3 to 20, and more preferably 3 to 10.

Specific examples of $R^2$ include those described in the section of ($R^2$, $R^4$, $R^5$, $R^6$) of "1. Siloxane polymer." In addition, the same applies to the preferable forms.

Examples of compounds represented by Formula (b) include 2,2,4,4,6,6-hexamethylcyclotrisiloxane, 2,4,6-triethyl-2,4,6-trimethylcyclotrisiloxane, 2,2,4,4,6,6-hexaethylcyclotrisiloxane, 2,4,6-trimethyl-2,4,6-tripropylcyclotrisiloxane, 2,4,6-triethyl-2,4,6-tripropylcyclotrisiloxane, 2,2,4,4,6,6-hexapropylcyclotrisiloxane, 2,4,6-trimethyl-2,4,6-tris(1-methylethyl)cyclotrisiloxane, 2,4,6-triethyl-2,4,6-tris(1-methylethyl)cyclotrisiloxane 2,2,4,4,6,6-hexakis(1-methylethyl)cyclotrisiloxane, 2,4,6-tributyl-2,4,6-trimethylcyclotrisiloxane, 2,4,6-tributyl-2,4,6-triethylcyclotrisiloxane, 2,2,4,4,6,6-hexabutylcyclotrisiloxane, 2,4,6-trimethyl-2,4,6-tris(1,1-dimethylethyl)cyclotrisiloxane, 2,4,6-triethyl-2,4,6-tris(1,1-dimethylethyl)cyclotrisiloxane, 2,4,6-tris(1,1-dimethylethyl)-2,4,6-tripropylcyclotrisiloxane, 2,2,4,4,6,6-hexakis(1,1-dimethylethyl)cyclotrisiloxane, 2,4,6-trimethyl-2,4,6-tris(trifluoromethyl)cyclotrisiloxane, 2,2,4,4,6,6-hexakis(trifluoromethyl)cyclotrisiloxane, 2,2,4,4,6,6-hexakis(1,1,2,2,2-pentafluoroethyl)cyclotrisiloxane, 2,4,6-trimethyl-2,4,6-tris(3,3,3-trifluoropropyl)cyclotrisiloxane, 2,2,4,4,6,6-hexakis(3,3,3-trifluoropropyl)cyclotrisiloxane, 2,4,6-trimethyl-2,4,6-triphenylcyclotrisiloxane, 2,2,4,4,6,6-hexaphenylcyclotrisiloxane, 2,4,6-tricyclohexyl-2,4,6-trimethylcyclotrisiloxane, 2,2,4,4,6,6-hexacyclohexylcyclotrisiloxane, 2,2,4,4,6,6-hexavinylcyclotrisiloxane, 2,4,6-trimethyl-2,4,6-trivinylcyclotrisiloxane, 2,2,4,4,6,6,8,8-octamethylcyclotetrasiloxane, 2,4,6,8-tetraethyl-2,4,6,8-tetramethylcyclotetrasiloxane, 2,2,4,4,6,6,8,8-octaethylcyclotrisiloxane, 2,4,6,8-tetramethyl-2,4,6,8-tetrapropylcyclotetrasiloxane, 2,4,6,8-tetraethyl-2,4,6,8-Tetrapropylcyclotetrasiloxane, 2,2,4,4,6,6,8,8-octapropylcyclotetrasiloxane, 2,4,6,8-tetramethyl-2,4,6,8-tetrakis(1-methylethyl)cyclotetrasiloxane, 2,4,6,8-tetraethyl-2,4,6,8-tetrakis(1-methylethyl)cyclotetrasiloxane 2,2,4,4,6,6,8,8-octakis(1-methylethyl)cyclotetrasiloxane, 2,4,6,8-tetrabutyl-2,4,6,8-tetramethylcyclotetrasiloxane, 2,4,6,8-tetrabutyl-2,4,6,8-tetraethylcyclotetrasiloxane, 2,2,4,4,6,6,8,8-octabutylcyclotetrasiloxane, 2,4,6,8-tetramethyl-2,4,6,8-tetrakis(1,1-dimethylethyl)cyclotetrasiloxane, 2,4,6,8-tetraethyl-2,4,6,8-tetrakis(1,1-dimethylethyl)cyclotetrasiloxane, 2,4,6,8-tetrakis(1,1-dimethylethyl)-2,4,6,8-tetrapropylcyclotetrasiloxane, 2,2,4,4,6,6,8,8-octakis(1,1-dimethylethyl)cyclotetrasiloxane, 2,4,6,8-tetramethyl-2,4,6,8-tetrakis(trifluoromethyl)cyclotetrasiloxane, 2,2,4,4,6,6,8,8-octakis(trifluoromethyl)cyclotetrasiloxane, 2,2,4,4,6,6,8,8-octakis(1,1,2,2,2-pentafluoroethyl)cyclotetrasiloxane, 2,4,6,8-tetramethyl-2,4,6,8-tetrakis(3,3,3-trifluoropropyl)cyclotetrasiloxane, 2,2,4,4,6,6,8,8-octakis(3,3,3-trifluoropropyl)cyclotetrasiloxane, 2,4,6,8-tetramethyl-2,4,6,8-tetraphenylcyclotetrasiloxane, 2,2,4,4,6,6,8,8-octaphenylcyclotetrasiloxane, 2,4,6,8-tetracyclohexyl-2,4,6,8-tetramethylcyclotetrasiloxane, 2,2,4,4,6,6,8,8-octacyclohexylcyclotetrasiloxane, 2,2,4,4,6,6,8,8-octavinylcyclotetrasiloxane, 2,4,6,8-tetramethyl-2,4,6,8-tetravinylcyclotetrasiloxane, 2,6-dietinyl-2,4,4,6,8,8-hexamethylcyclotetrasiloxane, 2,2,4,4,6,6,8,8,10,10-decamethylcyclopentasiloxane, 2,4,6,8,10-pentaethyl-2,4,6,8,10-pentamethylcyclopentasiloxane, 2,2,4,4,6,6,8,8,10,10-decaethylcyclotrisiloxane, 2,4,6,8,10-pentamethyl-2,4,6,8-pentapropylcyclopentasiloxane, 2,4,6,8,10-pentaethyl-2,4,6,8,10-pentapropylcyclopentasiloxane, 2,2,4,4,6,6,8,8,10,10-decapropylcyclopentasiloxane, 2,4,6,8,10-pentamethyl-2,4,6,8,10-pentakis(1-methylethyl)cyclopentasiloxane, 2,4,6,8,10-pentaethyl-2,4,6,8,10-pentakis(1-methylethyl)cyclopentasiloxane 2,2,4,4,6,6,8,8,10,10-decakis(1-methylethyl)cyclopentasiloxane, 2,4,6,8,10-pentabutyl-2,4,6,8,10-pentamethylcyclopentasiloxane, 2,4,6,8,10-pentabutyl-2,4,6,8,10-pentaethylcyclopentasiloxane, 2,2,4,4,6,6,8,8,10,10-decabutylcyclopentasiloxane, 2,4,6,8,10,10-pentamethyl-2,4,6,8,10,10-pentakis(1,1-dimethylethyl)cyclopentasiloxane, 2,4,6,8,10-pentaethyl-2,4,6,8,10-pentakis(1,1-dimethylethyl)cyclopentasiloxane, 2,4,6,8,10-pentakis(1,1)-dimethylethyl)-2,4,6,8,10-pentapropylcyclopentasiloxane, 2,2,4,4,6,6,8,8,10,10-decakis(1,1-dimethylethyl)cyclopentasiloxane, 2,4,6,8,10-pentamethyl-2,4,6,8-pentakis(trifluoromethyl) cyclopentasiloxane, 2,2,4,4,6,6,8,8,10,10-decakis(trifluoromethyl)cyclopentasiloxane, 2,2,4,4,6,6,8,8,10,10-decakis (1,1,2,2,2-pentafluoroethyl)cyclopentasiloxane, 2,4,6,8,10,10-pentamethyl-2,4,6,8-pentakis(3,3,3-trifluoropropyl) cyclopentasiloxane, 2,2,4,4,6,6,8,8,10,10-decakis(3,3,3-trifluoropropyl)cyclopentasiloxane, 2,4,6,8,10-pentamethyl-2,4,6,8-pentaphenylcyclopentasiloxane, 2,2,4,4,6,6,8,8,10,10-decaphenylcyclopentasiloxane, 2,4,6,8,10-pentacyclohexyl-2,4,6,8,10-pentamethylcyclopentasiloxane, 2,2,4,4,6,6,8,8,10,10-decacyclohexylcyclopentasiloxane, 2,2,4,4,6,6,8,8,10,10-decavinylcyclopentasiloxane, and 2,4,6,8,10-pentamethyl-2,4,6,8,10-pentavinylcyclopentasiloxane. Among these, a low-molecular-weight cyclic siloxane in which $R^2$ is an alkyl group having 1 to 40 carbon atoms is preferable, a cyclic siloxane such as hexamethylcyclotrisiloxane (D3), octamethylcyclotetrasiloxane (D4), decamethylcyclopentasiloxane (D5), and dodecamethylcyclohexanesiloxane (D6) is more preferable, and an octamethylcyclotetrasiloxane is particularly preferable in consideration of ease of availability, cost, and handling properties.

(Compound Represented by Formula (c))

In one embodiment of the disclosure, a reactive group $R^3$ can be introduced into the terminal of the siloxane polymer represented by Formula (1-1) using the compound represented by Formula (c).

(c)

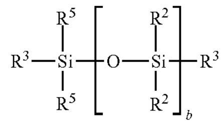

In the above formula, $R^2$ and $R^5$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms.

$R^3$ represents a monovalent group having a reactive group.

b represents an integer of 1 to 1,000, and is preferably 3 to 500, and more preferably 3 to 300.

Specific examples of $R^2$, $R^3$, and $R^5$ include those described in the sections of ($R^2$, $R^4$, $R^5$, $R^6$) and ($R^3$) of "1. Siloxane polymer."

Examples of the compound represented by Formula (c) include 1,3-difluoro-1,1,3,3-tetramethyldisiloxane, 1,5-difluoro-1,1,3,3,5,5-hexamethyltrisiloxane, 1,3-dichloro-1,1,3,3-tetramethyldisiloxane, 1,5-dichloro-1,1,3,3,5,5-hexamethyltrisiloxane, 1,3-dibromo-1,1,3,3-tetramethyldisiloxane, 1,5-dibromo-1,1,3,3,5,5-hexamethyltrisiloxane, 1,3-diiodo-1,1,3,3-tetramethyldisiloxane, 1,5-diiodo-1,1,3,3,5,5-hexamethyltrisiloxane, 1,3-dimethoxy-1,1,3,3-tetramethyldisiloxane, 1,5-dimethoxy-1,1,3,3,5,5-hexamethyltrisiloxane, 1,3-diethoxy-1,1,3,3-tetramethyldisiloxane, 1,5-diethoxy-1,1,3,3,5,5-hexamethyltrisiloxane, 1,1,3,3-tetramethyl-1,3-dipropoxydisiloxane, 1,1,3,3,5,5-hexamethyl-1,5-dipropoxytrisiloxane, 1,1,3,5,7,7-hexamethoxy-1,3,5,7-tetramethyltetrasiloxane, 3,3,11,11-tetramethoxy-6,6,8,8-tetramethyl-2,7,12-trioxa-3,6,8,11-tetrasilatridecan, 4,4,12,12-tetraethoxy-7,7,9,9-tetramethyl-3,8,13-trioxa-4,7,9,12-tetrasilapentadecane, (1,1,3,3-tetramethyldisiloxane-1,3-diyedipropane-1,3-diyldiacrylate, (1,1,3,3-tetramethyldisiloxane-1,3-diyedipropane-1,3-diyldimethacrylate, X-22-2445 (commercially available from Shin-Etsu Chemical Co., Ltd.), X-22-164 (commercially available from Shin-Etsu Chemical Co., Ltd.), FM-7711 (commercially available from JNC), FM-7721 (commercially available from JNC), FM-7725 (commercially available from JNC), DMS-R05 (commercially available from Gelest), DMS-R11 (commercially available from Gelest), DMS-R18 (commercially available from Gelest), DMS-U21 (commercially available from Gelest), DBE-U21 (commercially available from Gelest), DBE-U22 (commercially available from Gelest), 3-[(2-carboxyethyl-dimethyl-silyl)oxy-dimethyl-silyl]propanoic acid, X-22-162C (commercially available from Shin-Etsu Chemical Co., Ltd.), DMS-B12 (commercially available from Gelest), DMS-B25 (commercially available from Gelest), DMS-B31 (commercially available from Gelest), X-22-168AS (commercially available from Shin-Etsu Chemical Co., Ltd.), 3,3'-[(1,1,3,3-tetramethyl-1,3-disiloxanediyl)di-3,1-propanediyl]bis[dihydro-2,5-furandione], 5,5'-(1,1,3,3-tetramethyl-1,3-disiloxanediyebis[hexahydro-4,7-methanoisobenzofuran-1,3-dione], DMS-Z21 (commercially available from Gelest), DMS-NB25 (commercially available from Gelest), DMS-NB32 (commercially available from Gelest), X-22-4952 (commercially available from Shin-Etsu Chemical Co., Ltd.), X-22-4272 (commercially available from Shin-Etsu Chemical Co., Ltd.), KF-6123 (commercially available from Shin-Etsu Chemical Co., Ltd.), DBL-C31 (commercially available from Gelest), DBL-C32 (commercially available from Gelest), X-22-163 (commercially available from Shin-Etsu Chemical Co., Ltd.), KF-105 (commercially available from Shin-Etsu Chemical Co., Ltd.), X-22-169AS (commercially available from Shin-Etsu Chemical Co., Ltd.), X-22-169B (commercially available from Shin-Etsu Chemical Co., Ltd.), 1,3-bis[3-[(3-ethyl-3-oxetanyl)methoxy]propyl]-1,1,3,3-tetramethyldisiloxane, 1,5-bis[3-[(3-ethyl-3-oxetanyl)methoxy]propyl]-1,1,3,3,5,5-hexamethyltrisiloxane, 1,7-bis[3-[(3-ethyl-3-oxetanyl)methoxy]propyl]-1,1,3,3,5,5,7,7-octamethyltetrasiloxane, KF-2201 (commercially available from Shin-Etsu Chemical Co., Ltd.), 1,1,3,3-tetramethyl-1,3-disiloxanediamine, 1,1,1,5,5,5-hexamethyl-3,3-trisiloxanediamine, KF-8010 (commercially available from Shin-Etsu Chemical Co., Ltd.), KF-8012 (commercially available from Shin-Etsu Chemical Co., Ltd.), KF-8008 (commercially available from Shin-Etsu Chemical Co., Ltd.), FM-3311 (commercially available from JNC), FM-3321 (commercially available from JNC), FM-3325 (commercially available from JNC), DMS-A11 (commercially available from Gelest), DMS-A12 (commercially available from Gelest), DMS-A15 (commercially available from Gelest), DMS-A211 (commercially available from Gelest), 2,2'-(1,1,3,3-tetramethyl-1,3-disiloxanediyl)bisacetonitrile, 3,3'-(1,1,3,3-tetramethyl-1,3-di)siloxanediyebispropanenitrile, 1,3-diisocyanato-1,1,3,3-tetramethyldisiloxane, 1,5-diisocyanato-1,1,3,3,5,5-hexamethyltrisiloxane, 1,3-dietinyl-1,1,3,3-tetramethyldisiloxane, 1,5-dietinyl 1-1,1,3,3,5,5-hexamethyltrisiloxane, FM 2205 (commercially available from JNC), 1,1,3,3-tetramethyl-1,3-di-2-propan-1-yl-disiloxane, 1,1,3,3,5,5-hexamethyl-1,5-di-2-propane-1-yl-trisiloxane, 1,3-di-2-cyclohexen-1-yl-1,1,3,3-tetramethyldisiloxane, 1,3-bis[2-(3-cyclohexen-1-yl)ethyl]-1,1,3,3-tetramethyldisiloxane, 1,3-bis(bicyclo[2.2.1]hepto-5-en-2-yl)-1,1,3,3-tetramethyldisiloxane, 3,3'-(1,1,3,3-tetramethyl-1,3-disiloxanediyebis-1-pentanethiol, 3,3'-(1,1,3,3,5,5-hexamethyl-1,5-trisiloxanediyl)bis-1-pentanethiol, X-22-167B (commercially available from Shin-Etsu Chemical Co., Ltd.), X-22-167C (commercially available from Shin-Etsu Chemical Co., Ltd.), FM-4411 (commercially available from JNC), FM-4421 (commercially available from JNC), FM-4425 (commercially available from JNC), DMS-C15 (commercially available from Gelest), DMS-C16 (commercially available from Gelest), DMS-C21 (commercially available from Gelest), and DMS-CA21 (commercially available from Gelest).

Among these, the following compounds are particularly preferable.

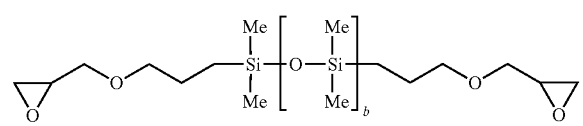

-continued

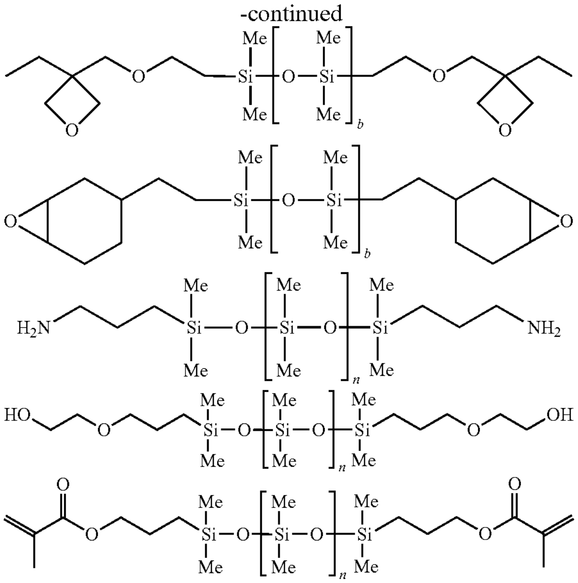

(Compound Represented by Formula (d))

The compound represented by Formula (d) is obtained by reacting the compound represented by Formula (a) with the compound represented by Formula (b) in the presence of an acid. Examples of acids include sulfuric acid, p-toluenesulfonic acid monohydrate, methanesulfonic acid, trifluoromethanesulfonic acid, nonafluro butane sulfonic acid, pentafluoroethane sulfonic acid, sulfonic acid ion-exchange resin, bis(trifluoromethanesulfonyl)imide, phosphonitrile chloride, and activated clay, and sulfuric acid is preferable.

having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; and $R^7$ represents a hydrogen atom, a halogen atom, or an alkoxy group having 1 to 20 carbon atoms.

Specific examples of the case in which, in Formula (e), when $R^7$ represents a hydrogen atom, that is, when the compound represented by Formula (e) is a hydrosilane compound include fluorodimethylsilane, ethylfluoromethylsilane, fluorodiphenylsilane, phenylmethylfluoromethane, chlorodimethylsilane, chloroethylmethylsilane, phenylmethylchlorosilane, diphenylchlorosilane, 1,1'-(chlorosilane) bis-cyclohexane, bromodimethylsilane, bromomethylphenylsilane, bromodiphenylsilane, iododimethylsilane, dimethyl(trifluoromethyl)silane, dimethyl(3,3,3-trifluoropropyl)silane, dimethyl(4,4,4-trifluoropropyl)silane, methoxydimethylsilane, methoxydiethylsilane, methoxymethylphenylsilane, methoxydiphenylsilane, ethoxydimethylsilane, ethoxydiethylsilane, ethoxymethylphenylsilane, ethoxydiphenylsilane, dimethylpropoxysilane, diethyl- (d)

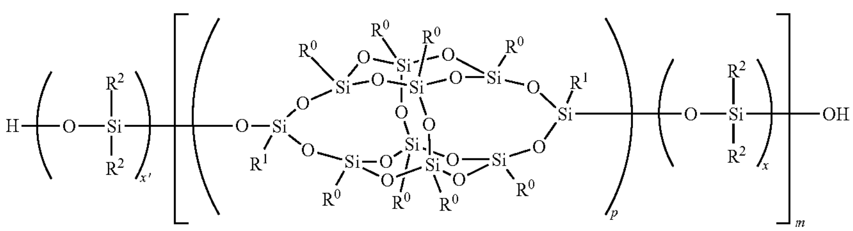

In the above formula, $R^0$ and $R^1$ are defined the same as $R^0$ and $R^1$ in the compound represented by Formula (a). In addition, $R^2$ is defined the same as $R^2$ in the compound represented by Formula (b). p represents an integer of 1 or more, x represents an integer of 1 to 30, and x' represents an integer of 0 to 30.

(Compound Represented by Formula (e))

A reactive group $R^3$ can be introduced into the terminal of the siloxane polymer represented by Formula (1-1) using the compound represented by Formula (e).

(e)

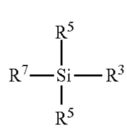

In the above formula, $R^5$'s independently represent an aryl group having 6 to 20 carbon atoms, a cycloalkyl group propoxysilane, methylphenylpropoxysilane, diphenylpropoxysilane, dimethyl(1-methylethoxy) silane, diethyl(1-methylethoxy)silane, methylphenyl(1-methylethoxy)silane, diphenyl(1-methylethoxy)silane, (1,1-dimethylethoxy)dimethylsilane, -(dimethylsilyl)butanoic acid, 3-[2-(dimethylsilyeethyl]dihydro-2,5-furandione, 2-[[3-(dimethylsilyl) propoxy]methyl]oxirane, 2-[[3-(diethylsilyl)propoxy] methyl]oxirane, 2-[[3-(diphenylsilyl)propoxy]methyl] oxirane 2-[[3-(methylphenylsilyl)propoxy]methyl]oxirane, 2-[[3-(ethylphenylsilyl)propoxy]methyl]oxirane, 4-(dimethylsilyl)phenol, 1,1-dimethylsilylamine, 3-(dimethylsilyl) propanenitrile, 4-(dimethylsilyl)butanenitrile, 2-(dimethylsilyl)propanenitrile, 2-(dimethylsilyl)butanenitrile, 5-(dimethylsilyl)pentanenitrile, (3-isocyanatopropyl)dimethylsilane, allyldimethylsilane, 3-butene-1-yldimethylsilane, dimethyl-4-penten-1-ylsilane, 5-hexene-1-yldimethylsilane, 6-heptane-1-yldimethylsilane, dimethyl-7-octane-1-ylsilane, diethyl-2-propan-1-ylsilane, methyldi-2-propane-1-ylsilane, 3-butene-1-yldiethylsilane, diethyl-4-pentene-1-ylsilane, diethyl-5-hexene-1-ylsilane, diethyl6-heptane-1- ylsilane, diethyl-7-octane-1-ylsilane, 1-(dimethylsilyl) cyclohexene, 2-(dimethylsilyl)cyclohexene, 4-(dimethylsilyl)cyclohexene, 3-(dimethylsilyl)-1-propanethiol, hydroxymethyldimethylsilane, hydroxymethyldiphenyl, hydroxymethyl(methylphenyl)silane, 1-ethyl-1-phenylsilanol, 3-(dimethylsilyl)-1-propanol, 3-(diethylsilyl)-1-propanal, 1-(methylphenylsilyl)ethanol and the following compounds.

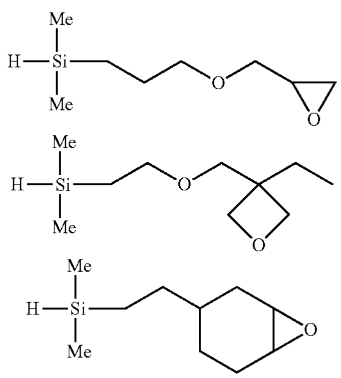

Specific examples of the case in which, in Formula (e), $R^7$ represents a halogen atom, that is, when the compound represented by Formula (e) is a halogenated silyl compound include chlorodimethyl(trifluoromethyl)silane, chlorodiethyl(trifluoromethyl)silane, chlorodiphenyl(trifluoromethyl) silane, bromodimethyl(trifluoromethyl)silane, bromodiethyl (trifluoromethyl)silane, bromologiphenyl(trifluoromethyl) silane, iododimethyl(trifluoromethyl)silane, iododiethyl (trifluoromethyl)silane, iododiphenyl(trifluoromethyl) silane, chlorodiethyl(heptafluoropropyl)silane, chlorodimethyl(1,1,2,2,3,3,4,4,4-nonafluorobutyl)silane, bromo(1,1,2,2,3,3,4,4,4-nonafluorobutyl))silane, chloromethoxydimethylsilane, chloroethoxydimethylsilane, chloromethoxybis (1-methylethyl) silane, chloromethoxymethylphenylsilane, cyclohexylmethylmethoxychlorosilane, chloromethoxymethyl(3,3,3-trifluoropropyl)silane, chloromethoxydiphenylsilane, chlorodicyclopentylmethoxysilane, chlorocyclohexylmethoxymethylsilane, chloromethoxy-1-naphthalenylphenylsilane, bromobis(1,1-dimethylethyl)methoxysilane, bromo(1,1 dimethylethyl)methoxyphenylsilane, ethoxyfluorodimethylsilane, chloroethoxydimethylsilane, bromoethoxydimethylsilane, ethoxyfluoromethylphenylsilane, chloroethoxymethylphenylsilane, chloroethoxyphenylsilane, ethoxyfluorodiphenylsilane, chloroethoxydiphenylsilane, bromoethoxydiphenylsilane, chlorocyclohexylethoxymethylsilane, [3-(acryloxy)propyl]dimethylchlorosilane, [3-(methacryloxy)propyl]dimethylchlorosilane, [3-(methacryloxy)propyl]dimethylbromosilane, [3-(methacryloxy)propyl]dimethyliodosilane, diethylfluoro-3-(methacryloxy)propyl]silane, 3-(fluorodimethylsilyl)propanoic acid, 4-chlorodimethylsilylbutanoic acid, 3-[3-(chlorodimethylsilyl)propyl]dihydro-2,5-furandione, 2-[[3-(chlorodimethylsilyl)propoxy]methyl]oxirane, 3-aminopropyldimethylfluorosilane, 3-aminopropyldimethylchlorosilane, 3-diethylfluorosilyl-1-fluoropanamine, 4-aminobutyldimethylchlorosilane, 3-(fluorodimethylsilyl)propanenitrile, 3-(chlorodimethylsilyl)propanenitrile, 3-(chlorodiethylsilyl)propanenitrile, 3-(fluorodimethylsilyl-2-methylpropanenitrile), 3-(chlorodimethylsilyl-2-methylpropanenitrile, 4-ethylfluoromethylsilyl)butanenitrile, 4-(chlorodimethylsilyl)butanenitrile, 4-(chloroethylmethylsilyl)butanenitrile, 4-[chlorobis(1-methylethyl)silyl]butanenitrile, 4-chlorodimethylsilyl-2-methylbutanenitrile, chloro(isocyanatomethyl)dimethylsilane, chloro(2-isocyanatoethyl)dimethylsilane, chloro (3-isocyanatopropyl)dimethylsilane, fluorodimethyl-2-propan-1-ylsilane, chlorodimethyl-2-propan-1-ylsilane, chlorodimethyl(1-methyl-2-propane-1-yl)silane, bromodimethyl-2-propan-1-ylsilane, bis(1,1-dimethylethyl)iodo-2-propan-1-ylsilane, 3-butene-1-ylfluorodimethylsilane, 3-butene-1-ylchlorodimethylsilane, 3-butene-1-ylchlorodiethylsilane, 3-butene-1-ylchlorobis(1-methylethyl)silane, 2-(3-cyclohexenyl)ethyldimethylchlorosilane, chloro[2-(3-cyclohexen-1-yl)ethyl]silane, 1-(chlorodimethylsilyl)methanethiol, 2-(chlorodimethylsilyl)-ethanethiol, 3-(chlorodimethylsilyl)-1-propanethiol, 3-(chloromethylsilyl)-1-propanethiol, 3-(diethylfluorosilyl)-1-propanol, 3-(diethylchloro)-1-propanol, 2-[[3-(chlorodimethylsilyl)propoxy] methyl]oxirane, 3-[[2-(chlorodimethylsilyl)ethoxy]methyl]-3-ethyloxetane, and 3-[2-(chlorodimethylsilyl)ethyl]-7-oxabicyclo [4.1.0] heptane. Among these, the following compound is particularly preferably exemplified.

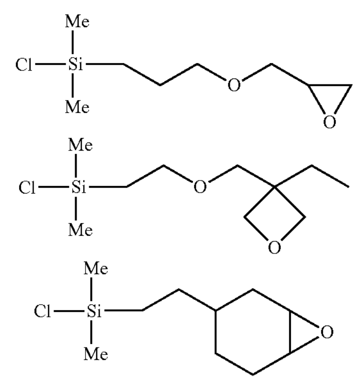

Specific examples of the case in which, in Formula (e), when $R^7$ represents an alkoxy group having 1 to 20 carbon atoms, that is, when the compound represented by Formula (e) is an alkoxysilyl compound (e) include fluoromethoxydimethylsilane, ethoxyfluorodimethylsilane, fluorodimethylpropoxysilane, fluorodimethyl(1-methoxyethoxy)silane, butoxyfluorodimethylsilane, fluoromethoxydiphenylsilane, ethoxyfluorodiphenylsilane, fluorodiphenylpropoxysilane, butoxyfluorodiphenylsilane, chloromethoxydimethylsilane, ethoxychlorodimethylsilane, chlorodimethylpropoxysilane, chlorodimethyl(1-methoxyethoxy)silane, butoxychlorodimethylsilane, chlorodimethyl(2-methylpropoxy)silane, chlorodimethyl(1-methylpropoxy)silane, chloro(1,1-dimethylethoxy)dimethylsilane, chlorodiethylmethoxysilane, chloroethoxydiethylsilane, chlorodiethylpropoxysilane, chlorodiethylisopropoxysilane, butoxychlorodiethylsilane, chloro(1,1-dimethylethoxy)diethylsilane, chloromethoxydiphenylsilane, chloroethoxydiphenylsilane, chlorodiphenylpropoxysilane, chloro(1-methylethoxy)diphenylsilane, butoxychlorodiphenylsilane, chloro(1,1-dimethylethoxy)diphenylsilane, bromoethoxydiphenylsilane, 2-[[3-(methoxydimethylsilyl)propoxy]methyl]-oxirane, 2-[[3-(ethoxydimethylsilyl)propoxy]methyl]oxirane, 2-[[3-(methoxymethylphenylsilyl)propoxy]methyl]oxirane, 3-[[3-(ethoxydimethylsilyl)propoxy]methyl]-3-ethyl-oxetane, 2-(methoxydimethylsilyl)phenol, 2,2'-(methoxymethylsilylene)bisphenol, 1-(1,1-dimethylethoxy)-1,1-dimethylsilanamine, 3-(methoxydimethylsilyl)propanenitrile, (3-isocyanatopropyl)methoxydimethylsilylsilane, ethoxy(2-isocyanatoethyl)dimethylsilane, allyl(methoxy)dimethylsilane, methoxydimethyl(1-methyl-2-propen-1-yl)silane, 3-butene-1-ylmethoxydimethylsilane, methoxydimethyl-4-penten-1-ylsilane, 5-hexene-1-ylmethoxydimethylsilane, methoxydimethyl-7-octane-1-ylsilane, allyl(ethoxy)dimethylsilane, allyl(dimethyl)propoxysilane, allyl(dimethyl)-1-methylethoxysilane, allyl(butoxy)dimethylsilane, allyl-tert-butoxydimethylsilane, 3-butene-1-yl (1,1 dimethylethoxy)dimethylsilane, 4-(methoxydimethylsilyl)cyclohexene, 4-(ethoxydimethylmethylsilyl)-1-methylcyclohexene, 1-[dimethyl(1-methylethoxy)silyl]cyclohexene, 5-(ethoxydimethylsilyl) bicyclo [2.2.1] hept-2-ene, 2-(methoxydimethylsilyl)ethanethiol, 2-(ethoxydimethylsilyl)ethanethiol, 1-(methoxydimethylsilyl)methanethiol, 1-(ethoxydimethylsilyl)methanethiol, 2-[ethoxymethyl(1-methylethyl)silyl]ethanethiol, 3-(methoxydimethylsilyl)1-propanethiol, 3-(ethoxydimethylsilyl)1-propanethiol, 1-(methoxydimethylsilyl)methanol, and 1-(ethoxydimethylsilyl)methanol. Among these, the following compounds are particularly preferably exemplified.

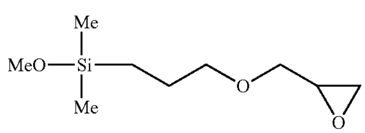

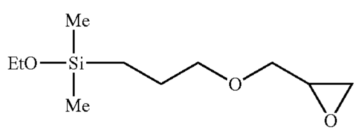

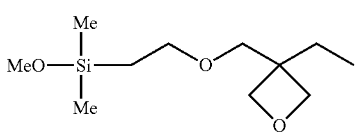

-continued

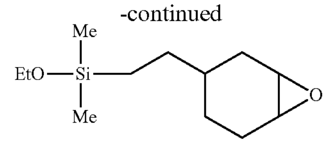

(Compound Represented by Formula (f))

The compound represented by Formula (f) can be obtained by reacting the compound represented by Formula (d) with the compound represented by Formula (p) in the presence of a basic compound such as triethylamine or pyridine.

(p)

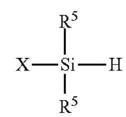

In the above formula, $R^5$'s independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; and X represents a halogen atom.

(f)

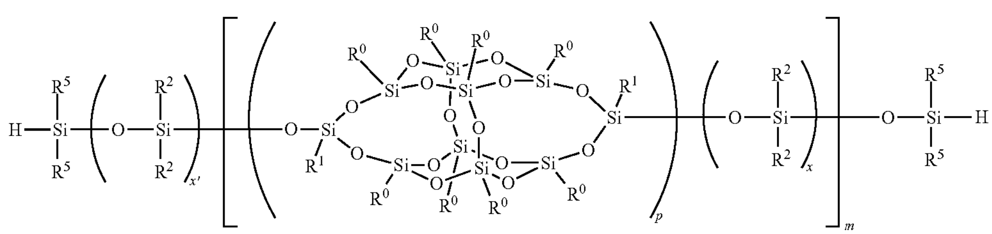

-continued

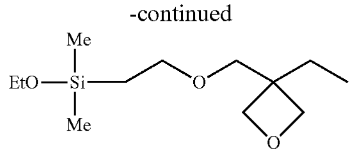

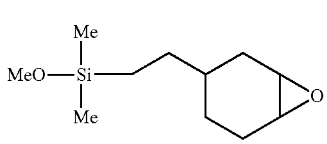

In the above formula, $R^0$, $R^1$, $R^2$, p, and x are defined the same as $R^0$, $R^1$, $R^2$, p, and x in the compound represented by Formula (d). In addition, $R^5$ is defined the same as $R^5$ in the compound represented by Formula (p). m represents a number in which the weight average molecular weight of a desired siloxane polymer satisfies 2,000 to 10,000,000.

(Compound Represented by Formula (g))

When the compound represented by Formula (g) and the compound represented by Formula (f) are subjected to a hydrosilylation reaction, a siloxane polymer represented by Formula (J-2) in which a monovalent group having a reactive group $R^3$ is introduced into the terminal can be produced.

(g)

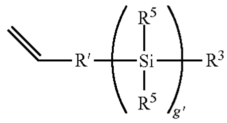

In the above formula, $R^3$ represents a monovalent group having a reactive group, $R^5$ is defined the same as $R^5$ for the group represented by Formula (2) and independently represents an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms; and g' is 0 or 1.

Examples of alkylene groups having 1 to 40 carbon atoms include linear or branched alkylene groups such as methylene, dimethylene, trimethylene, tetramethylene, methylmethylene, and dimethylmethylene.

Examples of compounds represented by Formula (g) include the following compounds.

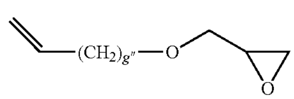

-continued

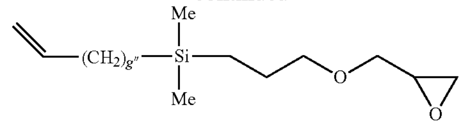

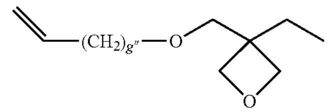

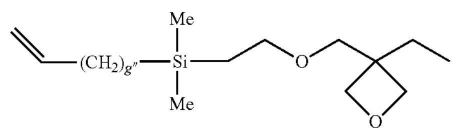

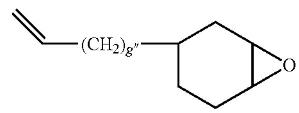

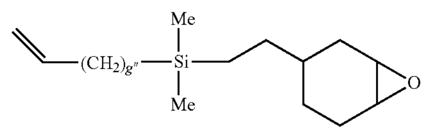

In the above formula, g" represents an integer of 1 to 40.

Among these, compounds in which g" is 1 or more and 10 or less, for example, allyl glycidyl ether, and 1,2-epoxy-4-vinylcyclohexane are preferable.

(Compound Represented by Formula (h))

The compound represented by Formula (h) is obtained by reacting the compound represented by Formula (a), the compound represented by Formula (b), and the compound represented by the following Formula (h') in the presence of an acid. Examples of acids include sulfuric acid, p-toluenesulfonic acid monohydrate, methanesulfonic acid, trifluoromethanesulfonic acid, nonafluro butane sulfonic acid, pentafluoroethane sulfonic acid, sulfonic acid ion-exchange resins, bis(trifluoromethanesulfonyl)imide, phosphonitrile chloride, and activated clay, and sulfuric acid is preferable.

(h)

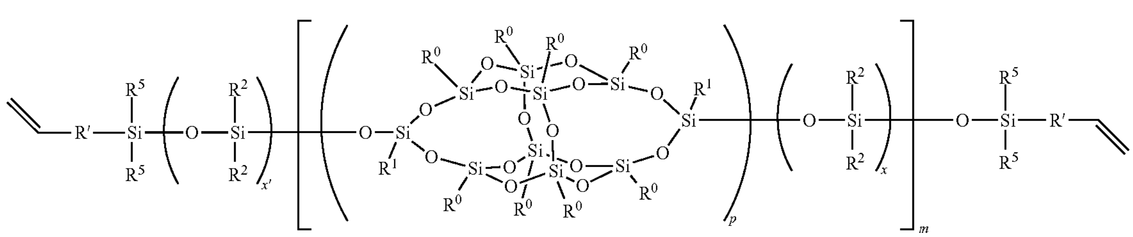

(h')

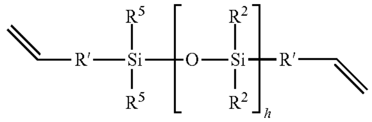

In the above formula, $R^2$ and $R^5$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms; and h represents an integer of 1 to 30. m represents a number in which the weight average molecular weight of a desired siloxane polymer satisfies 2,000 to 10,000,000.

Examples of an alkylene group having 1 to 40 carbon atoms include those described in the compound represented by Formula (g).

Examples of compounds represented by Formula (h') include the following compounds.

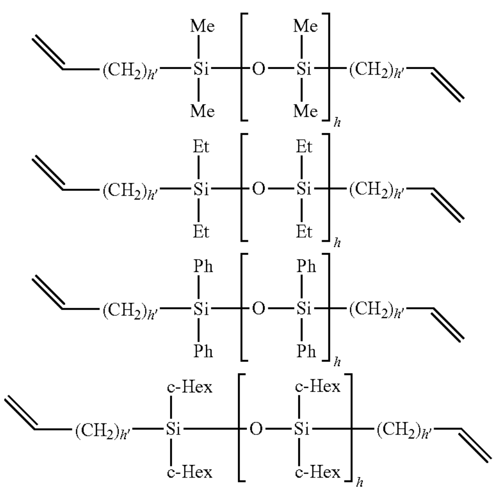

In the above formula, h' represents an integer of 1 to 40.

(Compound Represented by Formula (i))

When the compound represented by Formula (i) and the compound represented by Formula (h) are subjected to a hydrosilylation reaction, a siloxane polymer represented by Formula (J-3) in which a monovalent group having a reactive group $R^3$ is introduced into the terminal can be produced.

(i)

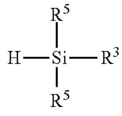

In the above formula, $R^3$ represents a monovalent group having a reactive group, $R^5$ is defined the same as $R^5$ in the group represented by Formula (2) and independently represents an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms. Examples of compounds represented by Formula (i) include the following compounds.

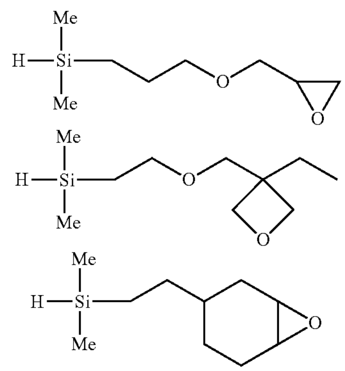

In the production method (i), a solvent such as tetrahydrofuran, toluene, or ethyl acetate may be used. It is preferable to perform the reaction in the presence of an acid such as sulfuric acid. The reaction is preferably performed under an inert atmosphere such as nitrogen ($N_2$). In addition, it is preferable to perform the reaction while stirring. It is possible to easily synthesize a siloxane polymer into which various reactive groups are introduced in one pot by the production method (i).

In the production method (ii), a solvent such as tetrahydrofuran, toluene, or ethyl acetate may be used. The reaction is preferably performed under an inert atmosphere such as nitrogen ($N_2$). In addition, it is preferable to perform the reaction while stirring.

When a hydrosilane compound is used as the compound represented by Formula (e), it is preferable to perform the reaction in the presence of a Lewis acid such as tris (pentafluorophenyl)borane($B(C_6F_5)_3$) or aluminum chloride.

When a halogenated silyl compound is used as the compound represented by Formula (e), it is preferable to perform the reaction in the presence of a basic compound such as triethylamine, ($Et_3N$), or pyridine.

When an alkoxysilyl compound is used as the compound represented by Formula (e), it is preferable to perform the reaction in the presence of a tin catalyst or the like.

In the production methods (iii) and (iv), a solvent such as tetrahydrofuran, toluene, or ethyl acetate may be used. It is preferable to perform the hydrosilylation reaction in the presence of a transition metal catalyst such as a Karstedt's catalyst. The reaction is preferably performed under an inert atmosphere such as nitrogen ($N_2$). In addition, it is preferable to perform the reaction while stirring.

A siloxane polymer represented by Formula (J-1) can be suitably produce by the above production methods (i) and (ii).

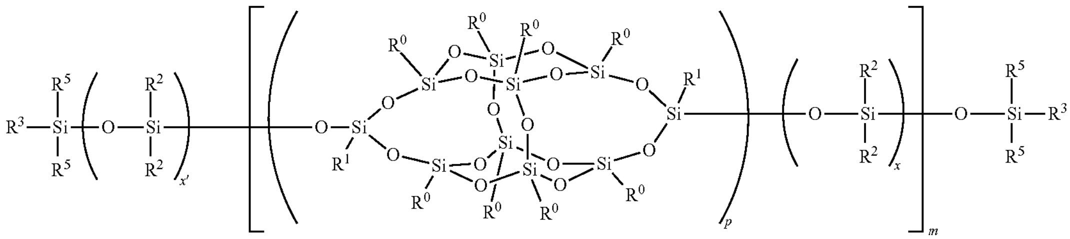
(J-1)

In addition, it is possible to suitably produce the siloxane polymer represented by Formula (J-2) by the above production method (iii) and the siloxane polymer represented by Formula (J-3) by the above production method (iv).

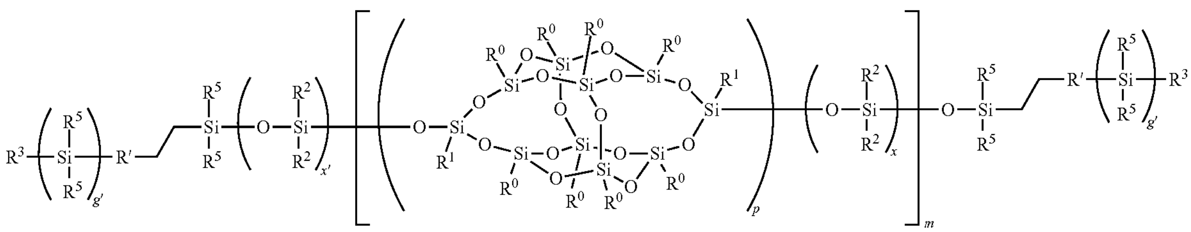
(J-2)

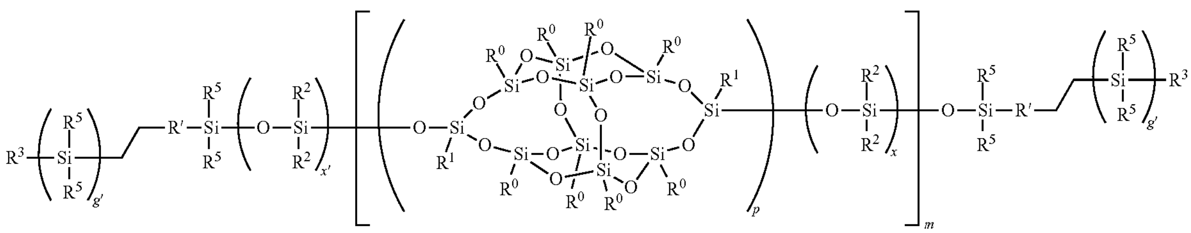
(J-3)

In the above formula, $R^0$ to $R^3$, $R^5$, R', p, x, x', g', and m are each independently defined the same as $R^0$ to $R^3$, $R^5$, R', p, x, x', g', and m in Formulae (a) to (i), (1), and (2).

2.2 Method of Producing a Siloxane Polymer Containing a Repeating Unit Represented by Formula (1-2)

Examples of methods of producing a siloxane polymer containing a repeating unit represented by Formula (1-2) include the following methods of producing a siloxane polymer (I) and (II).

(I): A method of producing a siloxane polymer including a process of reacting a silicon compound represented by Formula (a) and a silicon compound represented by Formula (b) with a compound having a reactive group and represented by Formula (k).

(II): A method of producing a siloxane polymer including a process of reacting a silicon compound represented by Formula (a) and a silicon compound represented by Formula (b) with a compound having a reactive group and represented by Formula (l).

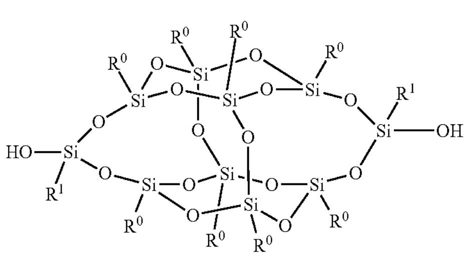
(a)

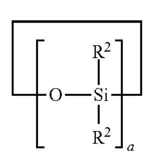
(b)

-continued (k)

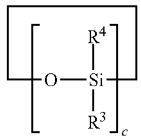

(l)

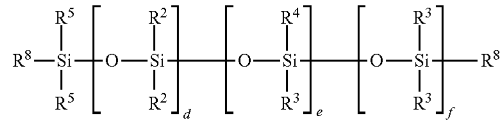

(1-2)

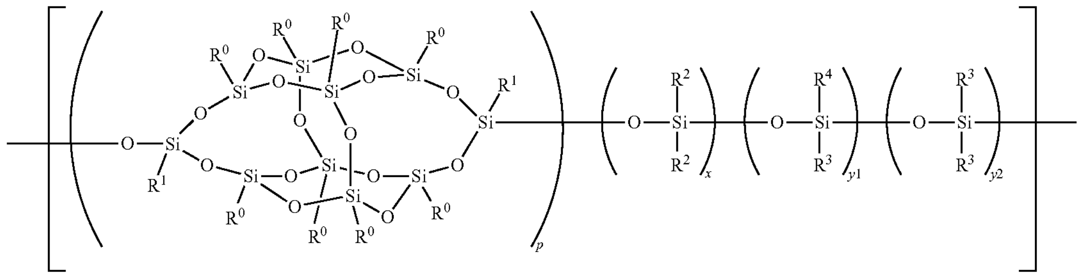

In the above formula, $R^0$'s independently represent an aryl group having 6 to 20 carbon atoms or a cycloalkyl group having 5 to 6 carbon atoms, and in the aryl group having 6 to 20 carbon atoms and the cycloalkyl group having 5 to 6 carbon atoms, any hydrogen atom may be independently substituted with a fluorine atom or an alkyl group having 1 to 20 carbon atoms;

$R^1$ and $R^8$ independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^2$, $R^4$, $R^5$, and $R^6$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^3$ represents a monovalent group having a reactive group;

R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms;

p represents an integer of 1 or more;

x represents an integer of 1 to 30;

y1 and y2 represent an integer of 0 to 30, here, $y1+y2\geq 1$;

a and c represent an integer of 3 to 30; and d, e, and f represent an integer of 0 to 1,000, here $e+f\geq 1$.

Hereinafter, the compound represented by Formula (k) and the compound represented by formula (1) used in the production methods (I) and (II) will be described. Here, the compound represented by Formula (a) and the compound represented by Formula (b) are the same as the compound represented by Formula (a) described in the section of "2.1 Method of producing a siloxane polymer containing a repeating unit represented by Formula (1-1) and a group represented by Formula (2) as terminals."

(Compound Represented by Formula (k))

In one embodiment of the disclosure, when the compound represented by Formula (k) is used, a siloxane polymer in which a monovalent group having a reactive group $R^3$ is introduced into a side chain can be obtained.

(k)

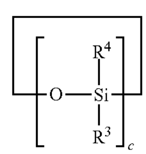

In the above formula, $R^4$'s independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms.

$R^3$ represents a monovalent group having a reactive group.

c represents an integer of 3 to 30, and is preferably 3 to 20, and more preferably 3 to 10.

Specific examples of $R^3$ and $R^4$ include those described in the sections of ($R^3$) and ($R^2$, $R^4$, $R^5$, $R^6$) of "1. Siloxane polymer."

Specific examples of compounds represented by Formula (k) preferably include the following compound 2,4,6,8-tetramethyl-2,4,6,8-tetrakis[2-(3,4-epoxycyclohexyl)ethyl] cyclotetrasiloxane.

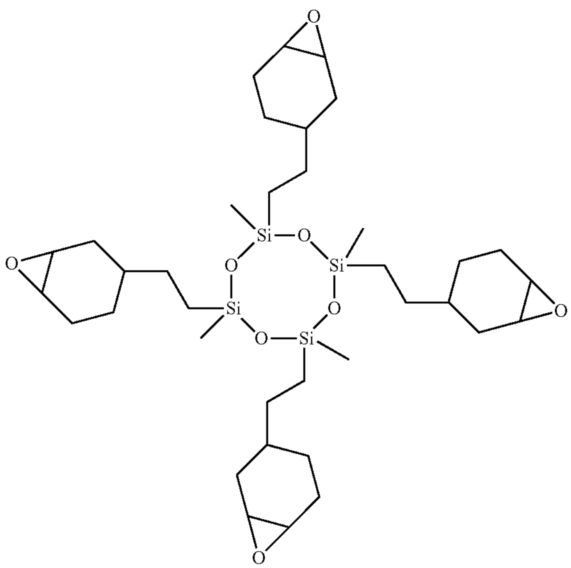 [SMILES: C[Si]1(CCC2CCC3OC3C2)O[Si](C)(CCC2CCC3OC3C2)O[Si](C)(CCC2CCC3OC3C2)O[Si](C)(CCC2CCC3OC3C2)O1]

(Compound Represented by Formula (l))

In one embodiment of the disclosure, when the compound represented by Formula (l) is used, a siloxane polymer in which a monovalent group having a reactive group $R^3$ is introduced into a side chain can be obtained.

$$R^8-\underset{R^5}{\overset{R^5}{Si}}-\left[O-\underset{R^2}{\overset{R^2}{Si}}\right]_d-\left[O-\underset{R^3}{\overset{R^4}{Si}}\right]_e-\left[O-\underset{R^3}{\overset{R^3}{Si}}\right]_f-R^8 \quad (l)$$

In the above formula, $R^2$, $R^4$, and $R^5$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms.

$R^3$ represents a monovalent group having a reactive group.

$R^8$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms.

c represents an integer of 3 to 30, and is preferably 3 to 24, and more preferably 3 to 20.

Specific examples of $R^2$, $R^3$, $R^4$, and $R^5$ include those described in the sections of ($R^3$) and ($R^2$, $R^4$, $R^5$, $R^6$) of "1. Siloxane polymer." In addition, for $R^8$, the same description for $R^1$ is applied.

Specific examples of compounds represented by Formula (l) preferably include the following compounds.

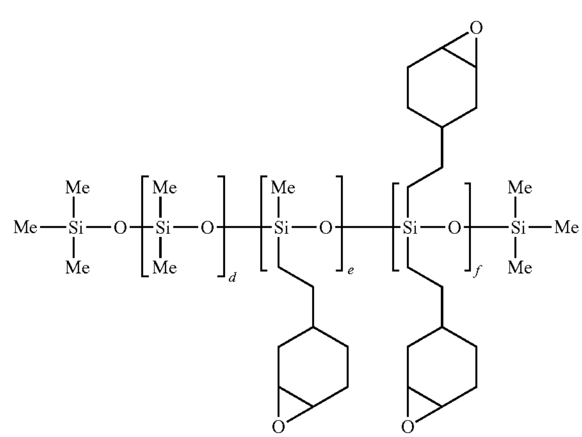

The above compound can be synthesized by, for example, as follows.

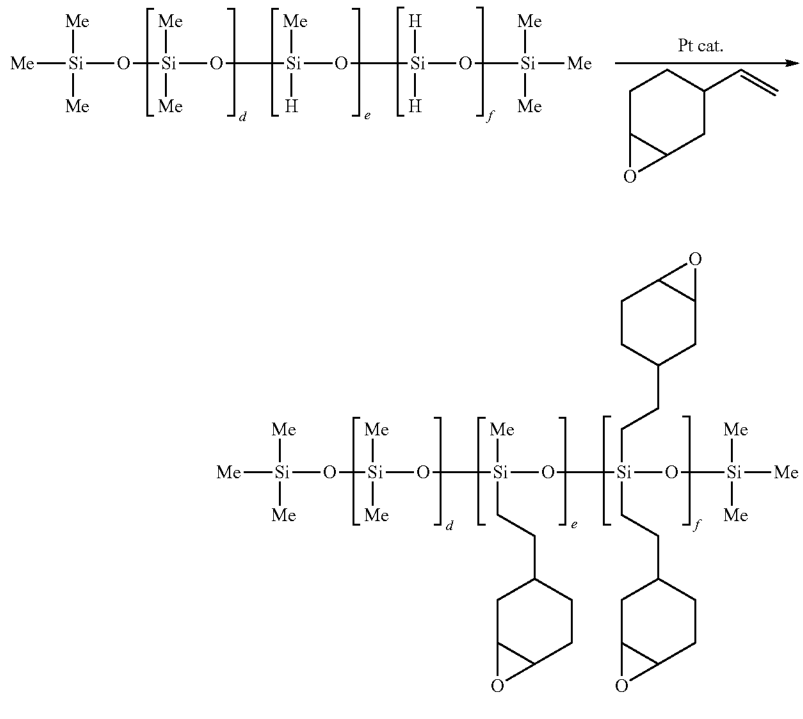

In the above production methods (I) and (II), a solvent such as tetrahydrofuran, toluene, or ethyl acetate may be used. It is preferable to perform the reaction in the presence of an acid such as sulfuric acid. The reaction is preferably performed under an inert atmosphere such as nitrogen ($N_2$). In addition, it is preferable to perform the reaction while stirring.

A siloxane polymer represented by Formula (J-4) can be suitably produced by the above production method (i). Here, as described above, in (J-4) to (J-15), $S^1$ is shown below.

In the above formula, $R^0$ to $R^4$, and y1 are defined the same as $R^0$ to $R^4$, and y1 in Formula (1-2); $S^1$ is as described above; q, x', y1', and y2' represent an integer of 0 to 30; and m represents a number satisfying a weight average molecular weight of 2,000 to 10,000,000.

In addition, a siloxane polymer represented by Formula (J-5) and a siloxane polymer represented by Formula (J-6) can be suitably produced by the above production method (II).

($S^1$)

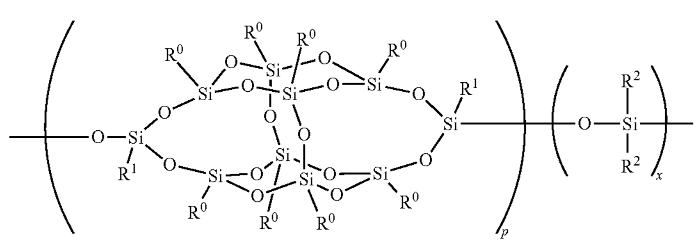

(J-4)

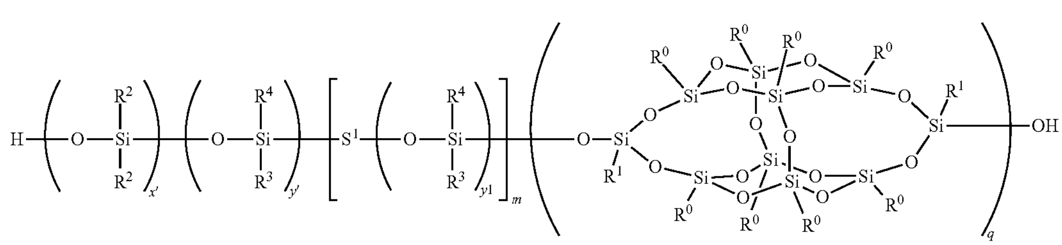

(J-5)

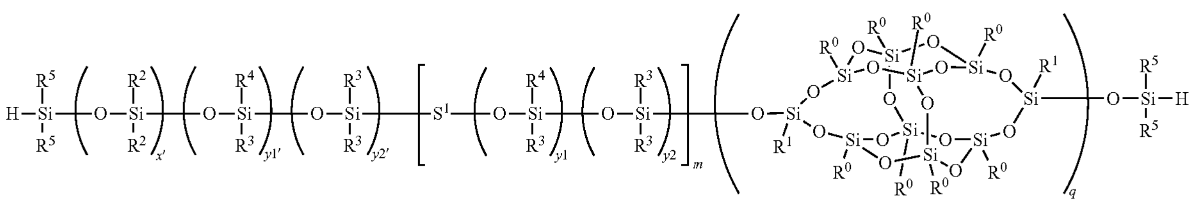

(J-6)

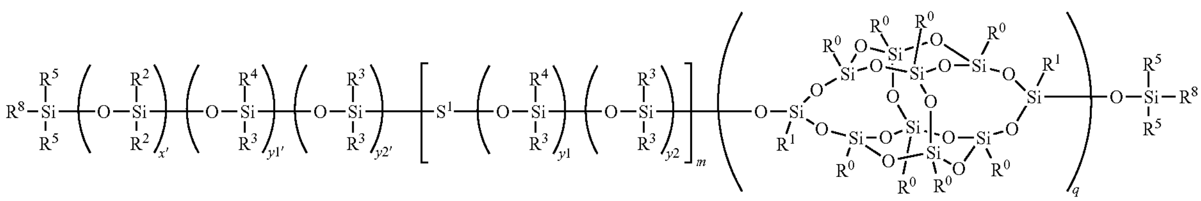

In the above formula, $R^0$ to $R^5$, $R^8$, x, y1, and y2 are each independently defined the same as $R^0$ to $R^5$, $R^8$, x, y1, and y2 in Formulae (a), (b), (k), (l), and (1-2);

q, x', y1', and y2' represent an integer of 0 to 30; and the reaction in the presence of a basic compound such as triethylamine, ($Et_3N$), or pyridine.

When an alkoxysilyl compound is used as the compound represented by Formula (e), it is preferable to perform the reaction in the presence of a tin catalyst or the like.

(e)

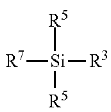

(J-7)

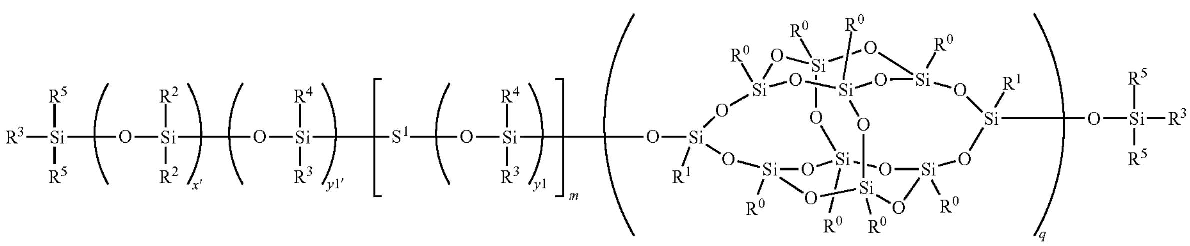

m represents a number satisfying a weight average molecular weight of 2,000 to 10,000,000.

<Method of Producing Siloxane Polymer Represented by Formula (J-7)>

A siloxane polymer represented by Formula (J-7) can be obtained by reacting the siloxane polymer represented by Formula (J-4) with a compound represented by Formula (e).

In this reaction, a solvent such as tetrahydrofuran, toluene, or ethyl acetate may be used. The reaction is preferably performed under an inert atmosphere such as nitrogen ($N_2$). In addition, it is preferable to perform the reaction while stirring.

When a hydrosilane compound is used as the compound represented by Formula (e), it is preferable to perform the reaction in the presence of a Lewis acid such as tris(pentafluorophenyl)borane($B(C_6F_5)_3$) or aluminum chloride.

When a halogenated silyl compound is used as the compound represented by Formula (e), it is preferable to perform In the above formula, $R^0$ to $R^4$, x', y1, y1', q, m, and $S^1$ are each independently defined the same as $R^0$ to $R^4$, x', y1, y1', q, m, and $S^1$ in Formula (J-4);

$R^5$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, and in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^7$ represents a hydrogen atom, a fluorine atom, or an alkoxy group having 1 to 20 carbon atoms.

<Method of Producing Siloxane Polymer Represented by Formula (J-8)>

In the above Process (I), when the compound represented by Formula (q) is added and reacted, a siloxane polymer represented by Formula (J-8) can be obtained (method of producing siloxane polymer represented by Formula (J-8) (I-1)).

In addition, a siloxane polymer represented by Formula (J-8) can be obtained by reacting the siloxane polymer represented by Formula (J-4) with the compound represented by Formula (n) (method of producing siloxane polymer represented by Formula (J-8) (I-2)).

f represents an integer of 1 to 1,000.

Hereinafter, a compound represented by Formula (q) and a compound represented by Formula (n) will be described.

(Compound Represented by Formula (q))

In Formula (q), $R^5$'s independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene (q)

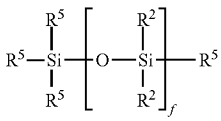

(n)

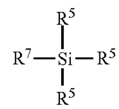

(J-8)

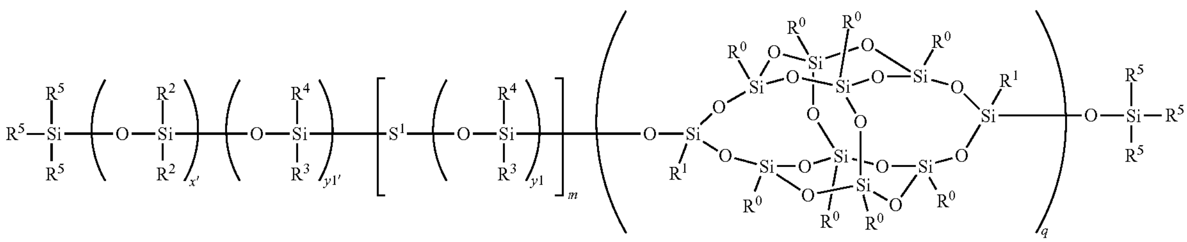

In the above formula, $R^0$ to $R^4$, x', y1, y1', q, m, and $S^1$ are each independently defined the same as $R^0$ to $R^4$, x', y1, y1', q, m, and $S^1$ in Formulae (a), (b), (k), and (J-4);

$R^5$'s independently represent an aryl group having 6 to 20 carbon atoms, a cycloalkyl group having 5 to 6 carbon atoms, an arylalkyl group having 7 to 40 carbon atoms, an alkyl group having 1 to 40 carbon atoms, or an alkoxy group having 1 to 20 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms in the alkoxy group having 1 to 20 carbon atoms, any hydrogen atom may be independently substituted with a fluorine atom, and any —$CH_2$— may be independently substituted with a cycloalkylene group having 5 to 20 carbon atoms;

$R^7$ represents a hydrogen atom, a fluorine atom, or an alkoxy group having 1 to 20 carbon atoms; and group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; and f represents an integer of 1 to 1,000.

For $R^5$, the same description in the section of ($R^2$, $R^4$, $R^5$, $R^6$) of "1. Siloxane polymer" is applied.

Examples of compounds represented by Formula (q) include hexamethyldisiloxane, octamethyltrisiloxane, decamethyltetrasiloxane, hexaphenyldisiloxane, octaphenyl trisiloxane, and decaphenyl tetrasiloxane.

(Compound Represented by Formula (n))

In Formula (n), $R^7$ represents a hydrogen atom, a halogen atom, or an alkoxy group having 1 to 20 carbon atoms;

$R^5$'s independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms.

For $R^5$, the same description in the section of ($R^2$, $R^4$, $R^5$, $R^6$) of "1. Siloxane polymer" is applied.

Examples of compounds represented by Formula (n) include the following compounds.

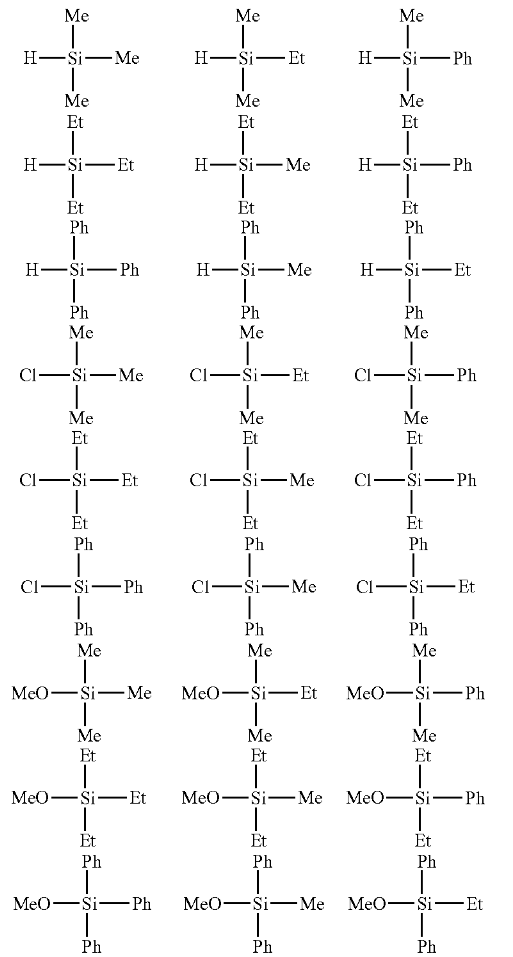

-continued

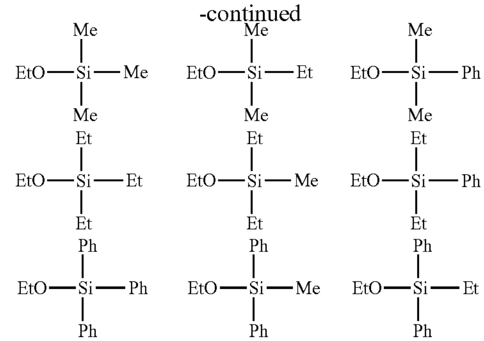

In the production methods (I-1) and (I-2), a solvent such as tetrahydrofuran, toluene, or ethyl acetate may be used. The reaction is preferably performed under an inert atmosphere such as nitrogen ($N_2$). In addition, it is preferable to perform the reaction while stirring.

In the production method (I-1), it is preferable to perform the reaction in the presence of an acid such as sulfuric acid.

In the production method (I-2), when a hydrosilane compound is used as the compound represented by Formula (n), it is preferable to perform the reaction in the presence of a Lewis acid such as tris(pentafluorophenyl)borane($B(C_6F_5)_3$) or aluminum chloride. When a halogenated silyl compound is used as the compound represented by Formula (n), it is preferable to perform the reaction in the presence of a basic compound such as triethylamine, ($Et_3N$), or pyridine. When an alkoxysilyl compound is used as the compound represented by Formula (n), it is preferable to perform the reaction in the presence of a tin catalyst or the like.

<Method of Producing Siloxane Polymer Represented by Formula (J-9)>

In the above Process (I), when the compound represented by Formula (r) is added and reacted, a siloxane polymer represented by Formula (J-9) can be obtained (method of producing a siloxane polymer represented by Formula (J-9) (I-3)). The production method (I-3) is preferably performed in the presence of an acid such as sulfuric acid.

A siloxane polymer represented by Formula (J-9) can be obtained by reacting the siloxane polymer represented by Formula (J-4) with the compound represented by Formula (p) (method of producing a siloxane polymer represented by Formula (J-9) (I-4)). The production method (I-4) is preferably performed in the presence of an acid such as sulfuric acid.

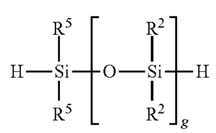

(r)

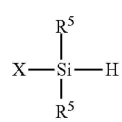

(p)

(J-9)

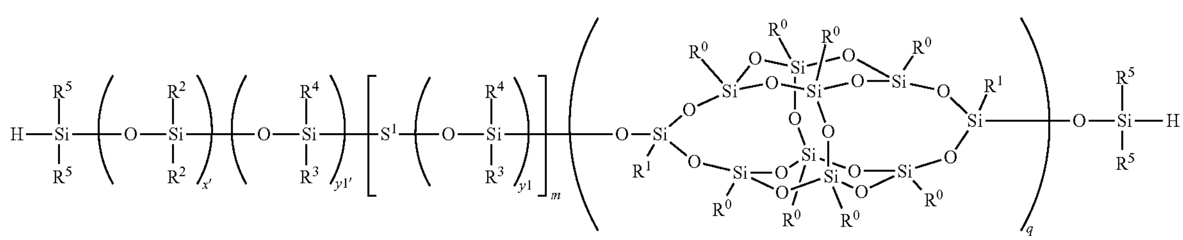

In the above formula, $R^0$ to $R^4$, x', y1, y1', q, m, and $S^1$ are each independently defined the same as $R^0$ to $R^4$, x', y1, y1', q, m, and $S^1$ in Formulae (a), (b), (k), and (J-4);

X represents a halogen atom;

$R^5$'s independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; and g represents an integer of 1 to 10,200.

Hereinafter, a compound represented by Formula (r) and a compound represented by Formula (p) will be described.

(Compound Represented by Formula (r))

In Formula (r), $R^2$ and $R^5$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

g represents an integer of 1 to 1,000.

For $R^2$ and $R^5$, the same description in the section of ($R^2$, $R^4$, $R^5$, $R^6$) of "1. Siloxane polymer" is applied.

g is preferably 1 to 500, and more preferably 1 to 300.

Examples of compounds represented by Formula (r) include 1,1,3,3-tetramethyldisiloxane, 1,1,3,3,5,5-hexamethyltrisiloxane, 1,1,3,3,5,5,7,7-octamethyltetrasiloxane, 1,1,3,3,5,5,7,7,9,9-decamethylpentasiloxane, 1,1,3,3,5,5,7,7,9,9,11,11-dodecamethylhexasiloxane, 1,3-dimethyl-1,3-diphenyldisiloxane, 1,1,3,3-tetraphenyldisiloxane, 1,3-cyclohexyl-1,3-dimethyldisiloxane, 1,1,3,3-tetracyclohexyldisiloxane, 1,3-diethyl-1,3-dimethyldisiloxane, 1,1,3,3-tetraethyldisiloxane, 1,3-dimethyl-1,3-dipropyldisiloxane, 1,3-diethyl-1,3-dipropyldisiloxane, 1,1,3,3-tetrapropyldisiloxane, 1,3-dimethyl-1,3-bis(1-methylethyl)disiloxane, 1,3-diethyl-1,3-bis(1-methylethyl)disiloxane, 1,1,3,3-tetrakis(1-methylethyl)disiloxane, 1,1,3,3-tetrakis(1,1-dimethylethyl)disiloxane, 1,3-bis(1,1-dimethylethyl)-1,3-dimethyldisiloxane, DMS-Hm15 (commercially available from Gelest), DMS-Hm25 (commercially available from Gelest), DMS-H03 (commercially available from Gelest), DMS-H11 (commercially available from Gelest), FM 1105 (commercially available from JNC), and FM 1111 (commercially available from JNC).

(Compound Represented by Formula (p))

In Formula (p) $R^5$'s independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; and X represents a halogen atom.

For $R^5$, the same description in the section of ($R^2$, $R^4$, $R^5$, $R^6$) of "1. Siloxane polymer" is applied.

Preferable examples of halogen atoms include a fluorine atom, a chlorine atom, and a bromine atom, and a fluorine atom is more preferable.

Examples of compounds represented by Formula (p) include fluorodimethylsilane, ethylfluoromethylsilane, diethylfluorosilane, fluoromethylpropylsilane, ethylfluoropropylsilane, fluorodipropylsilane, fluoromethyl(1-methylethyl)silane, ethylfluoro(1-methylethyl)silane, fluorobis(1-methylethyl)silane, fluoro(1-methylethyl)propylsilane, fluorobutylmethylsilane, ethylbutylfluorosilane, butylfluoropropylsilane, butylfluoro(1-methylethyl)silane, dibutylfluorosilane, sec-butylfluoro-methylsilane, ethyl-sec-butylfluorosilane, sec-butylfluoropropylsilane, sec-butylfluoro(1-methylethyl)silane, di-sec-butylfluorosilane, fluoro-tert-butylmethylsilane, ethyl-tert-butylfluorosilane, tert-butylfluoropropylsilane, tert-butylfluoro(1-methylethyl)silane, di-tert-butylfluorosilane, n-butyl-sec-butylfluorosilane, n-butyl-tert-butylfluorosilane, sec-butyl-tert-butylfluorosilane, fluorodiphenylsilane, fluoromethylphenylsilane, dicyclohexylfluorosilane, chlorodimethylsilane, ethylchloromethylsilane, diethylchlorosilane, chloromethylpropylsilane, ethylchloropropylsilane, chlorodipropylsilane, chloromethyl(1-methylethyl)silane, ethylchloro(1-methylethyl)silane, chlorobis(1-methylethyl)silane, chloro(1-methylethyl)propylsilane, chlorobutylmethylsilane, ethylchlorobutylsilane, chlorobutylpropylsilane, chlorobutyl(1-methylethyl)silane, chlorodibutylsilane, chloro-sec-butylmethylsilane, ethylchloro-sec-butylsilane, chloro-sec-butylpropylsilane, chloro-sec-butyl(1-methylethyl)silane, chlorodi-sec-butylsilane, chloro-tert-butylmethylsilane, ethylchloro-tert-butylsilane, chloro-tert-butylpropylsilane, chloro-tert-butyl(1-methylethyl)silane, chlorodi-tert-butylsilane, chloro-n-butyl-sec-butylsilane, chloro n-butyl-tert-butylsilane, chloro-sec-butyl-tert-butylsilane, chlorodiphenylsilane, chloromethylphenylsilane, chlorodicyclohexylsilane, bromodimethylsilane, bromoethylmethylsilane, bromodiethylsilane, bromomethylpropylsilane, bromoethylpropylsilane, bromodipropylsilane, bromomethyl(1-methylethyl)silane, bromoethyl(1-methylethyl)silane, bromobis(1-methylethyl)silane, bromo(1-methylethyl)propylsilane, bromobutylmethylsilane, bromoethylbutylsilane, bromobutylpropylsilane, bromobutyl(1-methylethyl)silane, bromodibutylsilane, bromo-sec-butylmethylsilane, bromoethyl-sec-butylsilane, bromo-sec-butylpropylsilane, bromo-sec-butyl(1-methylethyl)silane, bromodi-sec-butylsilane, bromo-tert-butylmethylsilane, bromoethyl-tert-butylsilane, bromo-tert-butylpropylsilane, bromo-tert-butyl(1-methylethyl)silane, bromodi-tert-butylsilane, bromo-n-butyl-sec-butylsilane, bromo-n-butyl-tert-butylsilane, bromo-sec-butyl-tert-butylsilane, bromodiphenylsilane, bromomethylphenylsilane, bromodicyclohexylsilane, iododimethylsilane, ethyliodomethylsilane, diethyliodosilane, iodomethylpropylsilane, ethyliodopropylsilane, iododipropylsilane, iodomethyl(1-methylethyl)silane, ethyl iodo(1-methylethyl)silane, iodobis(1-methylethyl)silane, iodo(1-methylethyl)propylsilane, butyl iodomethylsilane, ethylbutyliodosilane, butyliodopropylsilane, butyliodo(1-methylethyl)silane, dibutyliodosilane, sec-butyliodomethylsilane, ethyl-sec-butyliodosilane, sec-butyliodopropylsilane, sec-butyl(1-methylethyl)iodosilane, di-sec-butyliodosilane, tert-butyliodomethylsilane, ethyl-tert-butyliodosilane, tert-butyliodopropylsilane, tert-butyliodo(1-methylethyl)silane, di-tert-butyliodosilane, n-butyl-sec-butyliodosilane, n-butyl-tert-butyliodosilane sec-butyl-tert-butyliodosilane, iododiphenylsilane, iodomethylphenylsilane, and dicyclohexyliodosilane.

<Method of Producing Siloxane Polymer Represented by Formula (J-10)>

A siloxane polymer represented by Formula (J-10) can be obtained by reacting the siloxane polymer represented by Formula (J-5) with the compound represented by Formula (g).

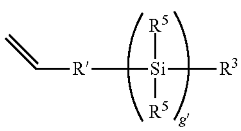

(g)

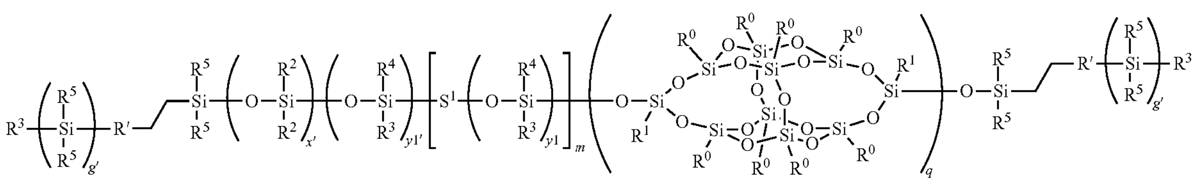

(J-10)

In the above formula, $R^0$ to $R^5$, x', y1, y1', q, m, and $S^1$ are each independently defined the same as $R^0$ to $R^4$, x', y1, y1', q, m, and $S^1$ in Formula (J-5);

in Formula (g), $R^5$'s are independently selected from the groups defined for $R^5$ in Formula (J-5);

g' is 0 or 1;

R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms.

<Method of Producing Siloxane Polymer Represented by Formula (J-11)>

A siloxane polymer represented by Formula (J-11) can be obtained by reacting the siloxane polymer represented by Formula (J-9) with the compound represented by Formula (g).

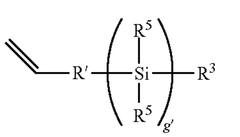

(g)

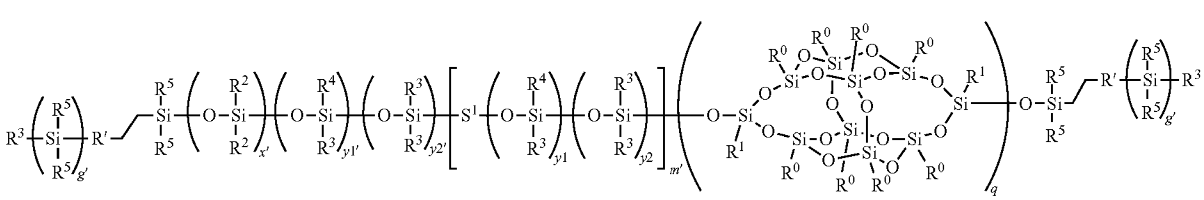

(J-11)

In the above formula, $S^1$, $R^0$ to $R^5$, x', y1, y1', q, m, and $S^1$ are each independently defined the same as $S^1$, $R^0$ to $R^5$, x', y1, y1', q, m, and $S^1$ in Formula (J-9); in Formula (g), and $R^5$'s are independently selected from the groups defined for $R^5$ in Formula (J-9);

R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms.

3. Method of Producing a Siloxane Polymer Containing a Repeating Unit Represented by Formula (1-3)

A siloxane polymer containing a repeating unit represented by Formula (1-3) can be suitably produced by, for example, the following methods of producing a siloxane polymer (III) to (VI).

A method of producing a siloxane polymer (III), including (III-1) a process of reacting a silicon compound represented by Formula (a) and a silicon compound represented by Formula (b) with a compound represented by Formula (m); and (III-2) a process of reacting the silicon compound obtained in the above process (III-1) with a compound represented by Formula (g).

A method of producing a siloxane polymer (IV), including (IV-1) a process of reacting a silicon compound represented by Formula (a) and a silicon compound represented by Formula (b) with a compound represented by Formula (m);

(IV-2) a process of reacting the silicon compound obtained in the above process (IV-1) with a compound represented by Formula (e); and (IV-3) a process of reacting the silicon compound obtained in the above process (IV-2) with a compound represented by Formula (g).

A method of producing a siloxane polymer (V), including (V-1) a process of reacting a silicon compound represented by Formula (a) and a silicon compound represented by Formula (b) with a compound represented by Formula (m);

(V-2) a process of reacting the silicon compound obtained in the above process (V-1) with a compound represented by Formula (n); and (V-3) a process of reacting the silicon compound obtained in the above process (V-2) with a compound represented by Formula (g).

A method of producing a siloxane polymer (VI), including (VI-1) a process of reacting a silicon compound represented by Formula (a) and a silicon compound represented by Formula (b) with a compound represented by Formula (m);

(VI-2) a process of reacting the silicon compound obtained in the process (VI-1) with a compound represented by Formula (p); and (VI-3) a process of reacting the silicon compound obtained in the process (VI-2) with a compound represented by Formula (g).

(a)

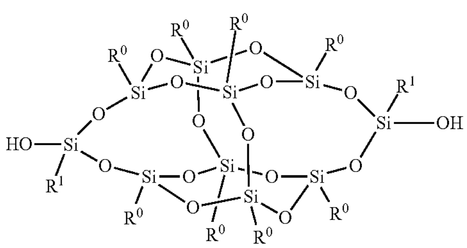

(b)

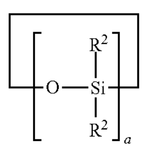

(m)

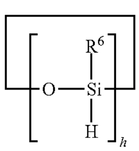

(g)

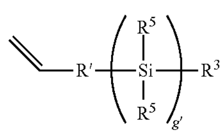

(e)

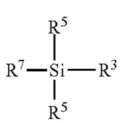

(n)

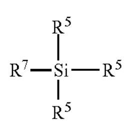

(p)

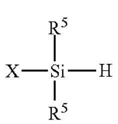

-continued (1-3)

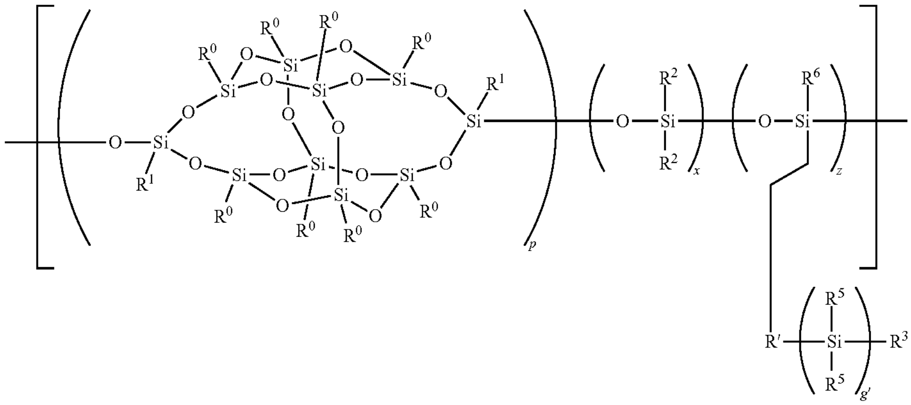

In Formula (1-3), $R^0$, $R^1$, $R^2$, $R^3$, $R^5$, $R^6$, R', p, x, z, and g' are defined the same as $R^0$, $R^1$, $R^2$, $R^3$, $R^6$, R', p, x, z, and g' in Formula (1).

Formulae (a), (b), (g), (e), (n), and (p) are the same as those described in the method of producing a polymer represented by Formula (1-1) and the method of producing a polymer represented by Formula (1-2).

(Compound Represented by Formula (m))

In Formula (m), $R^6$'s independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

h represents an integer of 1 to 40.

For $R^6$, the same description in the section of ($R^2$, $R^4$, $R^5$, $R^6$) of "1. Siloxane polymer" is applied.

Examples of compounds represented by Formula (m) include 2,4,6-trimethylcyclotrisiloxane, 2,4,6-triethylcyclotrisiloxane, 2,4,6-tris(1-methylethyl)cyclotrisiloxane, tripropylcyclotrisiloxane, 2,4,6-tris(1,1-dimethylethyl)cyclotrisiloxane, 2,4,6-tris(1,1-dimethylethyl)cyclotrisiloxane, 2,4,6,8-tetramethylcyclotetrasiloxane, 2,4,6,8-tetraethylcyclotetrasiloxane, 2,4,6,8,10-pentamethylcyclopentasiloxane, and 2,4,6,8,10-pentaethylcyclopentasiloxane.

<Method of Producing Siloxane Polymer Represented by Formula (J-12)>

A siloxane polymer represented by Formula (J-12) can be suitably produced by the method of producing a siloxane polymer (III).

A silicon compound represented by the following Formula (J-0) is generated by reacting a silicon compound represented by Formula (a) and a silicon compound represented by Formula (b) with a compound represented by Formula (m) (Process (III-1)

(J-0)
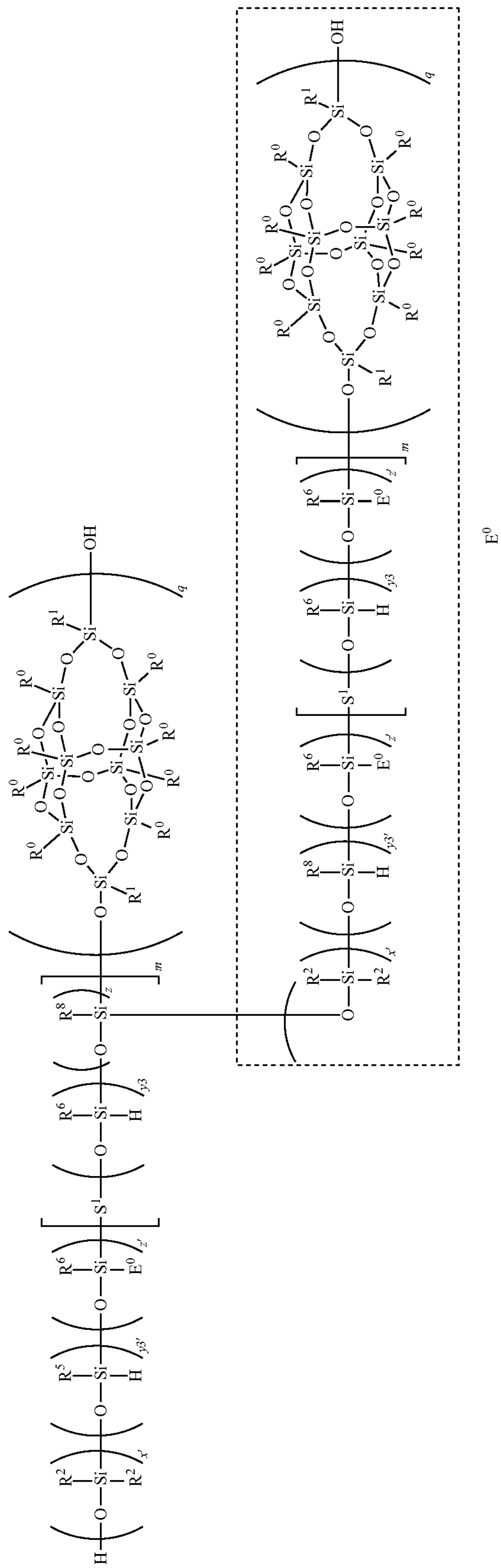

In addition, a siloxane polymer represented by Formula (J-12) can be produced by reacting the silicon compound obtained in Process (III-1) with the compound represented by Formula (g) (Process (III-2)).

(J-12)
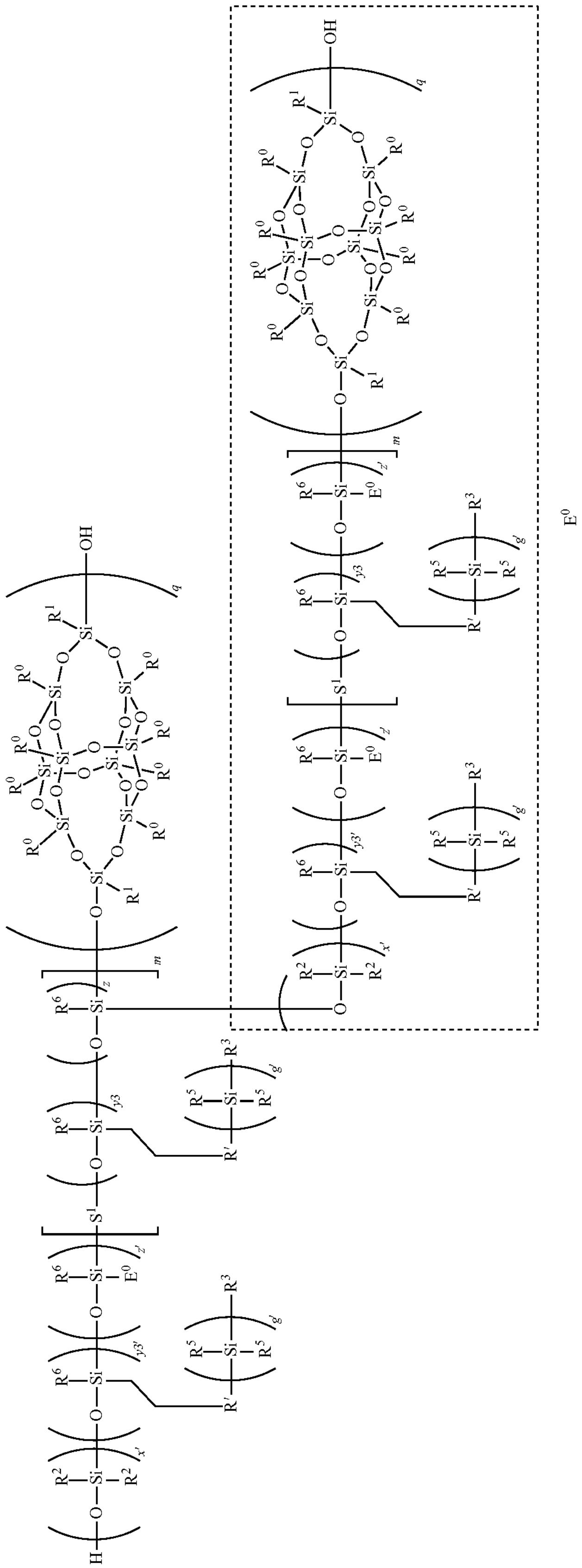

In Processes (III-1) and (III-2), a solvent such as tetrahydrofuran, toluene, or ethyl acetate may be used. It is preferable to perform the reaction in the presence of an acid such as sulfuric acid. The reaction is preferably performed under an inert atmosphere such as nitrogen ($N_2$). In addition, it is preferable to perform the reaction while stirring.

<Method of Producing Siloxane Polymer Represented by Formula (J-13)>

A siloxane polymer represented by Formula (J-13) can be suitably produced by the method of producing a siloxane polymer (IV).

First, according to a process of reacting a silicon compound represented by Formula (a) and a silicon compound represented by Formula (b) with a compound represented by Formula (m), a silicon compound represented by Formula (J-0) is generated (Process (IV-1)). In Process (IV-1), it is preferable to perform the reaction in the presence of an acid such as sulfuric acid.

Next, the silicon compound represented by Formula (J-0) obtained in Process (IV-1) is reacted with the compound represented by Formula (e) to generate a silicon compound represented by the following Formula (J-01) (Process (IV-2)). In Process (IV-2), when a hydrosilane compound is used as the compound represented by Formula (e), it is preferable to perform the reaction in the presence of a Lewis acid such as tris(pentafluorophenyl)borane($B(C_6F_5)_3$) or aluminum chloride. In addition, when a halogenated silyl compound is used as the compound represented by Formula (e), it is preferable to perform the reaction in the presence of a basic compound such as triethylamine, ($Et_3N$), or pyridine. When an alkoxysilyl compound is used as the compound represented by Formula (e), it is preferable to perform the reaction in the presence of a tin catalyst or the like.

(J-01)
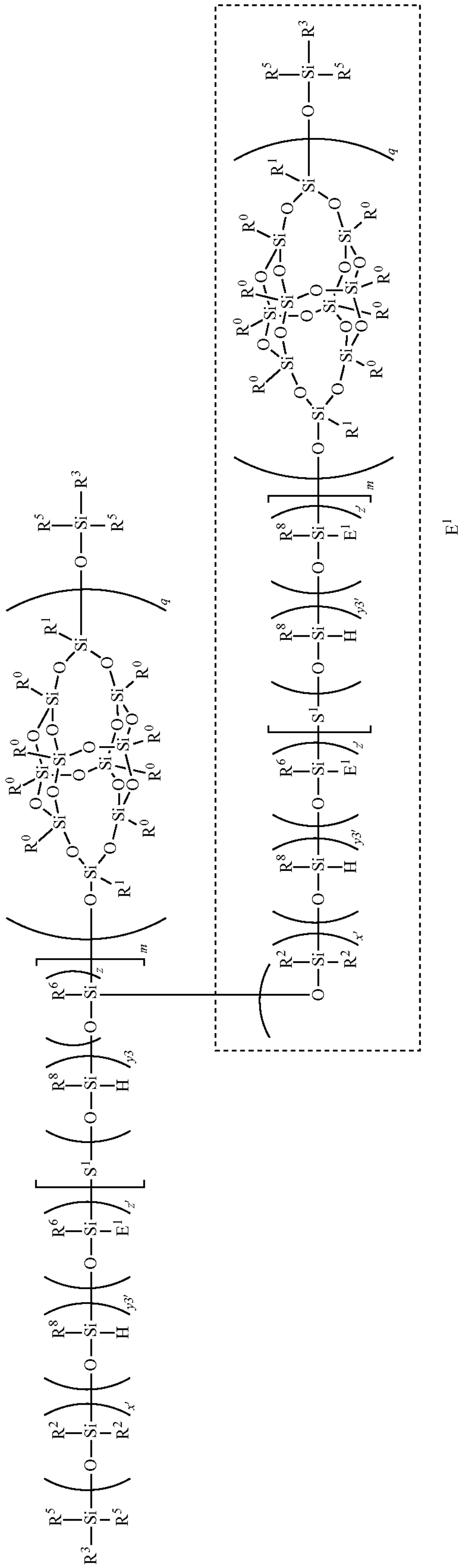

Next, a siloxane polymer represented by Formula (J-13) can be produced by reacting the silicon compound obtained in the above Process (IV-2) with the compound represented by Formula (g) (Process (IV-3)). In Process (IV-3), it is preferable to perform the hydrosilylation reaction in the presence of a transition metal catalyst such as a Karstedt's catalyst.

(J-13)
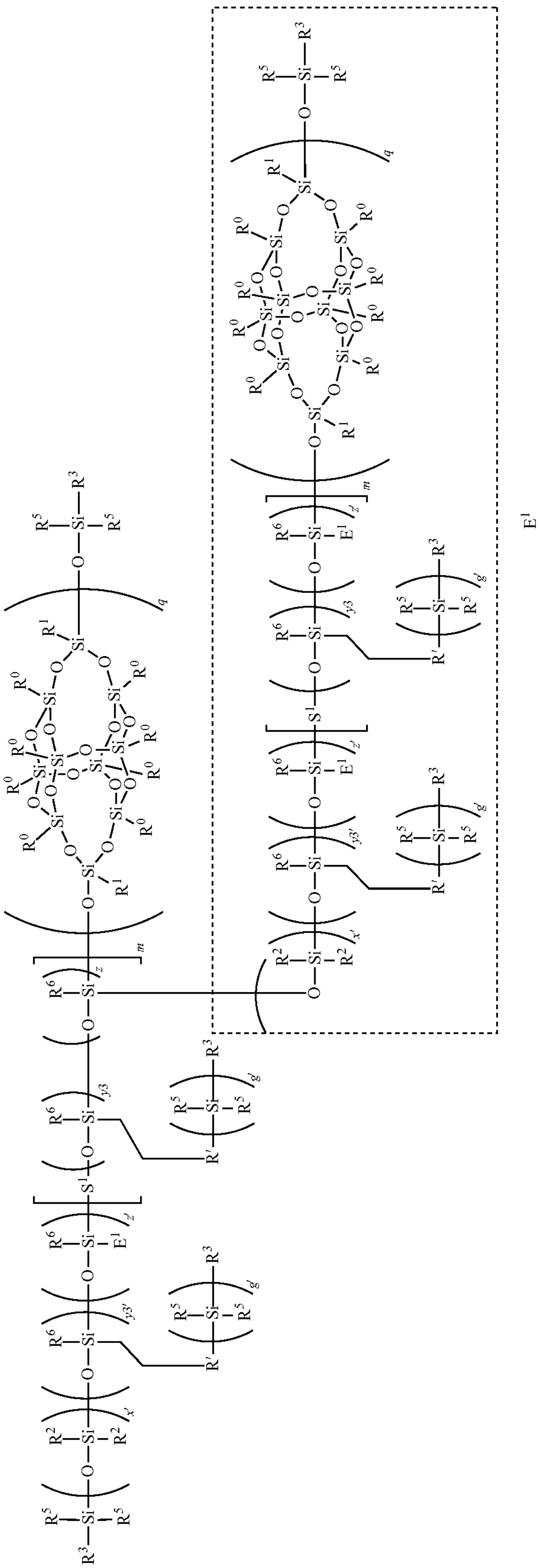

In Processes (IV-1) to (IV-3), a solvent such as tetrahydrofuran, toluene, or ethyl acetate may be used. The reaction is preferably performed under an inert atmosphere such as nitrogen ($N_2$). In addition, it is preferable to perform the reaction while stirring.

<Method of Producing Siloxane Polymer Represented by Formula (J-14)>

A siloxane polymer represented by Formula (J-14) can be suitably produced by the method of producing a siloxane polymer (I).

First, according to a process of reacting a silicon compound represented by Formula (a) and a silicon compound represented by Formula (b) with a compound represented by Formula (m), a silicon compound represented by Formula (J-0) is generated (Process (V-1)). In Process (V-1), it is preferable to perform the reaction in the presence of an acid such as sulfuric acid.

Next, the silicon compound represented by Formula (J-0) obtained in the process (V-1) is reacted with the compound represented by Formula (n) to generate a silicon compound represented by the following Formula (J-02) (process (V-2)). In Process (V-2), when $R^7$ is a hydrogen atom in the compound represented by Formula (n), it is preferable to perform the reaction in the presence of a Lewis acid such as tris(pentafluorophenyl)borane($B(C_6F_5)_3$) or aluminum chloride. In addition, when $R^7$ is a halogen atom in the compound represented by Formula (n), it is preferable to perform the reaction in the presence of a basic compound such as triethylamine, ($Et_3N$), or pyridine. When $R^7$ is an alkoxy group in the compound represented by Formula (n), it is preferable to perform the reaction in the presence of a tin catalyst or the like.

(J-02)
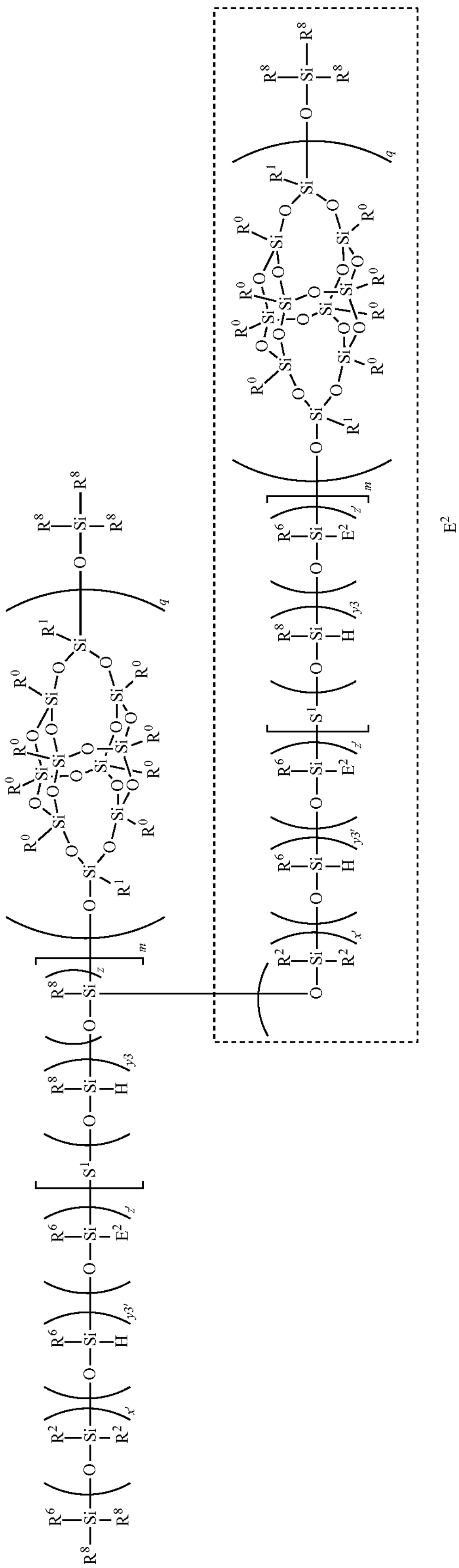

Next, when the silicon compound obtained in the above Process (V-2) and the compound represented by Formula (g) are subjected to a hydrosilylation reaction, a siloxane polymer represented by Formula (J-14) can be produced (Process (V-3)). In Process (V-3), it is preferable to perform the hydrosilylation reaction in the presence of a transition metal catalyst such as a Karstedt's catalyst.

(J-14)
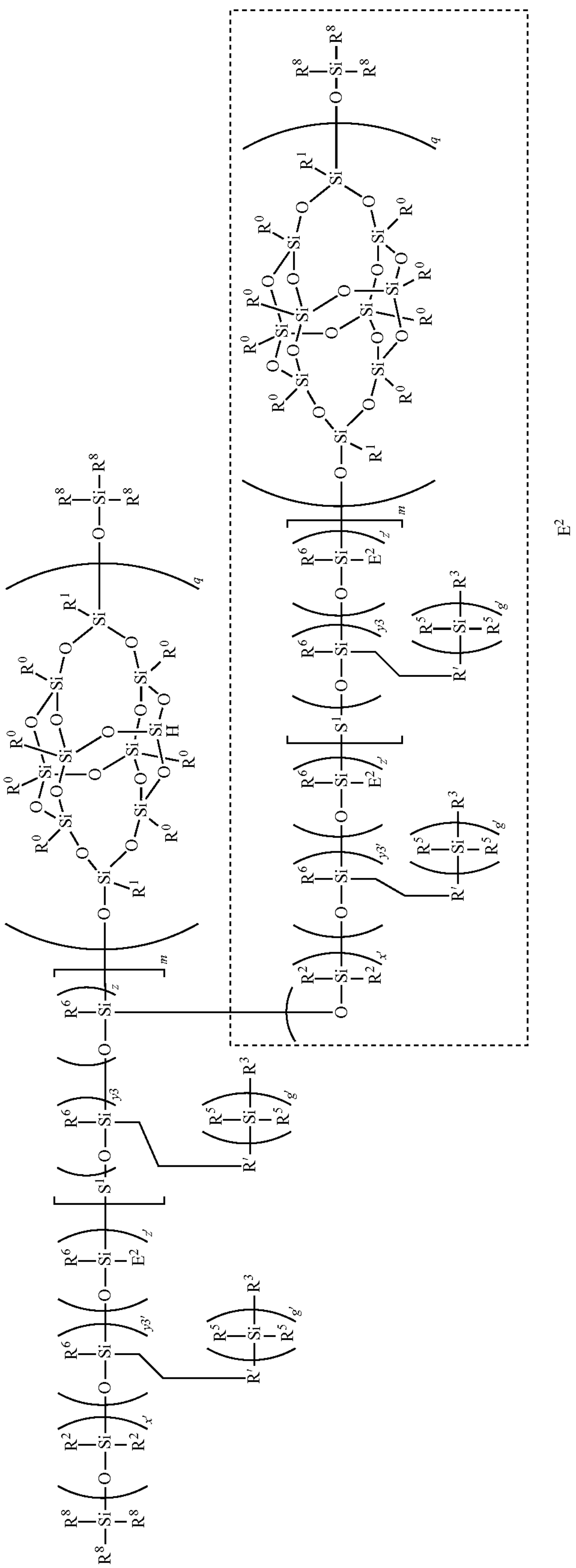

In processes (V-1) to (V-3), a solvent such as tetrahydrofuran, toluene, or ethyl acetate may be used. The reaction is preferably performed under an inert atmosphere such as nitrogen ($N_2$). In addition, it is preferable to perform the reaction while stirring.

<Method of Producing Siloxane Polymer Represented by Formula (J-15)>

A siloxane polymer represented by Formula (J-15) can be suitably produced by the method of producing a siloxane polymer (VI).

First, according to a process of reacting a silicon compound represented by Formula (a) and a silicon compound represented by Formula (b) with a compound represented by Formula (m), a silicon compound represented by Formula (J-0) is generated (Process (VI-1)). In Process (VI-1), it is preferable to perform the reaction in the presence of an acid such as sulfuric acid.

Next, the silicon compound represented by Formula (J-0) obtained in the process (VI-1) is reacted with the compound represented by Formula (p) to generate a silicon compound represented by the following Formula (J-03) (Process (VI-2)).

(J-03)
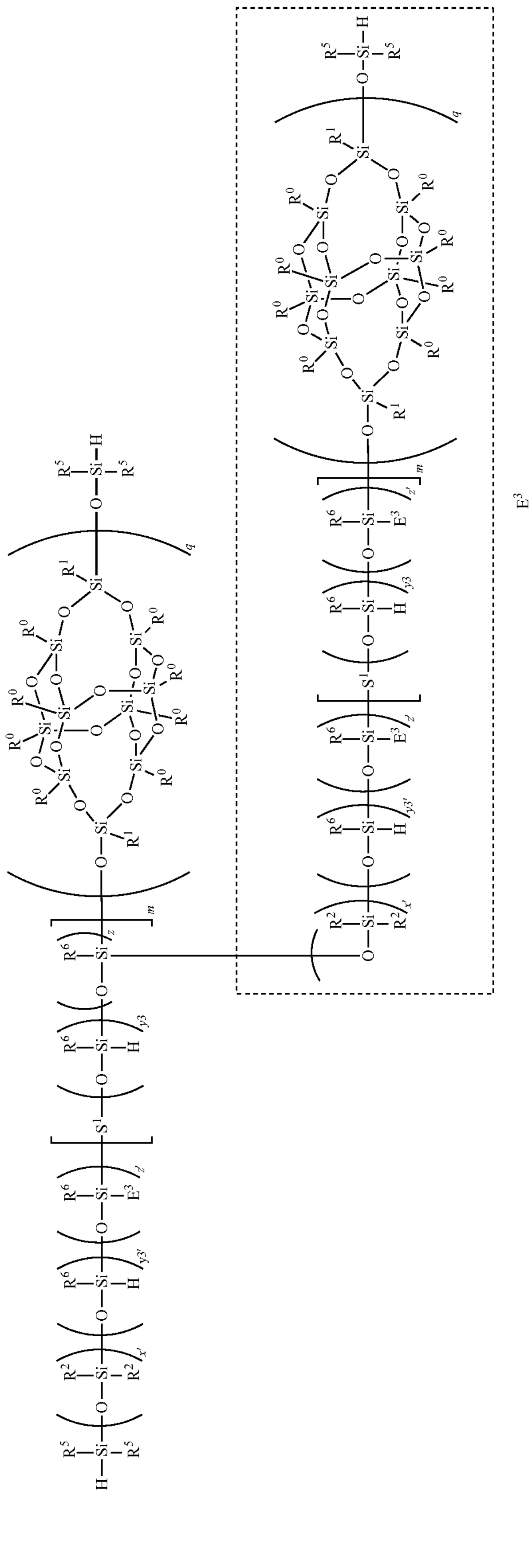

Next, when the silicon compound obtained in the above Process (VI-2) and the compound represented by Formula (g) are subjected to a hydrosilylation reaction, a siloxane polymer represented by Formula (J-15) can be produced (Process (VI-3)). In Process (VI-3), it is preferable to perform the hydrosilylation reaction in the presence of a transition metal catalyst such as a Karstedt's catalyst.

(J-15)
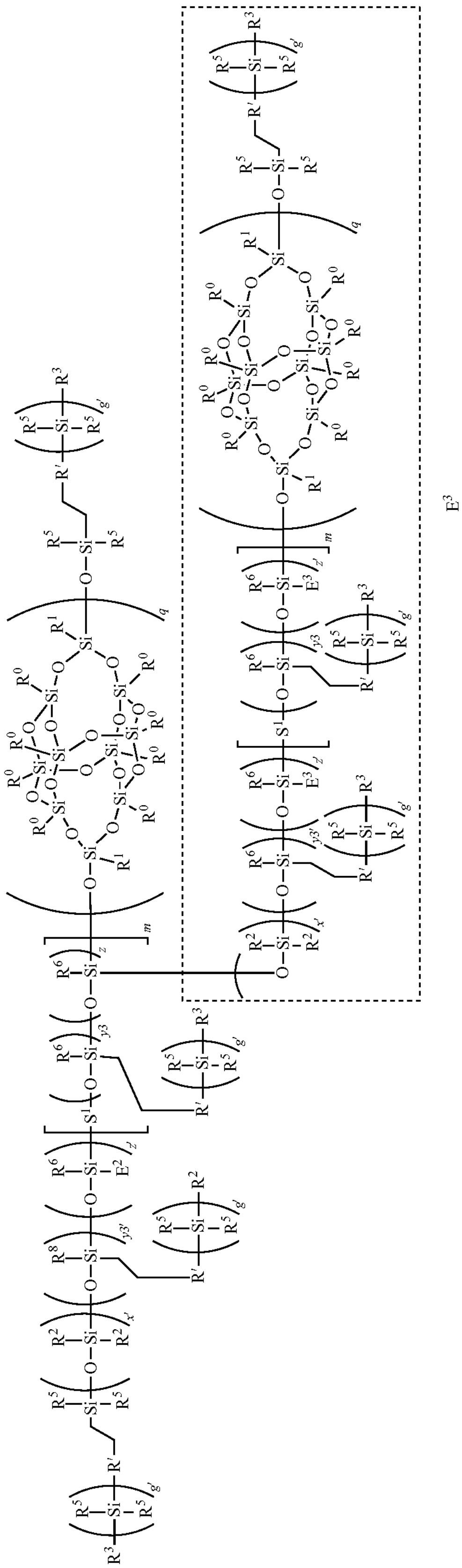

In Processes (VI-1) to (VI-3), a solvent such as tetrahydrofuran, toluene, or ethyl acetate may be used. The reaction is preferably performed under an inert atmosphere such as nitrogen ($N_2$). In addition, it is preferable to perform the reaction while stirring.

EXAMPLES

While the disclosure will be described below in more detail with reference to examples, but these descriptions do not limit the scope of the disclosure.

Reagents used in examples are shown below.

Toluene (special grade): commercially available from FUJIFILM Wako Pure Chemical Corporation D4 (octamethylcyclotetrasiloxane): commercially available from Tokyo Chemical Industry Co., Ltd.

M'M'(1,1,3,3-tetramethyldisiloxane): commercially available from Tokyo Chemical Industry Co., Ltd.

Kyowaad (registered trademark) 500 SN (Synthetic hydrotalcite): commercially available from Kyowa Chemical Industry Co., Ltd.

Heptane (first grade): commercially available from FUJIFILM Wako Pure Chemical Corporation Celloxide 2000 (1,2-epoxy-4-vinylcyclohexane): commercially available from Daicel Corporation Ethyl acetate (ultra-dehydration): commercially available from FUJIFILM Wako Pure Chemical Corporation Karstedt's catalyst (Pt-VTS-3.0): commercially available from Umicore Japan Allyl glycidyl ether: commercially available from Tokyo Chemical Industry Co., Ltd.

Sulfuric acid (special grade): commercially available from Kanto Chemical Co., Inc.

MM (hexamethyldisiloxane): commercially available from Tokyo Chemical Industry Co., Ltd.

$D'_4$(2,4,6,8-tetramethylcyclotetrasiloxane): commercially available from Tokyo Chemical Industry Co., Ltd.

Compound (α)

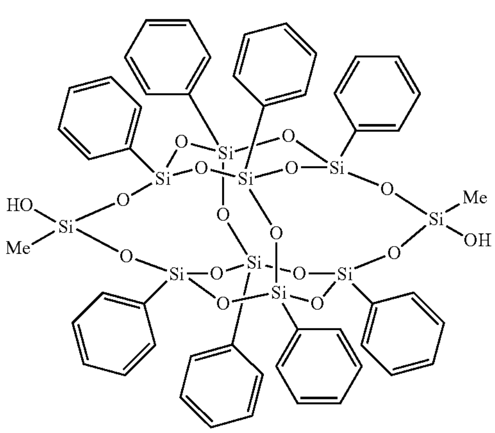

A compound (a) was synthesized by reacting the following compound (4) and compound (5) and additionally performing hydrolysis (for example, refer to the paragraph 0032 in Japanese Patent Laid-Open No. 2006-022207).

(4)

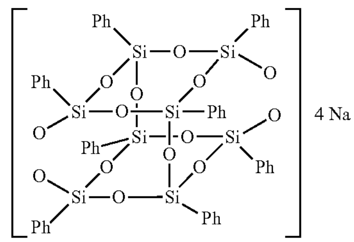

(5)

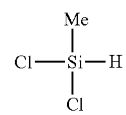

Measurement conditions for GPC measurement are shown below.

<Measurement Conditions>

Column: Shodex KF-804L 300×8.0 mm

Shodex KF-805L 300×8.0 mm 2 columns in series

Mobile phase: THF (tetrahydrofuran)

Flow rate: 1.0 ml/min

Temperature: 40° C.

Detector: RI

Molecular weight standard sample: PMMA (polymethylmethacrylate) with a known molecular weight Synthesis Example 1

(Synthesis of Siloxane Polymer (A))

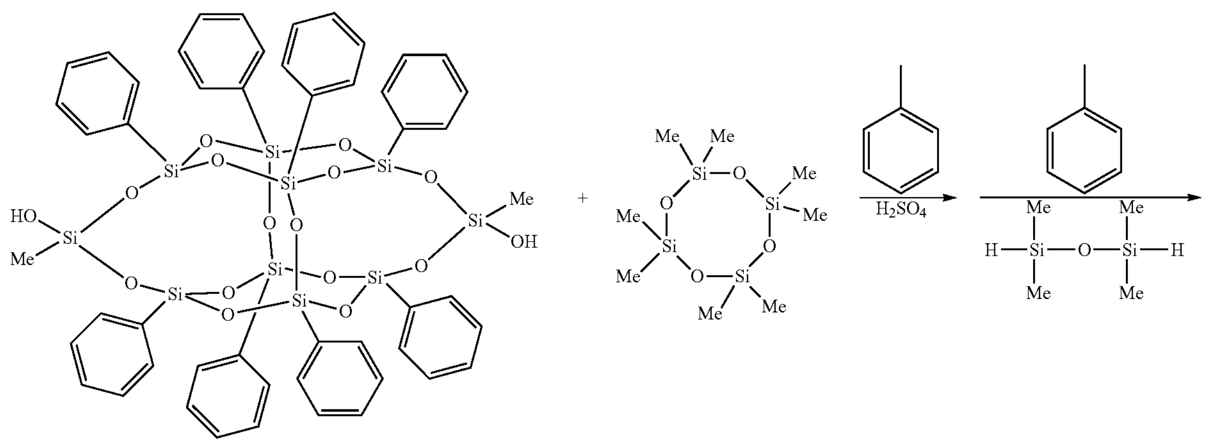

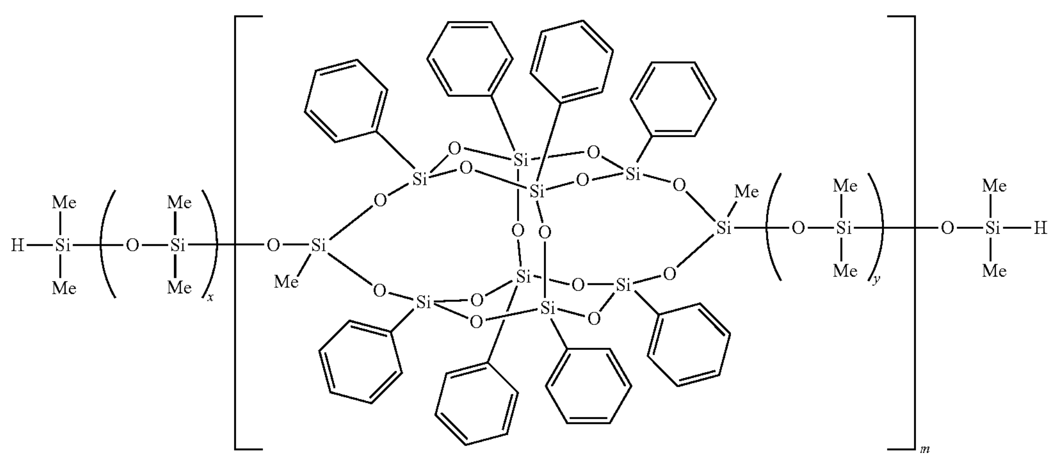

(A)

100 g of the compound (a), 37.5 g of D4, and 234.6 g of toluene were put into a 1 L 4-neck round bottom flask, and a thermometer, a reflux tube, a mechanical stirrer, and an oil bath were set, and nitrogen was caused to flow. 1.9 g of sulfuric acid was added with stirring. After stirring at a reflux temperature (112) for about 1 hour, the mixture was cooled to 80° C., aged at 80° C. for 2 hours, and then 17.0 g of M'M' was added, and the mixture was stirred for 1 hour. Heating and stirring were stopped, water was added, the reaction solution was washed with water, an acid was then removed by treating with Kyowaad 500, Kyowaad 500 was filtered, and then concentrated at about 40° C. After reprecipitation with heptane, the precipitate was vacuum-dried to obtain 87.0 g of a white solid (siloxane polymer (A)). The molecular weight of the siloxane polymer (A) was measured by GPC. The weight average molecular weight Mw was 44,000, and the polydispersity Mw/Mn was 1.8. The average value of (x, y) was calculated from $^{1}$H-NMR measurement, and the average was 4.0. The signal of the terminal SiH group was confirmed by $^{1}$H-NMR.

($^{1}$H-NMR Measurement Results)

$^{1}$H-NMR (400 MHz, $CO(CD_3)_2$) δ: 7.08 to 7.64 (Ph), 4.67 to 4.75 (Si—H), 0.25 to 0.39 ($O_3SiMe$), −0.06 to 0.15 ($O_2SiMe_2$).

($^{29}$Si-NMR Measurement Results)

$^{29}$Si-NMR (99 MHz, $CO(CD_3)_2$) δ: −3.9 to −6.6 ($^{HMe2}M^1$), −18.2 to −21.7 ($^{Me2}D^2$), −63.0 to −64.8 ($^{Me}T^3$), −78.6 to −79.3 ($^{Ph}T^3$).

Example 1

(Synthesis of Siloxane Polymer (B))

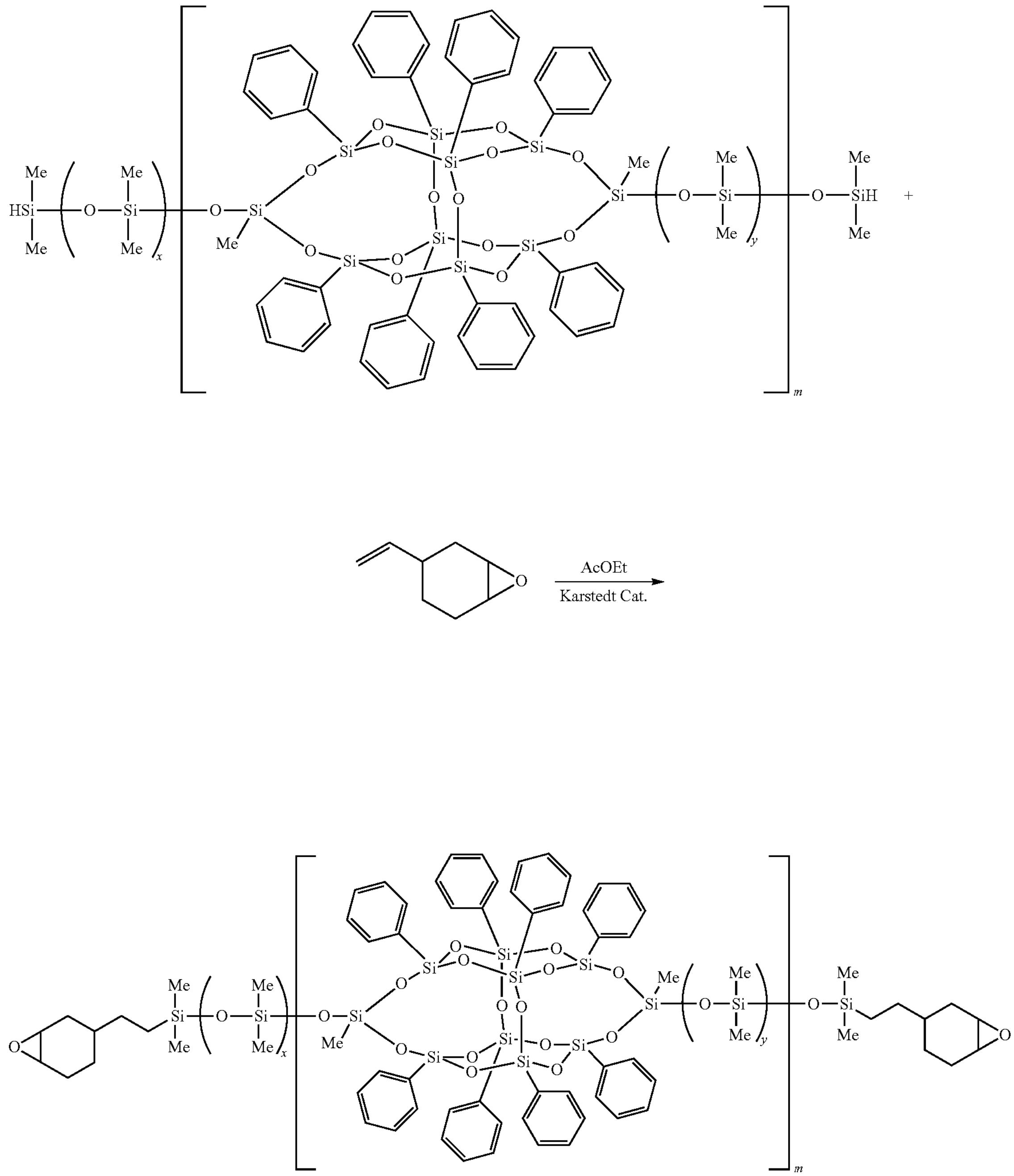

(B)

20 g of the siloxane polymer (A), 0.31 g of Celloxide 2000 and 28 g of ethyl acetate were put into a 100 mL 4-neck round bottom flask, a thermometer, a reflux tube, a magnetic stirrer, and an oil bath were set, and nitrogen was caused to flow. The mixture was stirred at 70° C., and 0.33 μL of a Karstedt's catalyst (Pt-VTS-3.0) was added. After heat generation was confirmed, the mixture was additionally stirred at a reflux temperature (79° C.) for 6 hours. Then, the mixture was cooled, ethyl acetate and activated carbon were added, and the mixture was stirred overnight. The mixture was suction-filtered using celite and concentrated under a reduced pressure. After reprecipitation with heptane, vacuum-drying was performed to obtain 13.8 g of a white solid (siloxane polymer (B)). According to $^1$H-NMR, the disappearance of the terminal SiH group and the appearance of the alicyclic epoxy signal were confirmed.

($^1$H-NMR measurement result)$^1$H-NMR (400 MHz, $CO(CD_3)_2$) δ: 7.09 to 7.64 (Ph), 2.89 to 3.05 (alicyclic epoxy), 0.45-1.90 (alicyclic epoxy, $CH_2CH_2$), 0.25 to 0.39 ($O_3SiMe$), −0.07 to 0.12 ($O_2SiMe_2$).

Example 2

(Synthesis of Siloxane Polymer (C))

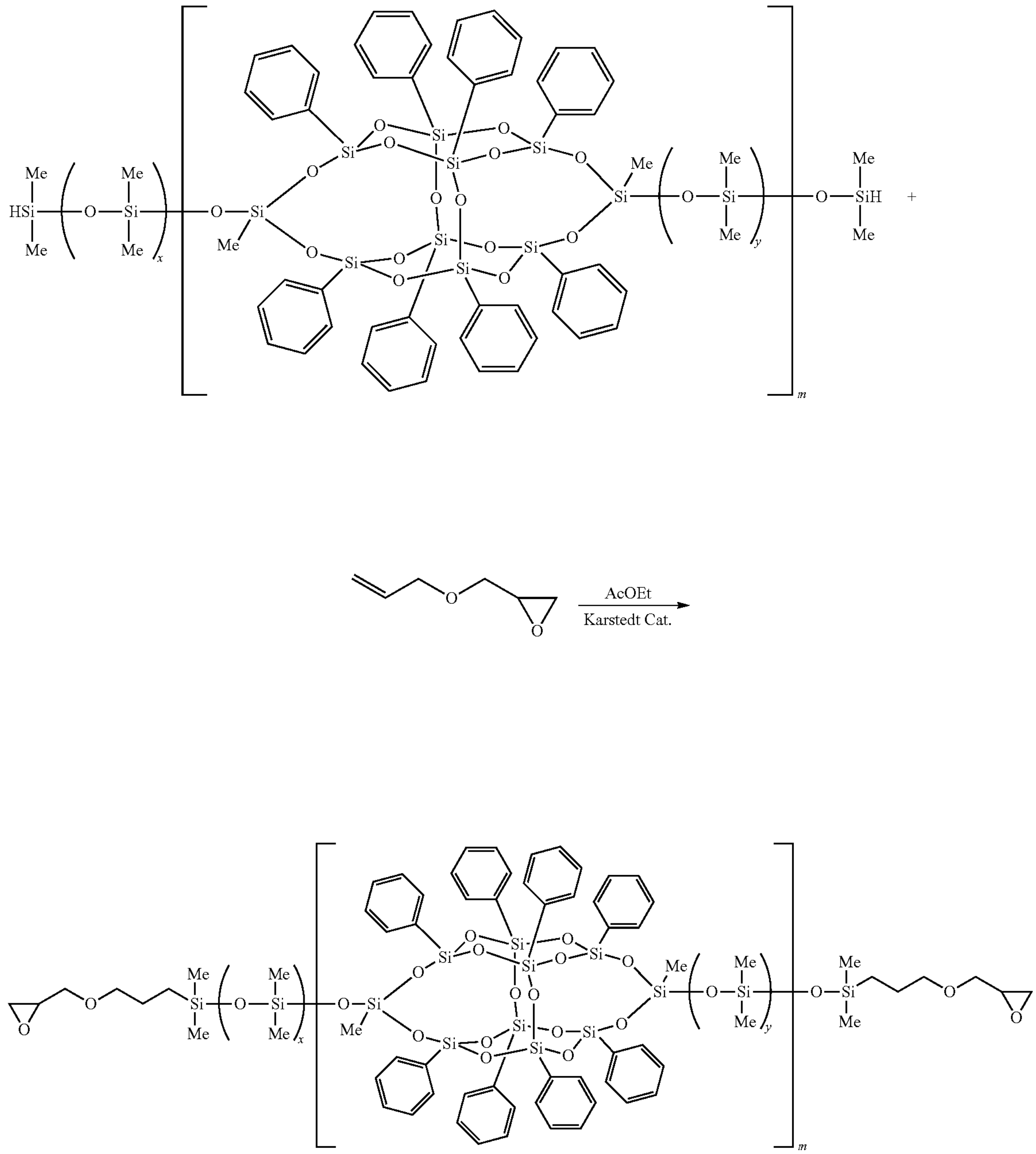

(C)

20 g of the siloxane polymer (A), 0.29 g of allyl glycidyl ether and 28 g of ethyl acetate were put into a 100 mL 4-neck round bottom flask, a thermometer, a reflux tube, a magnetic stirrer, and an oil bath were set, and nitrogen was caused to flow. The mixture was stirred at 70° C., and 0.33 μL of a Karstedt's catalyst (Pt-VTS-3.0) was added. After heat generation was confirmed, the mixture was additionally stirred at a reflux temperature (79° C.) for 6 hours. Then, the mixture was cooled, ethyl acetate and activated carbon were added, and the mixture was stirred overnight. The mixture was suction-filtered using celite and concentrated under a reduced pressure. After reprecipitation with heptane, vacuum-drying was performed to obtain 16.0 g of a white solid (siloxane polymer (C)). According to $^1$H-NMR, the disappearance of the terminal SiH group and the appearance of the glycidyl ether signal were confirmed.

($^1$H-NMR measurement result)$^1$H-NMR (400 MHz, $CO(CD_3)_2$) δ: 7.09 to 7.63 (Ph), 2.93 to 3.68 (C$\underline{H}_2$OC$\underline{H}_2$), 2.41 to 2.69 (epoxide C$\underline{H}_2$C$\underline{H}$), 1.47 to 1.63 ($OCH_2C\underline{H}_2$), 0.48 to 0.63 ($OCH_2CH_2C\underline{H}_2$), 0.24 to 0.38 ($O_3SiMe$), −0.07 to 0.12 ($O_2SiMe_2$).

Synthesis Example 2

(Synthesis of Siloxane Polymer (D))

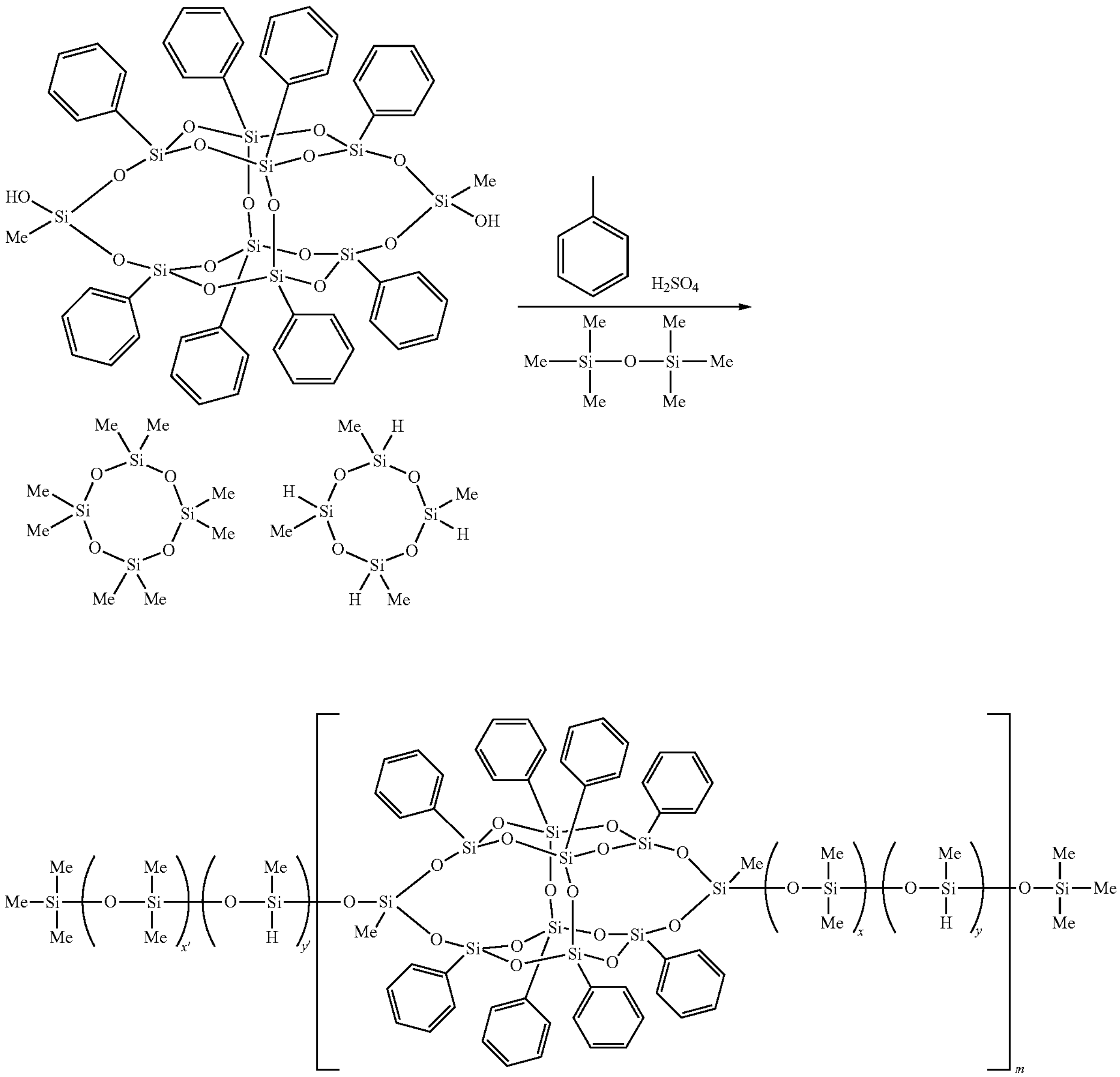

(D)

30 g of the compound (α), 6.0 g of $D_4$, 1.0 g of D'4, and 56.5 g of toluene was put into a 200 mL 4-neck round bottom flask, a thermometer, a reflux tube, a mechanical stirrer, and an oil bath were set, and nitrogen was caused to flow. 0.7 g of sulfuric acid was added with stirring, the mixture was stirred at a reflux temperature (109° C.) for about 20 minutes and cooled to 100° C. or lower, 3.9 g of MM was added, and the mixture was stirred for about 10 minutes. Heating and stirring were stopped, water was added, the reaction solution was washed with water several times, an acid was then removed by treating with Kyowaad 500, and after filtration, the filtrate was concentrated at about 50° C. The filtrate was reprecipitated with heptane and then vacuum-dried to obtain 19.3 g of a white solid (siloxane polymer (D)). The molecular weight of the siloxane polymer (D) was measured by GPC. The weight average molecular weight Mw was 17,000, and the polydispersity Mw/Mn was 1.5. According to $^1$H-NMR, the presence of SiH groups was confirmed.

According to $^{29}$Si-NMR measurement, and the average of (x, y) was 2.4, and the average of (x', y') was 1.0.

In addition, it was found that, since the presence of the M structure was confirmed by $^{29}$Si-NMR measurement, the terminal of the polymer was trimethylsilane.

($^1$H-NMR Measurement Result)

$^1$H-NMR (400 MHz, $CO(CD_3)_2$) δ: 7.18 to 7.66 (Ph), 4.77 to 4.86 (Si—H), 0.28 to 0.43 ($O_3SiMe$), −0.02 to 0.13 ($O_2SiMe_2$).

($^{29}$Si-NMR Measurement Result)

$^{29}$Si-NMR (99 MHz, THF-d8) δ: 7.35 to 10.1 ($^{Me3}M^1$), −18.3 to −21.9 ($^{Me2}D^2$), −34.8 to −36.2 ($^{H,Me}D^2$), −64.0 to −65.2 ($^{Me}T^3$), −78.7 to −79.9 ($^{Ph}T^3$).

Example 3

(Synthesis of Siloxane Polymer (E))

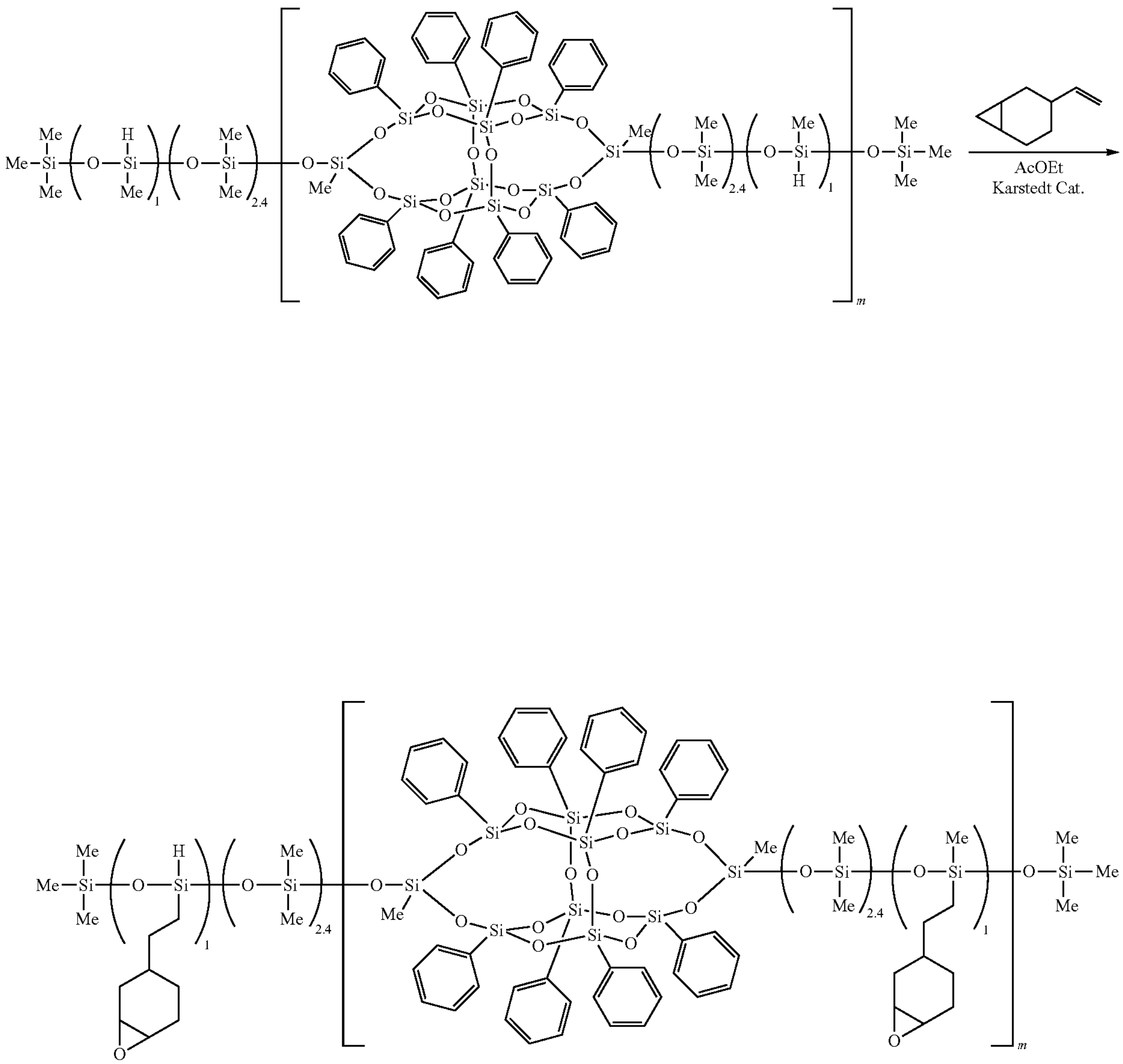

(E)

10 g of the siloxane polymer (D), 1.93 g of Celloxide 2000 and 18 g of ethyl acetate were put into a 50 mL 4-neck round bottom flask, a thermometer, a reflux tube, a magnetic stirrer, and an oil bath were set, and nitrogen was caused to flow. The mixture was stirred at 70° C. and 1.0 μL of a Karstedt's catalyst (Pt-VTS-3.0) was added. After heat generation was confirmed, the mixture was additionally stirred at a reflux temperature (79° C.) for 4 hours, and according to FT-IR, the disappearance of the Si—H signal (around 2,160 $cm^{-1}$) was confirmed. Then, the mixture was cooled, ethyl acetate and activated carbon was added, and the mixture was stirred overnight. The mixture was suction-filtered using celite and concentrated under a reduced pressure. After reprecipitation with heptane, vacuum-drying was performed to obtain 9.2 g of a white solid (siloxane polymer (E)). The molecular weight of the siloxane polymer (E) was measured by GPC. The weight average molecular weight Mw was 23,000, and the polydispersity Mw/Mn was 1.7.

According to $^{1}$H-NMR, the disappearance of the terminal SiH group and the appearance of the alicyclic epoxy signal were confirmed. According to $^{29}$Si-NMR measurement, the disappearance of the $^{H,Me}D^{2}$ signal (around −35 ppm) was confirmed.

($^{1}$H-NMR Measurement Result)

$^{1}$H-NMR (400 MHz, $CO(CD_3)_2$) δ: 7.13 to 7.65 (Ph), 2.61 to 2.92 (alicyclic epoxy), 0.46 to 1.90 (alicyclic epoxy, $CH_2CH_2$), 0.30 to 0.42 ($O_3SiMe$), −0.03 to 0.13 ($O_2SiMe_2$).

($^{29}$Si-NMR Measurement Result)

$^{29}$Si-NMR (99 MHz, THF-d8) δ: 7.35 to 9.95 ($^{Me3}M^{1}$), −18.5 to −21.9 ($^{Me2}D^{2}$), −64.0 to −65.2 ($^{Me}T^{3}$), −78.8 to −79.4 ($^{Ph}T^{3}$).

Synthesis Example 3

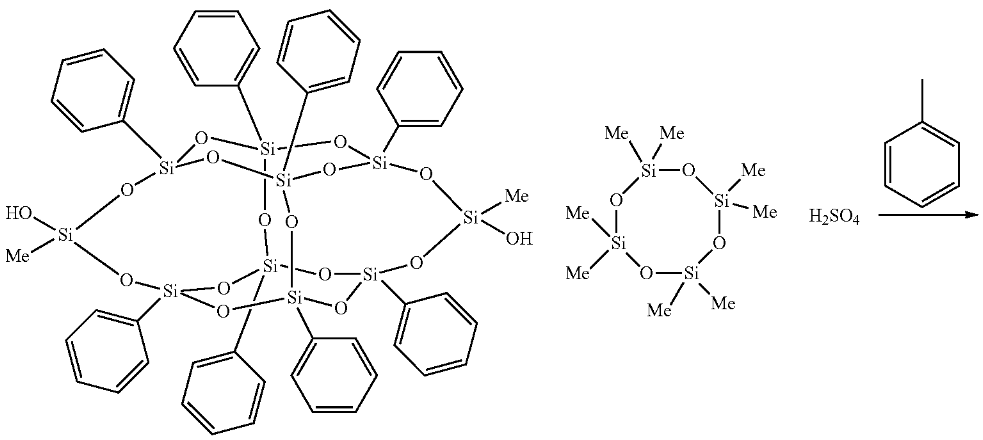

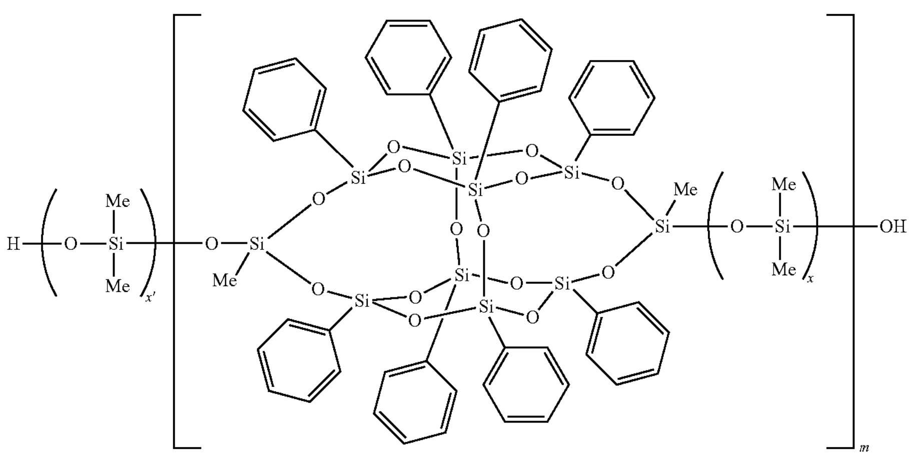

(F)

30 g of the compound (α), 6.8 g of D4, and 54 g of toluene were put into a 200 mL 4-neck round bottom flask, a thermometer, a reflux tube, a magnetic stirrer, and an oil bath were set, and nitrogen was caused to flow. 2.4 g of sulfuric acid was added with stirring. After the mixture was stirred at a reflux temperature (109° C.) for about 5 minutes, heating and stirring were stopped, and water was added. The reaction solution was washed with water and then treated with Kyowaad 500 to remove an acid, and Kyowaad 500 was filtered and then concentrated at about 40° C. After reprecipitation with heptane, the precipitate was vacuum-dried to obtain 33 g of a white solid (siloxane polymer (F)). The molecular weight of the siloxane polymer (F) was measured by GPC. The weight average molecular weight Mw was 16,800, and the polydispersity Mw/Mn was 2.1. The average value of (x, x') was calculated from $^{1}$H-NMR measurement, and the average was 3.2.

Example 4

(Synthesis of Siloxane Polymer (G))

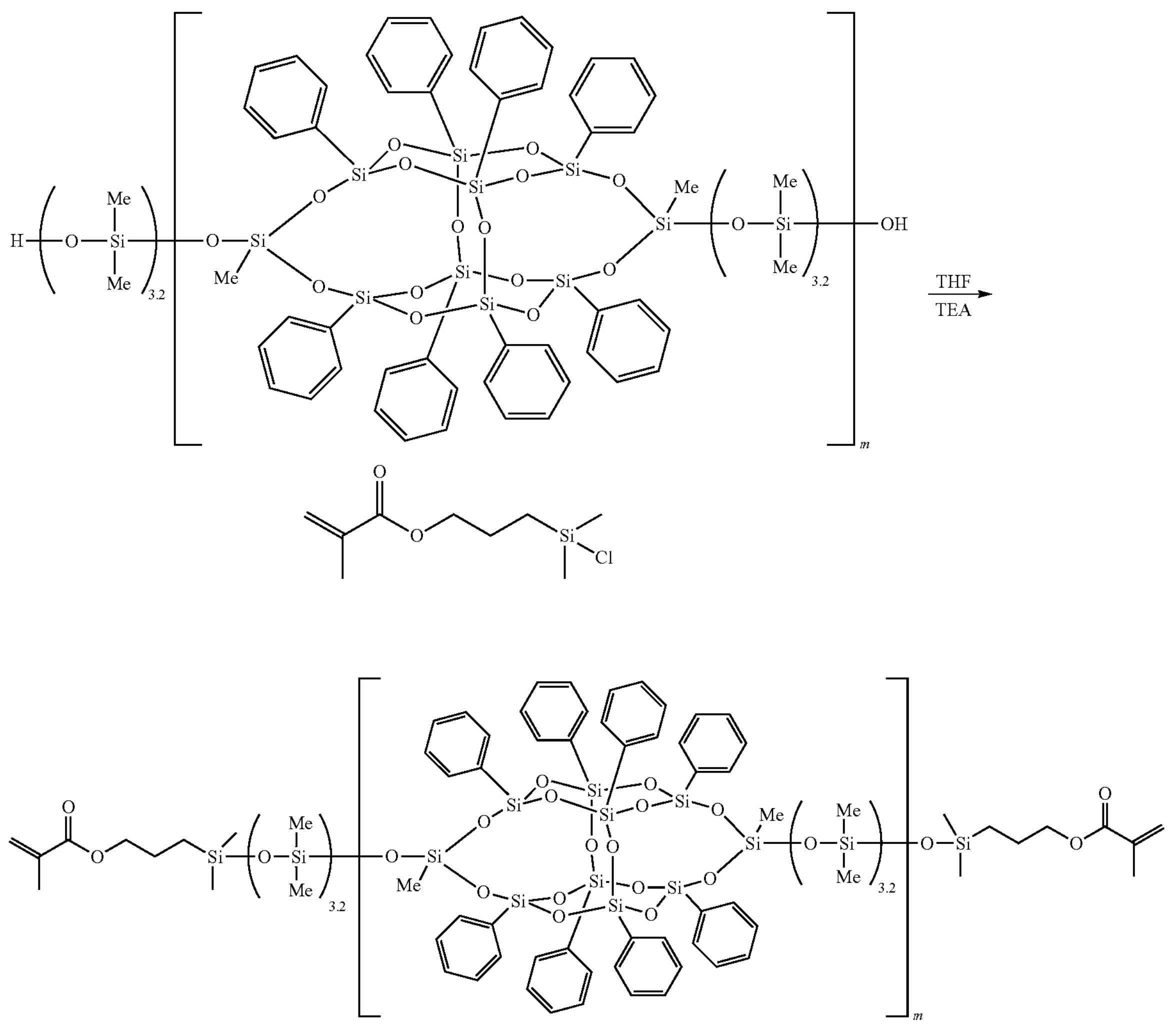

(G)

20 g of the siloxane polymer (F) and 86.7 g of ethyl acetate were put into a 4-neck round bottom flask (200 mL) filled with nitrogen, a thermometer and a stirrer were set and stirring was performed. The solution was cooled with ice, and 1.7 g of 3-(chlorodimethylsilyl)propylmethacrylate was added at 0° C. or lower. 2.6 g of triethylamine was added dropwise, and after the reaction was completed, the mixture was stirred at room temperature for 14 hours. Water was added, an organic layer was washed with water, and then dried with sodium sulfate and concentrated. After reprecipitation with heptane, the precipitate was vacuum-dried to obtain 10.2 g of a white solid (siloxane polymer (G)). The molecular weight of the (siloxane polymer (G)) was measured by GPC. The weight average molecular weight Mw was 22,800, and the polydispersity Mw/Mn was 1.4.

According to $^{1}$H-NMR, the SiOH signal disappeared and the methacrylic group signal was confirmed. According to $^{29}$Si-NMR, the $^{Me2}D^{1}$ signal disappeared and the M structure signal was confirmed.

According to FI-IR, the disappearance of the peak of SiOH (3,433, 3,639 cm$^{-1}$) and the peaks of C═C expansion and contraction vibration (1,638 cm$^{-1}$), and C═O expansion and contraction vibration (1,719 cm$^{-1}$) of the methacrylic group were confirmed.

According to the disclosure, there are provided various novel siloxane polymers containing a silsesquioxane unit and a chain siloxane unit in the main chain and having a reactive group, which can be used as polymer raw materials. In addition, according to the disclosure, it is possible to efficiently produce various novel siloxane polymers containing a silsesquioxane unit and a chain siloxane unit in the main chain and having a reactive group, which can be used as polymer raw materials.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A siloxane polymer comprising a repeating unit represented by Formula (1):

(1)

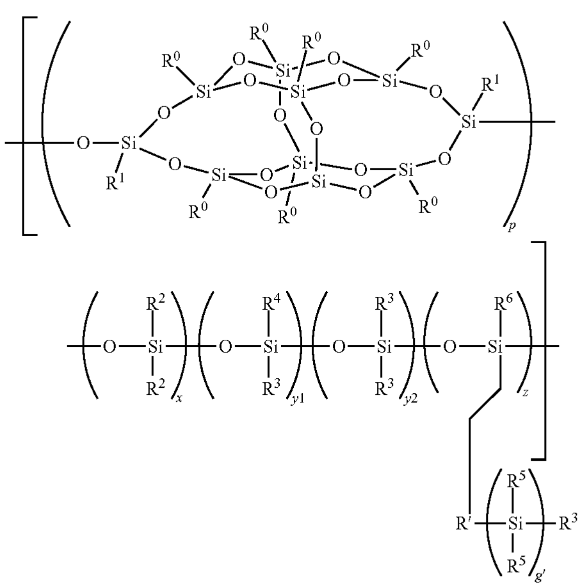

(2)

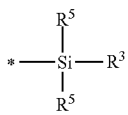

in the above formula, $R^0$'s independently represent an aryl group having 6 to 20 carbon atoms or a cycloalkyl group having 5 to 6 carbon atoms, and in the aryl group having 6 to 20 carbon atoms and the cycloalkyl group having 5 to 6 carbon atoms, any hydrogen atom may be independently substituted with a fluorine atom or an alkyl group having 1 to 20 carbon atoms;

$R^1$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^2$, $R^4$, $R^5$ and $R^6$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^3$ represents a monovalent group having a reactive group, and when there are a plurality of $R^3$'s, they may be the same as or may be different from each other;

p represents an integer of 1 or more;

x represents an integer of 1 to 30;

y1, y2 and z represent an integer of 0 to 30;

g' represents 0 or 1;

* represents a bonding position; and y1, y2 or z is 1 or more and the group represented by Formula (2) is comprised as a terminal.

2. The siloxane polymer according to claim 1, wherein the reactive group is a cationic polymerizable group.

3. The siloxane polymer according to claim 1, wherein the reactive group is at least one selected from a group consisting of —F, —Cl, —Br, —$CF_3$, perfluoroalkyl, alkoxy, (meth)acryloyl, (meth)acryloyloxy, —COOH, an acid anhydride, polyalkyleneoxy, an ester, epoxy, an oxetane ring, phenoxy, —$NH_2$, —CN, —NCO, an alkenyl group having 3 or more carbon atoms, cycloalkenyl, —SH, and —$PH_2$.

4. The siloxane polymer according to claim 3, wherein the reactive group is epoxy, an oxetane ring, (meth)acryloyl, (meth)acryloyloxy, —NCO, —CN, or an acid anhydride.

5. The siloxane polymer according to claim 3, wherein $R^3$ comprises a group selected from the following group:

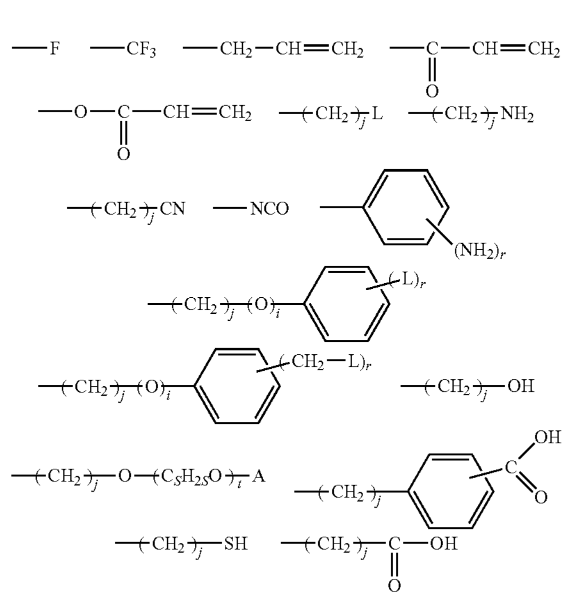

-continued

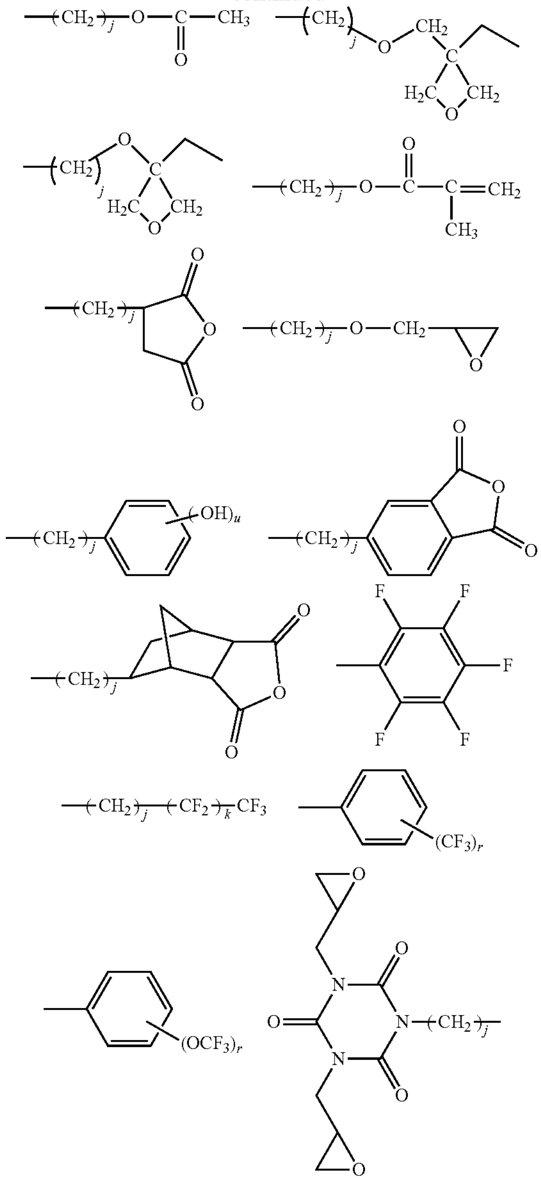

-continued

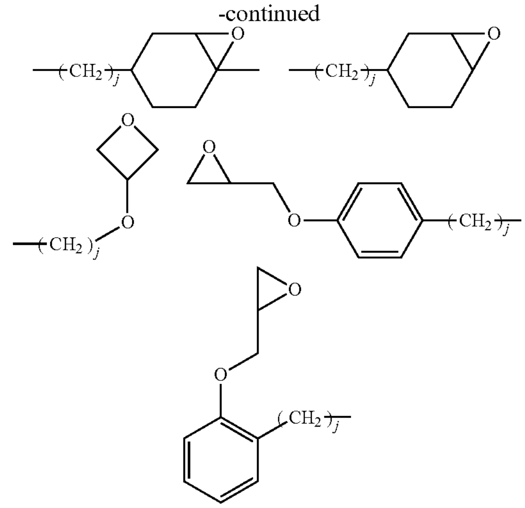

in the above formula, i is 0 or 1; j is an integer of 2 to 4; k is an integer of 0 to 15; L is a halogen atom, r is an integer of 1 to 5; s is an integer of 2 or 3, and t is an integer of 2 to 200; u is an integer of 1 to 3; A is a hydrogen atom or an alkyl group having 1 to 4 carbon atoms; here, bonding positions of -L, —OH, —COOH, —$CF_3$ and —$OCF_3$ on the benzene ring are arbitrary.

6. The siloxane polymer according to claim 1, wherein a weight average molecular weight is 2,000 to 10,000,000.

7. A method of producing the siloxane polymer according to claim 1, wherein the siloxane polymer contains a repeating unit represented by Formula (1-1) and a group represented by Formula (2) as terminals and comprises:

(i) a process of reacting a silicon compound represented by Formula (a) with a silicon compound represented by Formula (b) and additionally reacting with a silicon compound represented by Formula (c);

(ii) a process of reacting a silicon compound represented by Formula (d) with a compound represented by Formula (e);

(iii) a process of reacting a silicon compound represented by Formula (f) with a silicon compound represented by Formula (g); or (iv) a process of reacting a silicon compound represented by Formula (h) with a silicon compound represented by Formula (i):

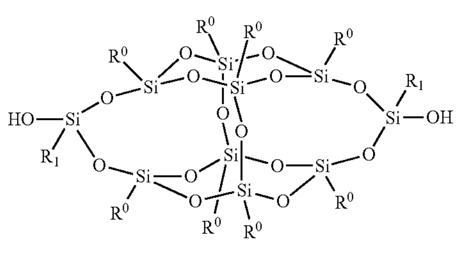

(a)

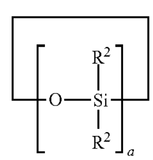

(b)

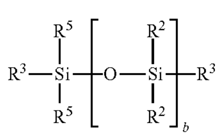

(c)

-continued (d)

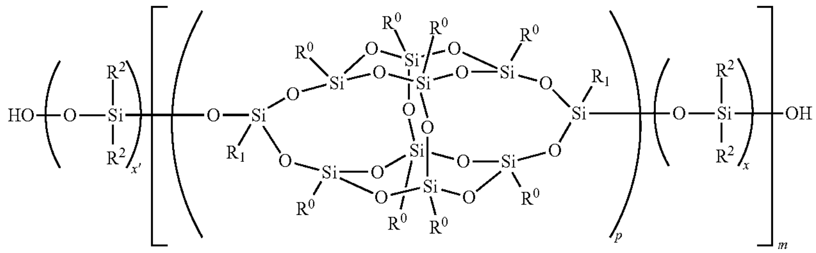

(e)

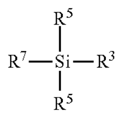

(f)

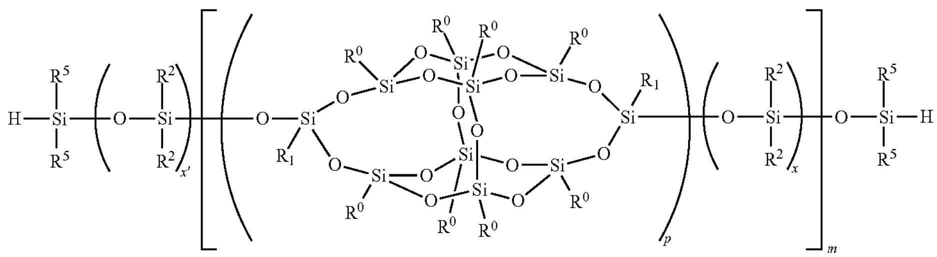

(g)

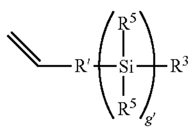

(h)

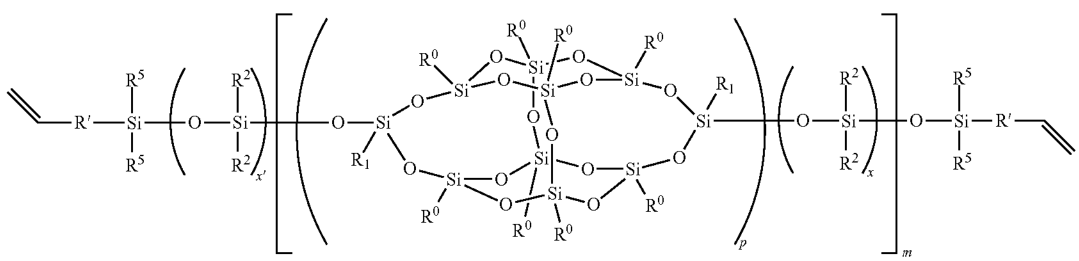

(i)

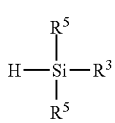

(1-1)

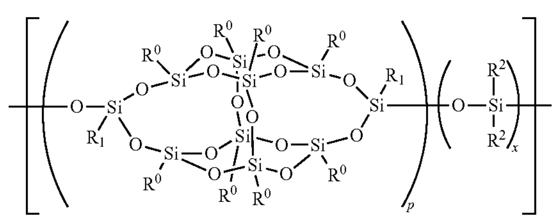

(2)

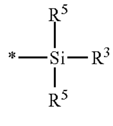

in the above formula, $R^0$'s independently represent an aryl group having 6 to 20 carbon atoms or a cycloalkyl group having 5 to 6 carbon atoms, and in the aryl group having 6 to 20 carbon atoms and the cycloalkyl group having 5 to 6 carbon atoms, any hydrogen atom may be independently substituted with a fluorine atom or an alkyl group having 1 to 20 carbon atoms;

$R^1$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^2$ and $R^5$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^3$ represents a monovalent group having a reactive group;

$R^7$ represents a hydrogen atom, a halogen atom, or an alkoxy group having 1 to 20 carbon atoms;

R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms;

a represents an integer of 3 to 30;

b represents an integer of 1 to 1,000;

p represents an integer of 1 or more;

x represents an integer of 1 to 30;

x' represents an integer of 1 to 30;

g' 0 or 1;

m represents a number satisfying a weight average molecular weight of 2,000 to 10,000,000; and

* represents a bonding position.

8. The method of producing a siloxane polymer according to claim 7, wherein the siloxane polymer is a siloxane polymer represented by Formula (J-1), (J-2) or (J-3):

(J-1)

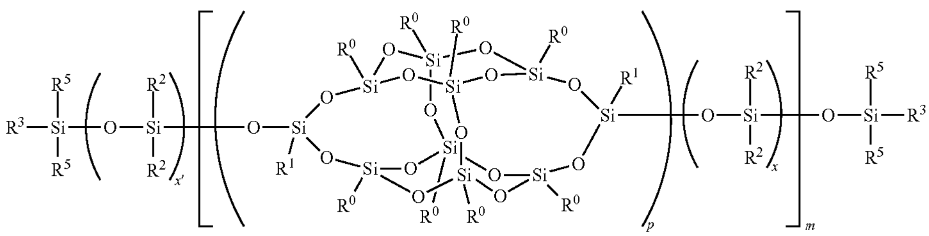

(J-2)

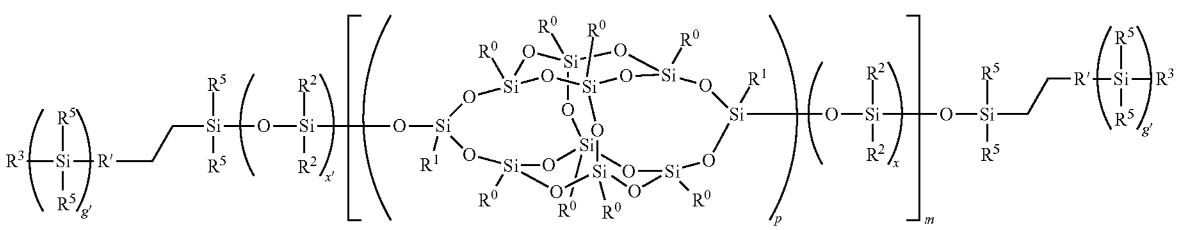

(J-3)

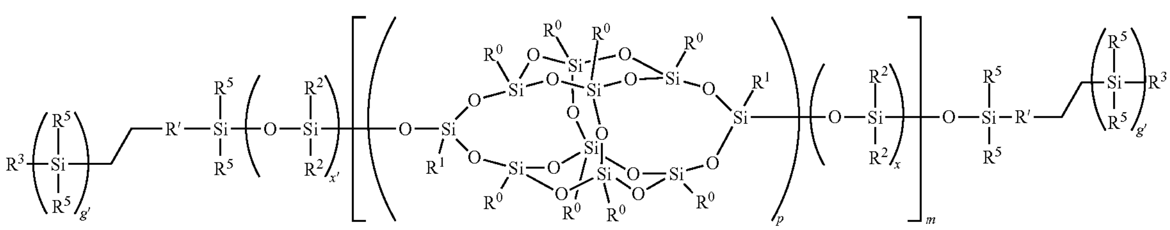

in the above formula, $R^0$ to $R^3$, $R^5$, R', p, x, x', g' and m are each independently defined the same as $R^0$ to $R^3$, $R^5$, R', p, x, x', g' and m in Formulae (a) to (i), (1) and (2).

9. A method of producing a siloxane polymer containing a repeating unit represented by Formula (1-2), comprising:

(I): a process of reacting a silicon compound represented by Formula (a) and a silicon compound represented by Formula (b) with a compound having a reactive group and represented by Formula (k);

(II): a process of reacting a silicon compound represented by Formula (a) and a silicon compound represented by Formula (b) with a compound having a reactive group and represented by Formula (l);

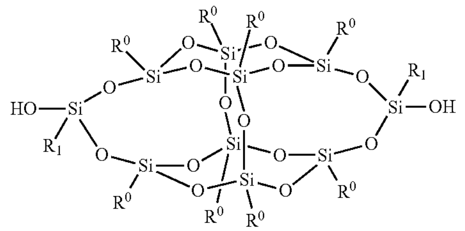
(a)

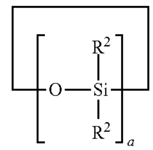
(b)

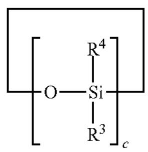
(k)

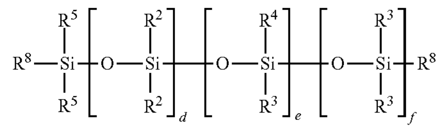
(l)

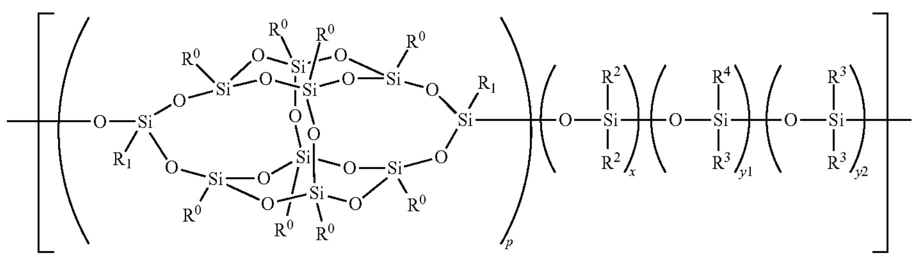
(1-2)

in the above formula, $R^0$'s independently represent an aryl group having 6 to 20 carbon atoms or a cycloalkyl group having 5 to 6 carbon atoms, and in the aryl group having 6 to 20 carbon atoms and the cycloalkyl group having 5 to 6 carbon atoms, any hydrogen atom may be independently substituted with a fluorine atom or an alkyl group having 1 to 20 carbon atoms;

$R^1$ and $R^8$ independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^2$, $R^4$, $R^5$ and $R^6$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^3$ represents a monovalent group having a reactive group;

p represents an integer of 1 or more;

x represents an integer of 1 to 30;

y1 and y2 represent an integer of 0 to 30, here, $y1+y2\geq 1$;

a and c represent an integer of 3 to 30; and d, e and f represent an integer of 0 to 1,000, here, $e+f\geq 1$.

10. The method of producing a siloxane polymer according to claim 9, wherein the siloxane polymer is represented by any of the following Formulae (J-4) to (J-6):

(J-4)

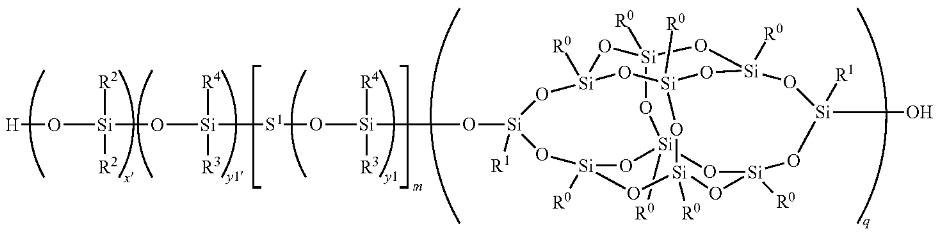

(J-5)

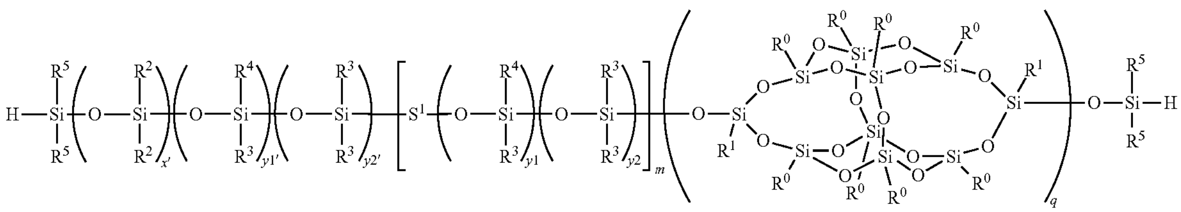

(J-6)

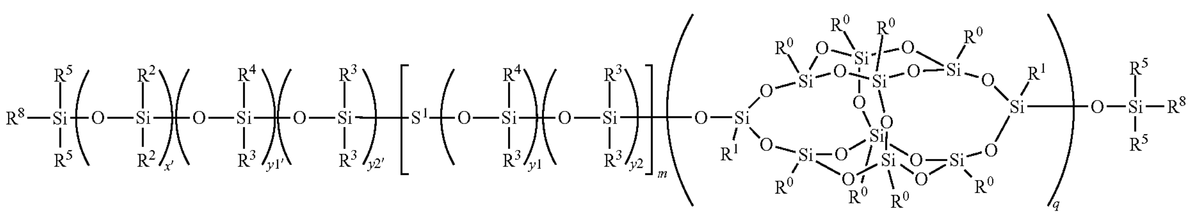

in the above formula, $R^0$ to $R^5$, $R^8$, x, y1 and y2 are each independently defined the same as $R^0$ to $R^5$, $R^8$, x, y1 and y2 in Formulae (a), (b), (k), (1), and (1-2);

$S^1$ is shown below, and in $S^1$, $R^0$ to $R^2$, p, and x are defined the same as $R^0$ to $R^2$, p, and x in Formula (1-2);

q, x', y1' and y2' represent an integer of 0 to 30; and m represents a number satisfying a weight average molecular weight of 2,000 to 10,000,000, ($S^1$)

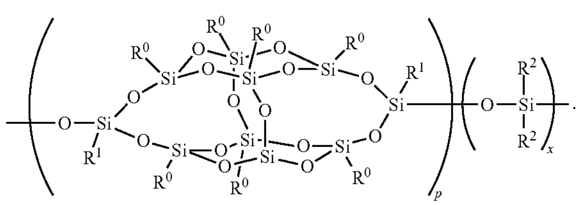

11. A method of producing a siloxane polymer represented by Formula (J-7), comprising a process of reacting the siloxane polymer represented by Formula (J-4) according to claim 10 with a compound represented by Formula (e):

(e)

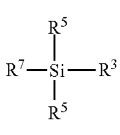

-continued (J-7)

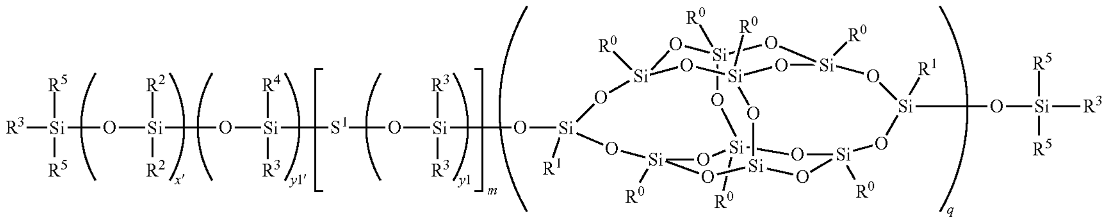

in the above formula, $R^0$ to $R^4$, x', y1, y1', q, m and S' are each independently defined the same as $R^0$ to $R^4$, x', y1, y1', q, m and S' in Formula (J-4);

$R^3$ at the terminal in Formula (e) and Formula (J-7) is selected from the groups defined for $R^3$ in Formula (J-4);

$R^5$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; and $R^7$ represents a hydrogen atom, a halogen atom, or an alkoxy group having 1 to 20 carbon atoms.

12. A method of producing a siloxane polymer represented by Formula (J-8), comprising:

(I-1): a process of adding and reacting a compound represented by Formula (q) in the above Process (I) according to claim 9:

in the above formula, $R^0$ to $R^4$, x', y1, y1', q, m and $S^1$ are each independently defined the same as $R^0$ to $R^4$, x', y1, y1', q, m and $S^1$ in Formulae (a), (b), (k), and (J-4);

$R^5$'s independently represent a hydrogen atom, an aryl group having 6 to 20 carbon atoms, a cycloalkyl group having 5 to 6 carbon atoms, an arylalkyl group having 7 to 40 carbon atoms, an alkyl group having 1 to 40 carbon atoms, or an alkoxy group having 1 to 20 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms, in the alkoxy group having 1 to 20 carbon atoms, any hydrogen atom may be independently substituted with a fluorine atom, and any —$CH_2$— may be independently substituted with a cycloalkylene group having 5 to 20 carbon atoms; and f represents an integer of 1 to 1,000.

13. A method of producing a siloxane polymer represented by Formula (J-9), comprising:

(I-3): a process of adding and reacting a compound represented by Formula (r) in the above Process (I) according to claim 11:

(q)

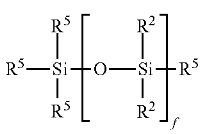

(J-8)

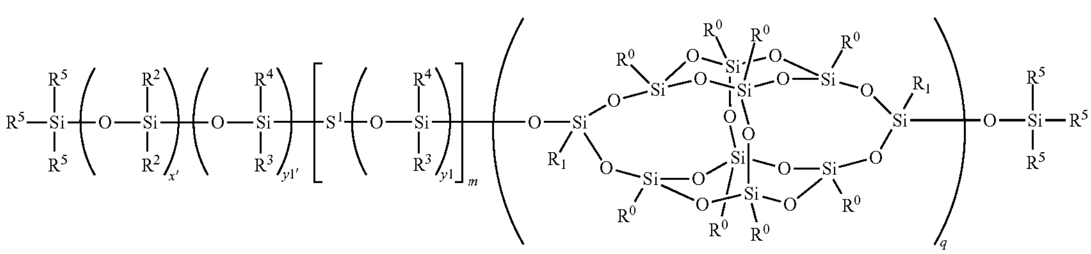

(r)

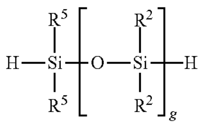

(J-9)

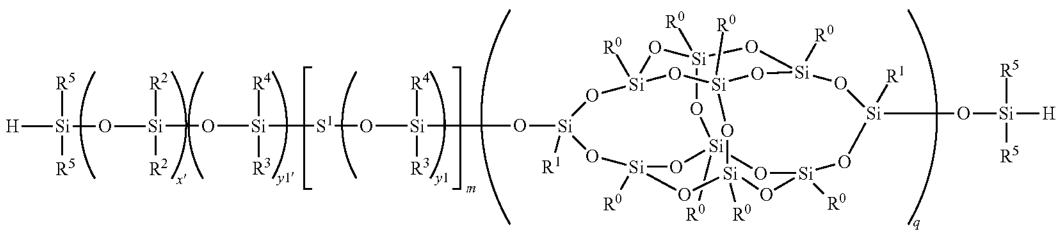

in the above formula, $R^0$ to $R^4$, x', y1, y1', q, m and $S^1$ are each independently defined the same as $R^0$ to $R^4$, x', y1, y1', q, m and $S^1$ in Formulae (a), (b), (k), and (J-4);

$R^5$'s independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms; and g represents an integer of 1 to 30.

14. A method of producing a siloxane polymer represented by Formula (J-10), comprising:

a process of reacting the siloxane polymer represented by Formula (J-5) according to claim 10 with a compound represented by Formula (g):

in the above formula, $R^0$ to $R^5$, x', y1, y1', q, m and $S^1$ are each independently defined the same as $R^0$ to $R^4$, x', y1, y1', q, m and $S^1$ in Formula (J-5);

in Formula (g), $R^5$ is independently selected from the groups defined for $R^5$ in Formula (J-5);

R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms; and g' is 0 or 1.

15. A method of producing a siloxane polymer represented by Formula (J-11), comprising:

a process of reacting the siloxane polymer represented by Formula (J-9) according to claim 13 with a compound represented by Formula (g):

(g)

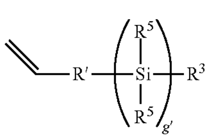

(J-10)

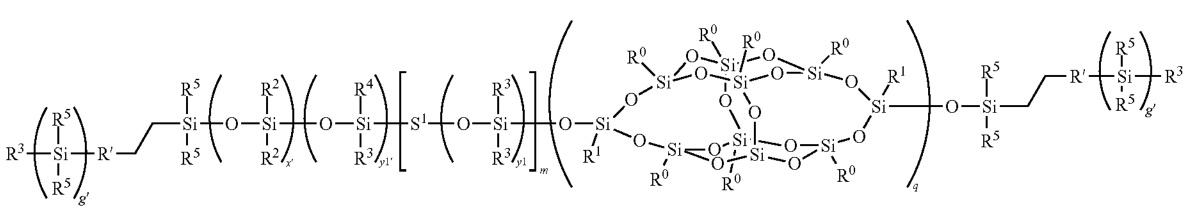

(g)

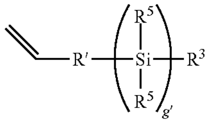

(J-11)

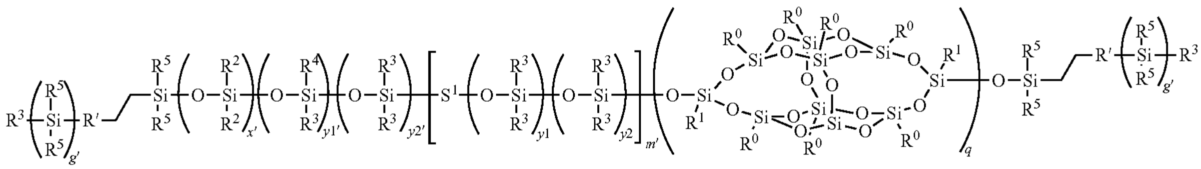

in the above formula, $S^1$, $R^0$ to $R^5$, x', y1, y1', q, m and $S^1$ are each independently defined the same as $S^1$, $R^0$ to $R^5$, x', y1, y1', q, m and $S^1$ in Formula (J-9);

in Formula (g), $R^5$ is independently selected from the groups defined for $R^5$ in Formula (J-9); and R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms.

16. A method of producing a siloxane polymer containing a repeating unit represented by Formula (1-3), comprising any of the following (III) to (VI):

(III):

(III-1) a process of reacting a silicon compound represented by Formula (a) and a silicon compound represented by Formula (b) with a compound represented by Formula (m); and (III-2) a process of reacting the silicon compound obtained in the above process (III-1) with a compound represented by Formula (g);

(IV):

(IV-1) a process of reacting a silicon compound represented by Formula (a) and a silicon compound represented by Formula (b) with a compound represented by Formula (m);

(IV-2) a process of reacting the silicon compound obtained in the above process (IV-1) with a compound represented by Formula (e); and (IV-3) a process of reacting the silicon compound obtained in the above process (IV-2) with a compound represented by Formula (g);

(V):

(IV-1) a process of reacting a silicon compound represented by Formula (a) and a silicon compound represented by Formula (b) with a compound represented by Formula (m);

(IV-2) a process of reacting the silicon compound obtained in the above process (IV-1) with a compound represented by Formula (n); and (IV-3) a process of reacting the silicon compound obtained in the above process (IV-2) with a compound represented by Formula (g);

(VI):

(IV-1) a process of reacting a silicon compound represented by Formula (a) and a silicon compound represented by Formula (b) with a compound represented by Formula (m);

(VI-2) a process of reacting the silicon compound obtained in the process (VI-1) with a compound represented by Formula (p); and (VI-3) a process of reacting the silicon compound obtained in the process (VI-2) with a compound represented by Formula (g);

(a)

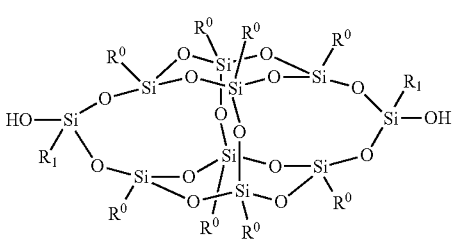

(b)

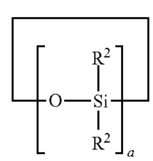

(m)

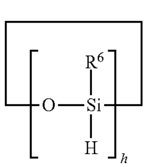

(g)

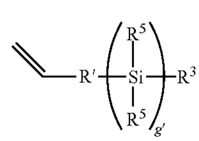

(e)

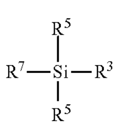

(n)

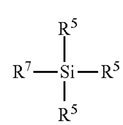

-continued (p)

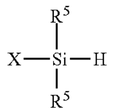

(1-3)

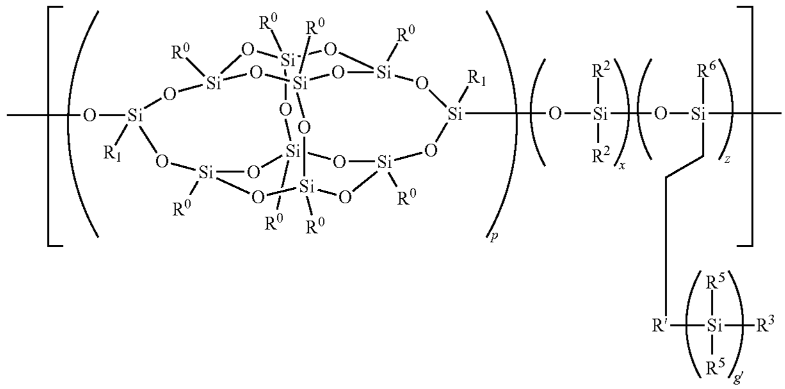

in the above formula, $R^0$'s independently represent an aryl group having 6 to 20 carbon atoms or a cycloalkyl group having 5 to 6 carbon atoms, and in the aryl group having 6 to 20 carbon atoms and the cycloalkyl group having 5 to 6 carbon atoms, any hydrogen atom may be independently substituted with a fluorine atom or an alkyl group having 1 to 20 carbon atoms;

$R^1$'s independently represent a hydrogen atom, an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^2$, $R^4$, $R^5$ and $R^6$ independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms;

$R^3$ represents a monovalent group having a reactive group;

$R^7$ represents a hydrogen atom, a halogen atom, or an alkoxy group having 1 to 20 carbon atoms;

R' represents an alkylene group having 1 to 40 carbon atoms, and in the alkylene group having 1 to 40 carbon atoms, any —$CH_2$— may be independently substituted with —O— or a cycloalkylene group having 5 to 20 carbon atoms;

a represents an integer of 1 to 30;

p represents an integer of 1 or more;

x represents an integer of 1 to 30; and g' represents 0 or 1.

17. The method of producing a siloxane polymer according to claim 16, wherein the siloxane polymer is represented by any of Formulae (J-12) to (J-15):

(J-12)
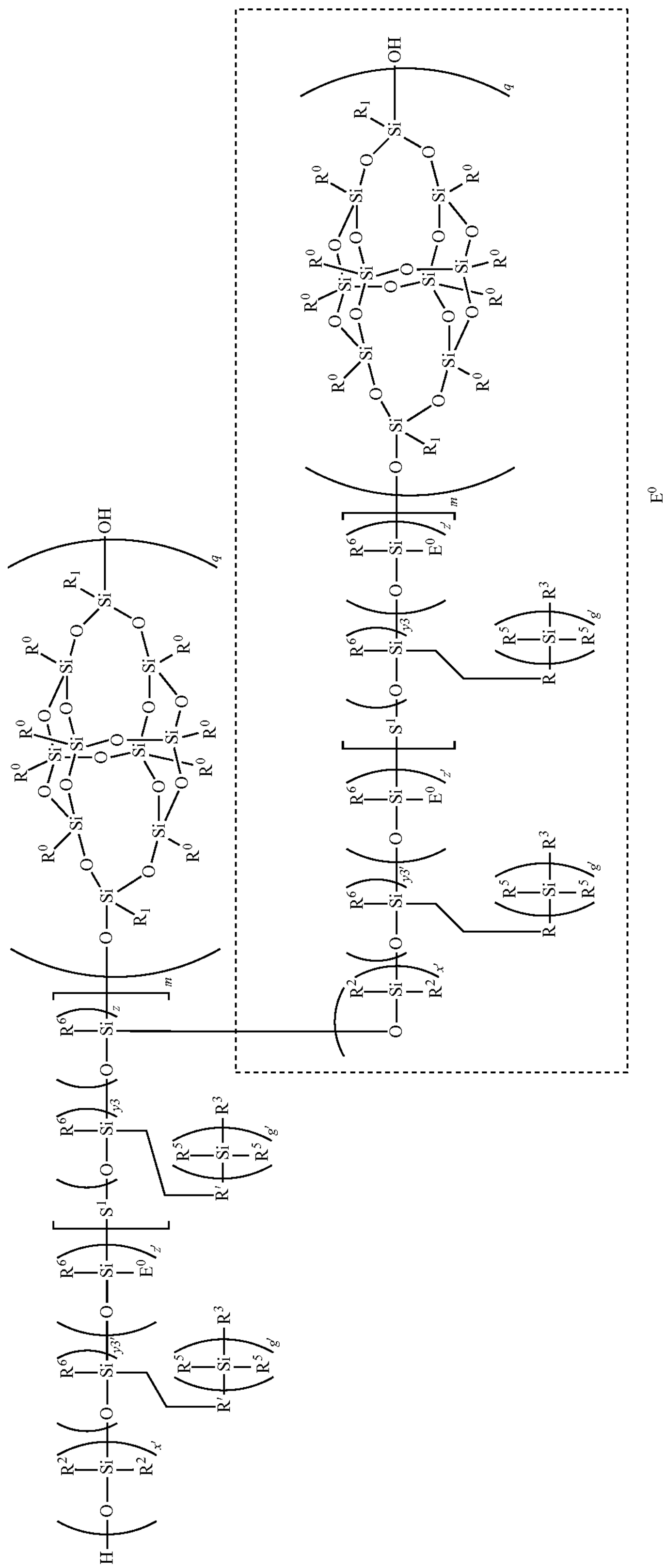

-continued
(J-13)
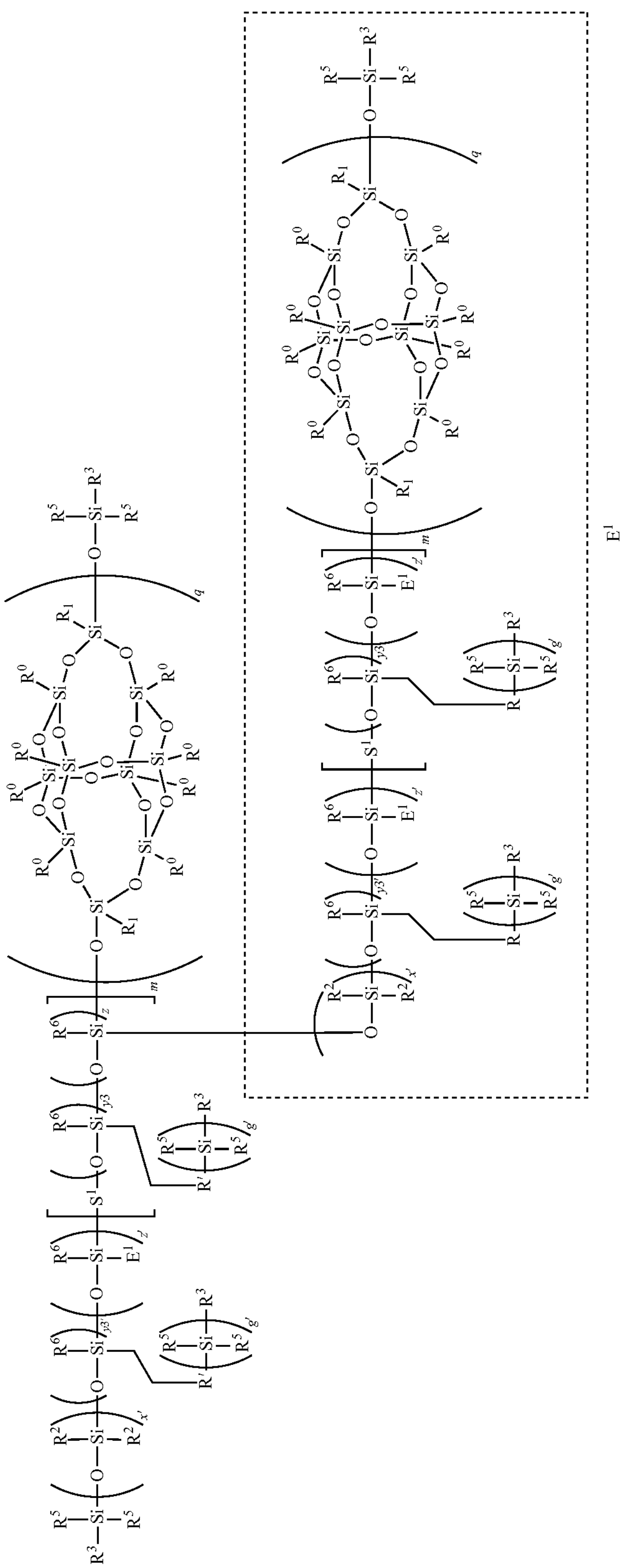

-continued
(J-14)
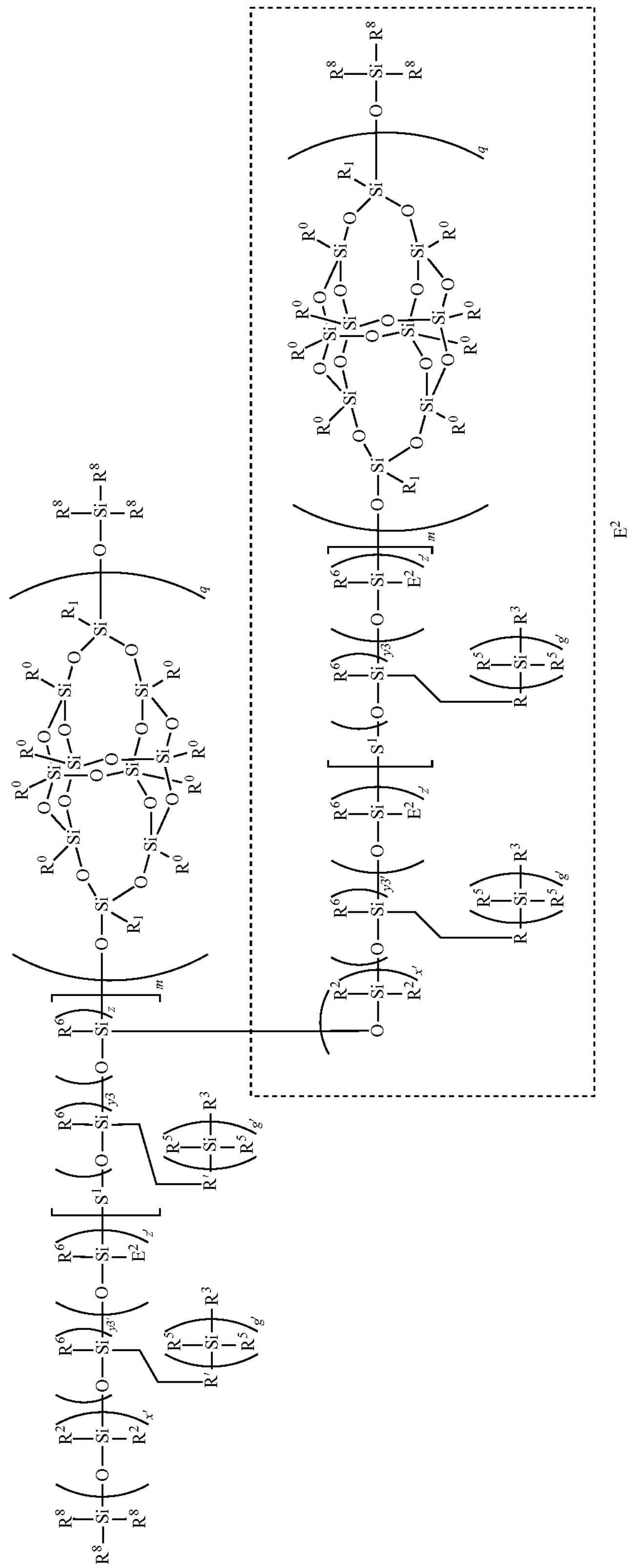

-continued
(J-15)
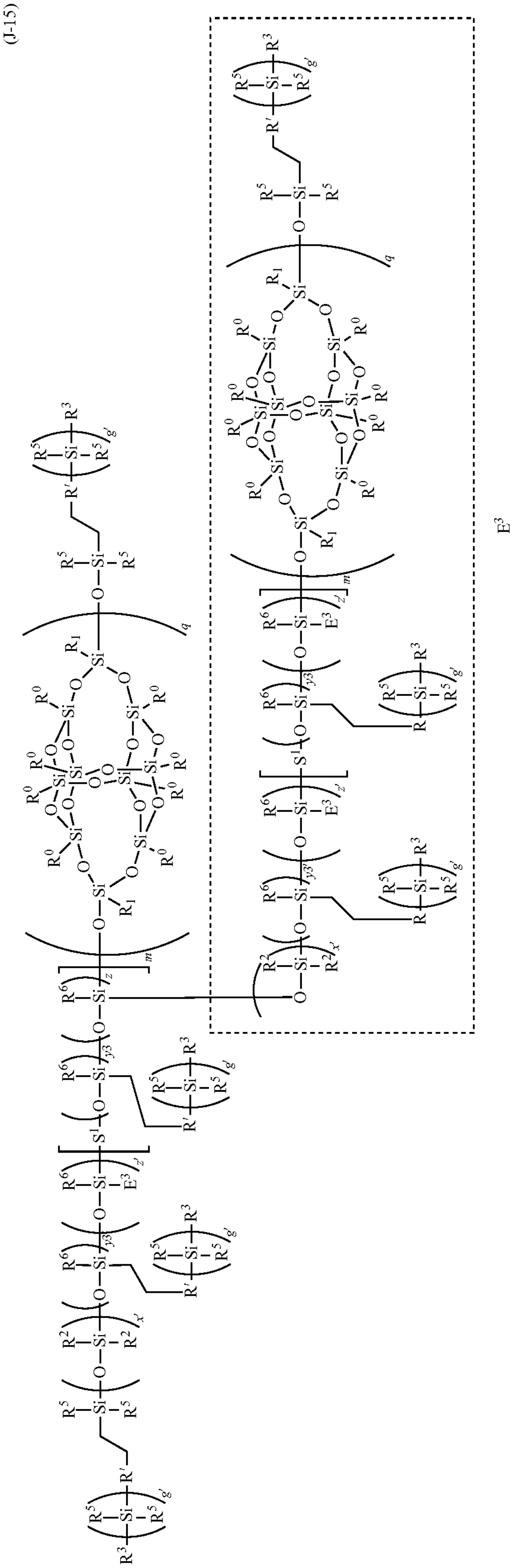
(S1)
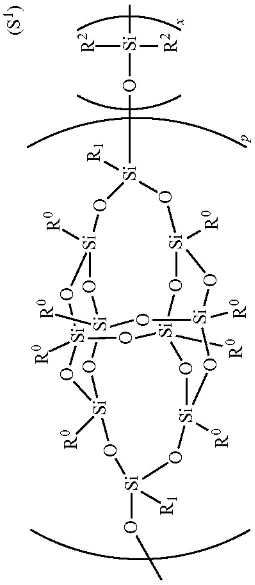

in the above formula $R^0$, $R^1$, $R^2$, $R^3$, $R^5$, $R^6$, R', x, z, and g' are defined the same as $R^0$, $R^1$, $R^2$, $R^3$, $R^5$, $R^6$, R', x, z, and g' in Formula (1-3); S' is as described above, in $S^1$, $R^0$ to $R^2$, p, and x are defined the same as $R^0$ to $R^2$, p, and x in Formula (1-3); q, x', y3, y3', and z' represent an integer of 0 to 30; m represents a number satisfying a weight average molecular weight of 2,000 to 10,000,000; $E^0$ represents the same structure as a part surrounded by the dashed line in Formula (J-12); $E^1$ represents the same structure as a part surrounded by the dashed line in Formula (J-13); m represents a number satisfying a weight average molecular weight of 2,000 to 10,000,000; $E^2$ represents the same structure as a part surrounded by the dashed line in Formula (J-14); $E^3$ represents the same structure as a part surrounded by the dashed line in Formula (J-14); and m represents a number satisfying a weight average molecular weight of 2,000 to 10,000,000.

18. A method of producing a siloxane polymer represented by Formula (J-8), comprising:

(I-2): a process of reacting the siloxane polymer represented by Formula (J-4) according to claim 10 with a compound represented by Formula (n):

the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms, in the alkoxy group having 1 to 20 carbon atoms, any hydrogen atom may be independently substituted with a fluorine atom, and any —$CH_2$— may be independently substituted with a cycloalkylene group having 5 to 20 carbon atoms; and

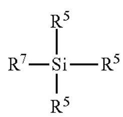

(n)

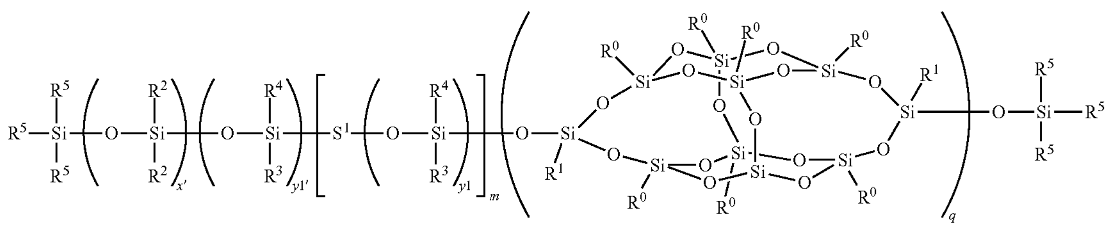

(J-8)

in the above formula, $R^0$ to $R^4$, x', y1, y1', q, m and $S^1$ are each independently defined the same as $R^0$ to $R^4$, x', y1, y1', q, m and $S^1$ in Formulae (a), (b), (k), and (J-4);

$R^5$'s independently represent a hydrogen atom, an aryl group having 6 to 20 carbon atoms, a cycloalkyl group having 5 to 6 carbon atoms, an arylalkyl group having 7 to 40 carbon atoms, an alkyl group having 1 to 40 carbon atoms, or an alkoxy group having 1 to 20 carbon atoms, in the aryl group having 6 to 20 carbon atoms, $R^7$ represents a hydrogen atom, a halogen atom, or an alkoxy group having 1 to 20 carbon atoms.

19. A method of producing a siloxane polymer represented by Formula (J-9), comprising:

(I-4): a process of reacting the siloxane polymer represented by Formula (J-4) according to claim 10 with a compound represented by Formula (p):

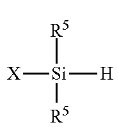

(p)

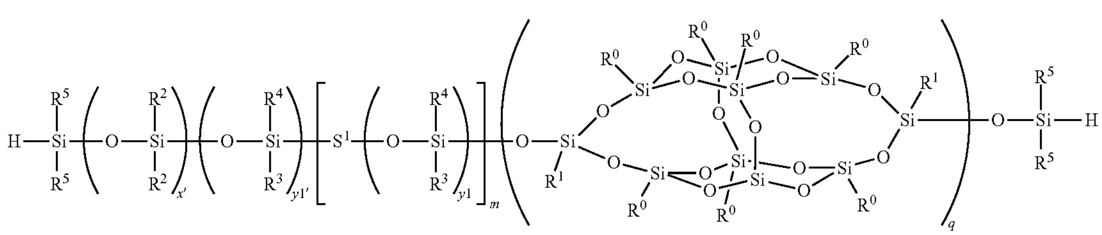

(J-9)

in the above formula, $R^0$ to $R^4$, x', y1, y1', q, m and $S^1$ are each independently defined the same as $R^0$ to $R^4$, x', y1, y1', q, m and $S^1$ in Formulae (a), (b), (k), and (J-4);

X represents a halogen atom;

$R^5$'s independently represent an aryl group having 6 to 20 carbon atoms, a cycloalkyl group having 5 to 6 carbon atoms, an arylalkyl group having 7 to 40 carbon atoms, or an alkyl group having 1 to 40 carbon atoms, in the aryl group having 6 to 20 carbon atoms, the cycloalkyl group having 5 to 6 carbon atoms and the aryl group in the arylalkyl group having 7 to 40 carbon atoms, any hydrogen atom may be independently substituted with a fluorine atom or an alkyl group having 1 to 20 carbon atoms, in the alkylene group in the arylalkyl group having 7 to 40 carbon atoms, any hydrogen atom may be substituted with a fluorine atom, any —$CH_2$— may be independently substituted with —O—, —CH═CH—, or a cycloalkylene group having 5 to 20 carbon atoms, in the alkyl group having 1 to 40 carbon atoms, any hydrogen atom may be independently substituted with a fluorine atom, and any —$CH_2$— may be independently substituted with —O— or a cycloalkylene group having 5 to 20 carbon atoms.

* * * * *